(12) United States Patent
Cao

(10) Patent No.: US 12,407,377 B2
(45) Date of Patent: *Sep. 2, 2025

(54) ELECTRONIC DEVICE, METHOD AND STORAGE MEDIUM FOR WIRELESS COMMUNICATION SYSTEM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,759

(22) Filed: Jan. 4, 2024

(65) Prior Publication Data

US 2024/0137078 A1    Apr. 25, 2024
US 2024/0235624 A9    Jul. 11, 2024

Related U.S. Application Data

(63) Continuation of application No. 17/156,636, filed on Jan. 25, 2021, now Pat. No. 11,881,913, which is a
(Continued)

(30) Foreign Application Priority Data

Jun. 20, 2017    (CN) .................. 201710470653.X

(51) Int. Cl.
*H04B 7/0408*    (2017.01)
*H04B 7/0417*    (2017.01)
(Continued)

(52) U.S. Cl.
CPC ......... *H04B 7/0408* (2013.01); *H04B 7/0417* (2013.01); *H04B 7/06* (2013.01);
(Continued)

(58) Field of Classification Search
None
See application file for complete search history.

(56) References Cited

U.S. PATENT DOCUMENTS

2014/0177607 A1    6/2014   Li et al.
2014/0376466 A1    12/2014   Jeong et al.
(Continued)

FOREIGN PATENT DOCUMENTS

CN      103379079 A1    10/2013
CN      103782636 A     5/2014
(Continued)

OTHER PUBLICATIONS

International Search Report mailed on Sep. 10, 2018 for PCT/CN2018/091474 filed on Jun. 15, 2018, 8 pages.
(Continued)

*Primary Examiner* — Scott M Sciacca
(74) *Attorney, Agent, or Firm* — XSENSUS LLP

(57) ABSTRACT

The present disclosure relates to electronic devices, methods, and storage medium for a wireless communication system. Various embodiments are described with respect to beam management. In one embodiment, an electronic device for a base station side in a wireless communication system can comprise a processing circuitry configured to repetitively transmit a synchronization signal (SS) to a terminal device by using different transmit (TX) beams based on a TX beam configuration; the SS can indicate information of the TX beam used to transmit the SS. The processing circuitry can be configured to obtain feedback from the terminal device; the feedback can comprise information of the TX beam for being used in TX beam management.

21 Claims, 31 Drawing Sheets

Related U.S. Application Data continuation of application No. 16/338,491, filed as application No. PCT/CN2018/091474 on Jun. 15, 2018, now Pat. No. 10,931,333.

(51) Int. Cl.

| H04B 7/06 | (2006.01) |
|---|---|
| H04L 5/00 | (2006.01) |
| H04W 56/00 | (2009.01) |
| H04W 74/08 | (2024.01) |
| H04W 74/0833 | (2024.01) |

(52) U.S. Cl.
CPC ......... *H04B 7/0617* (2013.01); *H04B 7/0626* (2013.01); *H04L 5/00* (2013.01); *H04L 5/0051* (2013.01); *H04W 56/001* (2013.01); *H04W 74/0833* (2013.01)

(56) References Cited

U.S. PATENT DOCUMENTS

| 2015/0085795 | A1 | 3/2015 | Papasakellariou et al. |
|---|---|---|---|
| 2015/0312026 | A1 | 10/2015 | Kim et al. |
| 2016/0360463 | A1 | 12/2016 | Kim |
| 2017/0048826 | A1 | 2/2017 | Kishiyama |
| 2017/0251460 | A1 | 8/2017 | Agiwal et al. |
| 2017/0325260 | A1* | 11/2017 | Guo .................... H04W 74/006 |
| 2018/0323850 | A1* | 11/2018 | Baligh .............. H04W 36/0094 |
| 2018/0343156 | A1 | 11/2018 | Malik et al. |
| 2018/0368189 | A1 | 12/2018 | Narasimha et al. |
| 2019/0081688 | A1 | 3/2019 | Deenoo et al. |
| 2019/0313314 | A1 | 10/2019 | Yang |
| 2019/0320468 | A1 | 10/2019 | Svedman |
| 2020/0037297 | A1 | 1/2020 | Pan et al. |
| 2020/0112993 | A1 | 4/2020 | Tsai et al. |
| 2020/0120634 | A1 | 4/2020 | Lee et al. |
| 2021/0051502 | A1 | 2/2021 | Yamada et al. |

FOREIGN PATENT DOCUMENTS

| CN | 104734758 | A | 6/2015 |
|---|---|---|---|
| CN | 105637939 | A | 6/2016 |
| CN | 106341170 | A | 1/2017 |
| CN | 106465070 | A | 2/2017 |
| CN | 106559122 | A | 4/2017 |
| CN | 106559206 | A1 | 4/2017 |
| CN | 106575984 | A | 4/2017 |
| CN | 106856611 | A | 6/2017 |
| EP | 1981198 | A1 | 10/2008 |
| JP | 2017-516348 | A | 6/2017 |
| RU | 2617834 | C2 | 4/2017 |
| WO | 2013/118439 | A1 | 8/2013 |
| WO | 2014/104758 | A1 | 7/2014 |
| WO | 2015/046928 | A1 | 4/2015 |
| WO | 2015/093892 | A1 | 6/2015 |
| WO | 2015/166840 | A1 | 11/2015 |
| WO | 2016/086144 | A1 | 6/2016 |
| WO | 2016/106620 | A1 | 7/2016 |
| WO | 2016/148127 | A1 | 9/2016 |
| WO | 2016/203290 | A1 | 12/2016 |
| WO | 2017/092714 | A1 | 6/2017 |
| WO | 2018/143375 | A1 | 8/2018 |

OTHER PUBLICATIONS

Written Opinion of the International Searching Authority mailed on Sep. 10, 2018, for PCT/CN2018/091474 filed on Jun. 15, 2018, 6 pages.

Office Action issued on Aug. 4, 2020, in corresponding Japanese patent Application No. 2019-567248, 12 pages.

CMCC, "Considerations of RACH resource partitioning for NR", 3GPP TSG-RAN WG2 NR AdHoc, R2-1706998, Jun. 27-29, 2017, Qingdao, China, total 5 pages, [online] URL:http://www.3gpp.org/ftp/tsg_ran/WG2.

Zte, "RRM measurements on IDLE mode RS", 3GPP TSG RAN WG1 NR Ad-Hoc#2, R1-1709898, May 27-30, 2017, Qingdao, P.R. China, total 10 pages, [online] URL:http://www.3gpp.org/ftp/tsg_ran/WG1_RL1/TSGR1_AH/NR_A.

Intel Corporation, "Random Access Multi-Beam Aspects", 3GPP TSG RAN WG2#NR_AdHoc#2, R2-1707028, Jun. 27-29, 2017, Qingdao, China, total 4 pages, [online] URL:http://www.3gpp.org/ftp/tsg_ran/WG2_RL2/.

Qualcomm Incorporated, "Measurement reporting and beam refinement during RACH", 3GPP TSG-RAN WG2 Meeting NR ad-hoc, R2-1706912, Qingdao, China, Jun. 27-29, 2017, total 9 pages, [online] URL:http://www.3gpp.

Fujitsu, "Discussion on 4-step RA procedure", 3GPP TSG RAN WG1 NR Ad-hoc#2, R1-1710234, Qingdao, P.R.China, Jun. 27-30, 2017, total 8 pages, [online] URL:http://www.3gpp.org/ftp/tsg_ran/WG1_RL1/TSGR1_AH.

Sony, "Considerations on 4-step RA Procedure", 3GPP TSG RAN WG1 NR Ad-Hoc#2, R1-1710860, Qingdao, P.R.China, Jun. 27-30, 2017, total 4 pages, [online] URL:http://www.3gpp.org/ftp/tsg_ran/WG1_RL1/TSGR1_A.

Sony, "Views on beam reporting", 3GPP TSG RAN WG1 #88bis, R1-1705208, Apr. 3-7, 2017, Spokane, USA, total 7 pages, [online]URL:http://www.3gpp.org/ftp/tsg_ran/WG1_RL1/TSGR1_88b/Docs/R1-1705208.

Samsung, "WF on PRACH Transmission", 3GPP TSG RAN WG1 Ad Hoc Meeting, R1-1706557, Spokane ,WA, USA, Mar. 3-7, 2017, total 4 pages, [online] URL:http://www.3gpp.org/ftp/tsg_ran/WG1_RL1/TSGR1_88b/Doc.

Ericsson, "4-step random access procedure", 3GPP TSG-RAN WG1 NR Ad-Hoc#2, R1-1711383, Jun. 27-30, 2017, Qingdao, China, total 15 pages, [online] URL:http://www.3gpp.org/ftp/tsg_ran/WG1_RL1/TSGR1_AH/.

Office Action issued on Sep. 17, 2020, in corresponding Korean patent Application No. 10-2020-7022681, 6 pages.

Ericsson, "NR mapping between SS-blocks and PRACH preambles", 3GPP TSG-RAN WG1 Meeting #89, R1-708726, May 15-19, 2017, total 9 pages, Hangzhou, China.

MediaTek Inc., "Simulation on Beam Tracking with SS Block set periodicity consideration", 3GPP TSG RAN WG1 NR Ad-Hoc Meeting, R1-1700161, Jan. 16-20, 2017, total 5 pages, Spokane, USA.

3GPP R1-1711015 3GPP TSG-RAN WG1 #89ah-NR R1-1711015 Qingdao, China, Jun. 27-30, 2017 on DL beam indication.

((3GPP TSG-RAN WG1 N R#2 RI-1711161)) Jun. 16, 2017 Qualcomm Incorporated RI-1711161 "Beam recovery procedures".

Huawei, HiSilicon, CSI-RS Design for L3 Mobility [online], 3GPP TSG RAN WG1 Meeting #89 R1-1708165, May 6, 2017 upload, interne1<URL:http://www.3gpp.org/ftp/tsg_ran/WG1_RL 1/TSGR1_89/Docs/R1-1708165.zip>.

Samsung, 4-step RACH procedure discussion [online], 3GPP TSG RAN WG1 Meeting NR AH #2 R1-1710636, Jun. 16, 2017 upload, internet<URL https://www.3gpp.org/ftp/TSG_RAN/WG1_RL 1 /TSGR1_AH/NR_AH_ 1706/Docs/R1-1710636.zip>.

* cited by examiner

600A

| TX_B1 | TX_B1 | TX_B1 | TX_B2 | TX_B2 | TX_B2 | TX_B3 | TX_B3 | TX_B3 | TX_B4 | TX_B4 | TX_B4 |

| TX_B1 | TX_B2 | TX_B3 | TX_B4 | TX_B5 | TX_B6 | TX_B7 | TX_B8 | TX_B9 | TX_B 10 | TX_B 11 | TX_B 12 |

TX_B1, 1 (3 times repetition)  TX_B1, 2 (3 times repetition)  TX_B2, 1 (3 times repetition)  TX_B2, 2 (3 times repetition)

| TX_B1,1 | TX_B1,1 | TX_B1,1 | TX_B1,2 | TX_B1,2 | TX_B1,2 | TX_B2,1 | TX_B2,1 | TX_B2,1 | TX_B2,2 | TX_B2,2 | TX_B2,2 |

TX_B3, 1 (3 times repetition)  TX_B3, 2 (3 times repetition)  TX_B4, 1 (3 times repetition)  TX_B4, 2 (3 times repetition)

| TX_B3,1 | TX_B3,1 | TX_B3,1 | TX_B3,2 | TX_B3,2 | TX_B3,2 | TX_B4,1 | TX_B4,1 | TX_B4,1 | TX_B4,2 | TX_B4,2 | TX_B4,2 |

| RX_B1 | RX_B1 | RX_B1 | RX_B2 | RX_B2 | RX_B2 | RX_B3 | RX_B3 | RX_B3 | RX_B4 | RX_B4 | RX_B4 |

RX_B1, 1 (3 times repetition) | RX_B1, 2 (3 times repetition) | RX_B2, 1 (3 times repetition) | RX_B2, 2 (3 times repetition)

| RX_B1,1 | RX_B1,1 | RX_B1,1 | RX_B1,2 | RX_B1,2 | RX_B1,2 | RX_B2,1 | RX_B2,1 | RX_B2,1 | RX_B2,2 | RX_B2,2 | RX_B2,2 |

RX_B3, 1 (3 times repetition) | RX_B3, 2 (3 times repetition) | RX_B4, 1 (3 times repetition) | RX_B4, 2 (3 times repetition)

| RX_B3,1 | RX_B3,1 | RX_B3,1 | RX_B3,2 | RX_B3,2 | RX_B3,2 | RX_B4,1 | RX_B4,1 | RX_B4,1 | RX_B4,2 | RX_B4,2 | RX_B4,2 |

FIG. 17B

ELECTRONIC DEVICE, METHOD AND STORAGE MEDIUM FOR WIRELESS COMMUNICATION SYSTEM

CROSS-REFERENCE TO RELATED APPLICATIONS

The present application is a continuation of U.S. application Ser. No. 17/156,636, filed Jan. 25, 2021, which is a continuation of U.S. application Ser. No. 16/338,491, filed Mar. 31, 2019, (now U.S. Pat. No. 10,931,333) which is based on PCT filing PCT/CN2018/091474, filed Jun. 15, 2018, which claims priority to CN 201710470653.X, filed Jun. 20, 2017, the entire contents of each are incorporated herein by reference.

TECHNICAL FIELD

The present disclosure relates generally to a wireless communication system, and in particular, to beam management techniques related to beamforming.

BACKGROUND ART

In recent years, with the development and wide application of mobile internet technology, wireless communication has unprecedentedly met people's needs for voice and data communication. In order to provide even higher communication quality and capacity, wireless communication systems employ various technologies at different layers, such as beamforming techniques. Beamforming can provide beamforming gain to compensate for loss of radio signals by increasing the directivity of antenna transmission and/or reception. In future wireless communication systems (such as 5G systems like NR (New Radio) system, for example), the number of antenna ports at the base station and the terminal device sides will further increase. For example, the number of antenna ports at the base station side may increase to hundreds or even more, constituting a Massive MIMO system. Thus, in large-scale antenna systems, beamforming will have a larger application space.

Currently, beamforming is more used for the data transceiving process between a base station and a terminal device. However, the initial connection/synchronization between the terminal device and the base station (including, for example, the base station transmitting a Synchronization Signal (SS), and the terminal device transmitting the random access signal to the base station) is the first step to enable the terminal device to communicate properly with the base station. Therefore, beamforming technology can be considered for the initial connection/synchronization between the terminal device and the base station. For example, beamforming technology can be considered for the transceiving process of the synchronization signal as well as the transceiving process of the random access signal.

SUMMARY OF THE INVENTION

Aspects of the present disclosure relate to beam management in beamforming techniques of wireless communication systems.

One aspect of the present disclosure relates to an electronic device for a base station side in a wireless communication system. According to one embodiment, the electronic device may comprise processing circuitry. The processing circuitry can be configured to repetitively transmit a synchronization signal to a terminal device by using different transmit beams based on a transmit beam configuration, the synchronization signal indicating information of a transmit beam used to transmit the synchronization signal. The processing circuitry can further be configured to obtain feedback from the terminal device, the feedback comprising information of the transmit beam for being used in transmit beam management.

Another aspect of the present disclosure relates to an electronic device for a terminal device side in a wireless communication system. According to one embodiment, the electronic device comprises a processing circuitry. The processing circuitry can be configured to receive a synchronization signal based on a transmit beam configuration of a base station side of the wireless communication system, the synchronization signal being able to indicate information of a transmit beam used to transmit the synchronization signal by the base station. The processing circuitry can further be configured to provide feedback to the base station, and the feedback can comprise information of the transmit beam for being used by the base station in transmit beam management.

Another aspect of the disclosure relates to a method of radio communication. In one embodiment, the method may comprise repetitively transmitting a synchronization signal to a terminal device by using a different transmit beam based on the transmit beam configuration, the synchronization signal being able to indicate information of a transmit beam used to transmit the synchronization signal; and obtaining feedback from the terminal device, the feedback comprising information of the transmit beam for being used in transmit beam management.

Another aspect of the disclosure relates to another method of radio communication. In one embodiment, the method may comprise receiving a synchronization signal based on a transmit beam configuration of a base station side in a wireless communication system, the synchronization signal being able to indicate information of a transmit beam used to transmit the synchronization signal by the base station; and providing feedback to the base station, the feedback comprising information of the transmit beam for being used by the base station in transmit beam management.

Another aspect of the present disclosure relates to an electronic device for a base station side in a wireless communication system. According to one embodiment, the electronic device may comprise processing circuitry. The processing circuitry can be configured to receive a transmit beam configuration from another base station that transmits a synchronization signal to a terminal device based on the transmit beam configuration. The processing circuitry can further be configured to transmit a transmit beam configuration to the terminal device.

Another aspect of the present disclosure relates to an electronic device for a terminal device side in a wireless communication system. According to one embodiment, the electronic device comprises a processing circuitry. The processing circuitry may be configured to obtain random access configuration information; and transmit a random access preamble based on the random access configuration information to indicate one or more transmit beams at a base station side paired with one or more receive beams at the terminal device side in the downlink.

Another aspect of the present disclosure relates to an electronic device for a base station side in a wireless communication system. According to one embodiment, the electronic device can comprise processing circuitry. The processing circuitry can be configured to transmit random access configuration information; and receive a random access preamble transmitted from a terminal device, to obtain one or more transmit beams at the base station side paired with one or more receive beams at the terminal device side in the downlink.

Another aspect of the disclosure relates to a method of radio communication. In one embodiment, the method can comprise obtaining random access configuration information; and transmitting a random access preamble based on the random access configuration information, to indicate one or more transmit beams at a base station side paired with one or more receive beams at a terminal device side in the downlink.

Another aspect of the disclosure relates to another method of radio communication. In one embodiment, the method may comprise transmitting random access configuration information; and receiving a random access preamble transmitted from a terminal device, to obtain one or more transmit beams at a base station side paired with one or more receive beams at the terminal device side in the downlink.

Another aspect of the disclosure relates to a computer-readable storage medium storing one or more instructions. In some embodiments, the one or more instructions can, when executed by one or more processors of an electronic device, cause the electronic device to perform methods in accordance with various embodiments herein.

Another aspect of the disclosure relates to various apparatus, including means or units for performing the operations of the methods in accordance with embodiments herein.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments herein and explaining the theory and advantages of the present disclosure. Wherein:

FIGS. 6A-6C illustrate an exemplary transmit beam configuration of a base station side in accordance with an embodiment herein.

FIGS. 17A and 17B illustrate an exemplary receive beam configuration at the base station side in accordance with an embodiment herein.

Figure 1:
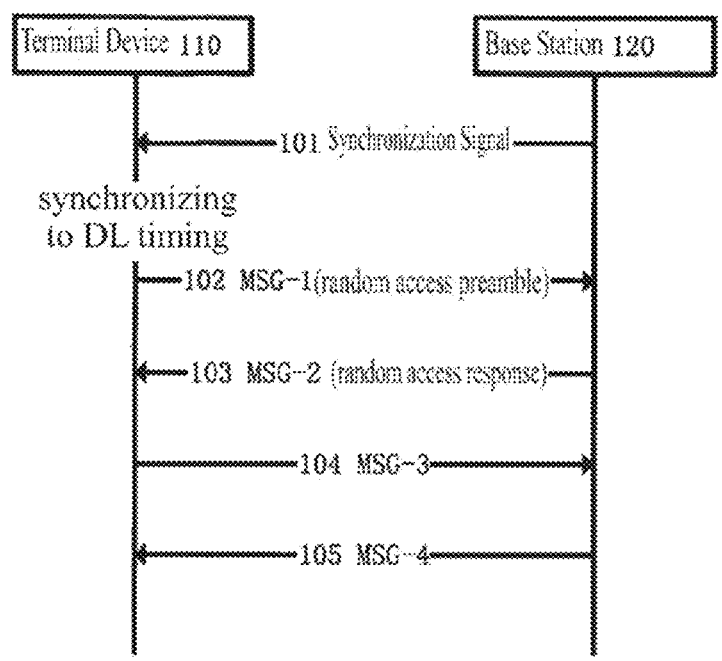
FIG. 1 depicts an exemplary cell synchronization and random access process in a wireless communication system.

While the embodiments herein are susceptible to various modifications and alternative forms, the specific embodiments thereof are illustrated in the drawings by way of example and are described in detail herein. It should be understood, however, that the drawings and the detailed description thereof are not intended to limit the embodiments to the specific forms as disclosed, rather, it is intended to cover all modifications, equivalents and alternatives falling within the spirit and scope of the claims.

DESCRIPTION OF EMBODIMENTS

Exemplary embodiments herein will be described hereinafter with reference to the accompanying drawings. For the sake of clarity and conciseness, not all features of an actual implementation are described in the specification. However, it should be appreciated that implementation specific decisions must be made in the development of any such actual embodiment, so as to achieve specific goals of the developer. For example, to comply with constrain conditions related to system and business, and these constrain conditions may vary from implementation to implementation. Furthermore, it will also be appreciated that the development work may be more complicated and time consuming, although such development work is merely a routine task for those skilled in the art having benefit of this disclosure.

Only the device structure and/or operational steps closely related to the solutions according to the present disclosure are shown in the drawings in order to avoid obscuring the present disclosure with unnecessary detail, and other details that has little relation to the present disclosure are omitted.

Initial Connection/Synchronization Process Between Base Stations and Terminal Devices An exemplary initial connection/synchronization process between base station and terminal device in a wireless communication system, including cell synchronization and random access (RA) process, is first described in conjunction with FIG. 1. In general, a wireless communication system may include a plurality of base stations, each of which may serve several terminal devices within a respective coverage area (e.g., a cell). An exemplary cell synchronization and RA process between the terminal device 110 and the base station 120 is shown in FIG. 1, and the terminal device 110 is one of the several terminal devices served by the base station 120. This process may also be applicable to any terminal device in a wireless communication system.

The terminal device 110 first needs to perform cell search when booting or to be handed-over to the base station 120. One of the purposes of the cell search is to enable the terminal device 110 to obtain the cell frame timing of the base station 120, to derive the starting position of the downlink frame. On the other hand, the base station 120 transmits the synchronization signal 101 so as to enable the terminal device 110 to obtain the cell frame timing, and the base station 120 can periodically perform synchronization signal transmission, for example. In general, a synchronization sequence may be included in the synchronization signal, the synchronization sequence set from which the synchronization sequence is selected is known to both the base station and the terminal device. In an LTE system, for example, a synchronization signal comprises a Primary Synchronization Signal (PSS) and a Secondary Synchronization Signal (SSS). In one example, the PSS may be a Zadoff-Chu sequence of length 63, and the SSS may be a sequence of length 62 and derived from two cascade M-sequences of length 31. Moreover, the synchronization signal may be transmitted with a certain time period or time pattern, for example, the synchronization signal may be transmitted at fixed locations (e.g., fixed subframes, time slots, and symbol locations) in the downlink frame. In this way, the terminal device 110 may perform a correlation operation on the received signal in a single subframe and the synchronization sequences in the known synchronization sequence set one by one at the carrier center, and the peak position of the correlation then corresponds to the position of the synchronization signal in the downlink frame, whereby the terminal device 110 may obtain downlink cell synchronization.

After obtaining downlink cell synchronization, the terminal device 110 may receive system information of the cell at an appropriate position in the downlink frame. The system information can be periodically broadcasted by the base station 120 through a channel for broadcasting (e.g., broadcast channel PBCH, shared channel PDSCH, etc.), and can include information necessary for the terminal device 110 to access the base station 120, such as RA related information.

Thereafter, in order to obtain uplink cell synchronization, the terminal device 110 needs to perform a RA process. An exemplary RA process operates as follows. At 102, the terminal device 110 may notify the base station 120 of its access behavior by transmitting a RA preamble (e.g., included in the MSG-1) to the base station 120. The transmission of the RA preamble enables the base station 120 to estimate the uplink timing advance (TA) of the terminal device. At 103, the base station 120 may notify the terminal device 110 of the above timing advance by transmitting a RA response (e.g., included in the MSG-2) to the terminal device 110. The terminal device 110 may implement uplink cell synchronization by this timing advance. The RA response can also include information of the uplink resource, and the terminal device 110 may use the uplink resource in the following operation 104. For a contention-based RA process, at 104, the terminal device 110 may transmit the terminal device identification and possibly other information (e.g., included in the MSG-3) through the above scheduled uplink resources. The base station 120 can determine the contention resolution result by the terminal device identification. At 105, base station 120 can inform terminal device 110 of the contention resolution result (e.g., included in MSG-4). At this time, if the contention succeeds, the terminal device 110 successfully accesses the base station 120, and the RA process ends; otherwise, the terminal device 110 needs to repeat operations 102 to 105 of the RA process. In one example, after the RA process succeeds, the initial connection/synchronization process between the terminal device and the base station can be considered to be complete, and the terminal device may perform subsequent communication with the base station.

Overview of Beamforming and Beam Scanning

Beamforming generally refers to in consideration of the strong directivity of the antenna transmission and/or reception, so that each transmit beam and/or receive beam is limited to pointing a specific direction and beam coverage, and the coverage of each beam is narrower than the full-width beam, but the gain of the beam increases. These transmit beams and/or receive beams may be approximately combined into a full-width beam. A full-width beam may refer to a beam without beamforming, i.e. its beamwidth is not narrowed by beamforming processing. For example, the beam of an omnidirectional antenna can be considered to be a full-width beam. In some instances of physical implementation, the communication device at the transmitting end has a plurality of radio frequency links, each of which is connected to a plurality of antennas and their phase shifters, and the signals on each radio frequency link are superimposedly transmitted into the air by the plurality of antennas with different phases to form a transmit beam. The control unit of the communication device at transmitting end determines the phase values of the corresponding plurality of antennas according to the target transmit beam direction, and configures respective phase shifters, thereby controlling the transmit beamforming. Accordingly, the communication device at receiving end has one or more radio frequency links, each of which is connected to a plurality of antennas and their phase shifters, and the radio signals in the air are superimposedly received by the plurality of antennas having different phases into the RF link to form a receive beam. The control unit of the communication device at receiving end determines the phase values of the corresponding plurality of antennas according to the target receive beam direction, and configures respective phase shifters, thereby controlling the receive beamforming. In some examples, control units of communication devices configure phase shifters of a plurality of antennas of each radio frequency link according to a predetermined codebook. The codebook comprises a plurality of codewords, each codeword corresponding to one beam direction, indicating a phase combination of phase shifters.

In beamforming, due to the strong directivity of antenna transmission and/or reception, paired transmit and receive beams are needed in the downlink or uplink to ensure beamforming gain is achieved. Therefore, such paired transmit and receive beams in the downlink or uplink can be collected and maintained, that is, beam management is performed. Beam management involves two important aspects, namely beam scanning and scanning result interaction. The beam scanning can include a transmit beam scan and a receive beam scan, which refer to transmit and receive, respectively, different beams in a predetermined manner over a period of time to cover a certain spatial region, thereby finding transmit and receive beams suitable for a certain azimuth spatial region. Taking downlink as an example, since one terminal device is usually located at a specific orientation of the base station, there is usually only one (or more) specific transmit beams at the base station side suitable for communicating with the terminal device. There is also usually one (or more) receive beams that mate with the specific transmit beam at the terminal side. The terminal device may report the specific transmit beam of the base station side mating with it to the base station by using the scan result report. In the transceiving of synchronization signals, a pair of matching transmit and receive beams may refer to transmit and receive beam pairs that cause correlation results of synchronization sequence correlation operations when the synchronization signal is received to conform to a certain threshold level. It will be understood that in subsequent transceiving of data, the communication quality (e.g., received signal strength (such as RSRP), signal to interference and noise ratio (such as CQI), bit error rate (such as BER, BLER), etc.) via the pair of transmit and receive beams may also conform to certain communication quality demands.

Figure 2A:
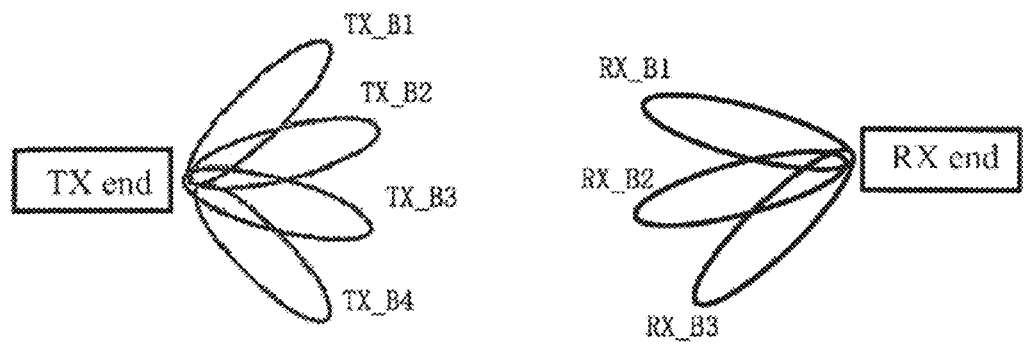
FIGS. 2A-2D depict an exemplary beam scanning process in beamforming techniques.
Figure 2B:
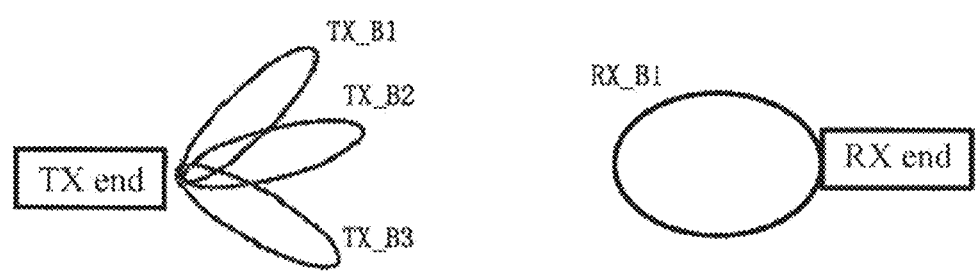
Figure 2C:
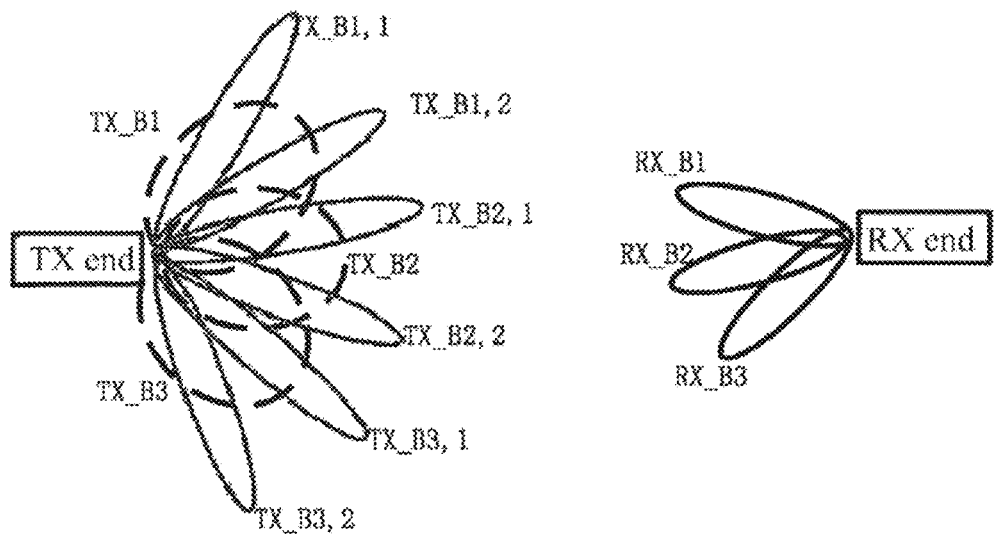
Figure 2D:
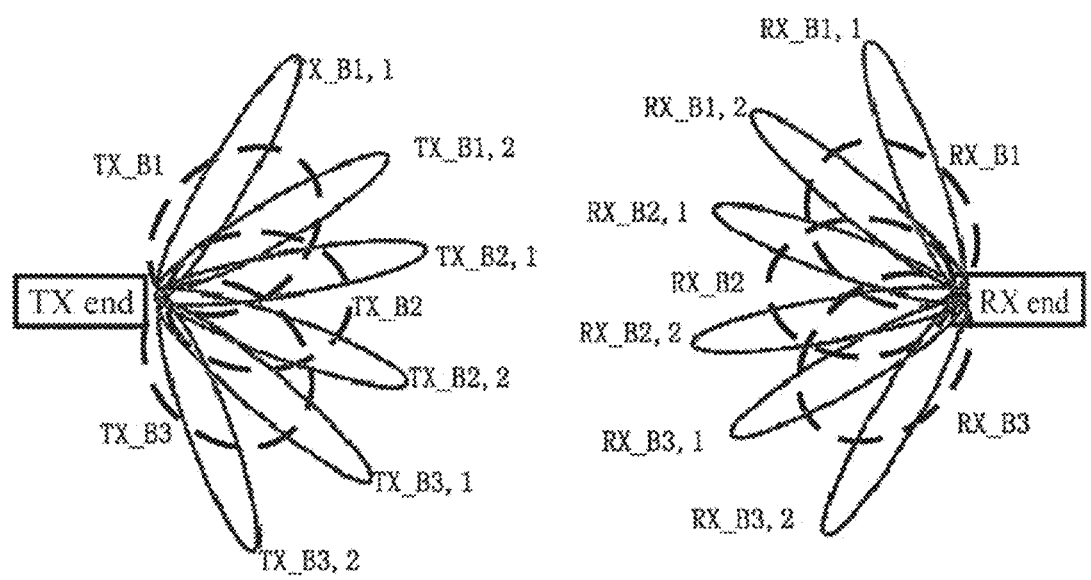

Beam scanning in beamforming techniques is described below in conjunction with FIGS. 2A-2D. In beamforming, the transmitting end can perform transmit beam scanning through a plurality of transmit beams. In the example of FIG. 2A, the transmitting end is provided with four transmit beams, and in the example of FIG. 2B, the transmitting end is provided with three transmit beams. The receiving end may or may not use receive beamforming depending on the configuration or application requirements. In the example of FIG. 2A, the receiving end uses receive beamforming and performs receive beam scanning through three receive beams. In the example of FIG. 2B, the receiving end does not use receive beamforming and is only provided with one full-width receive beam. In beamforming, the transmitting end and/or the receiving end may also be provided with hierarchical transmit beams, such as first level transmit beams (also called coarse transmit beams) and second level transmit beams (also called fine transmit beams). In the example of FIG. 2C, the transmitting end is provided with three first level transmit beams (i.e., TX_B1 to TX_B3), and each first level transmit beam is further provided with two second level transmit beams (e.g., two fine transmit beams of TX_B1 are TX_B1, 1 and TX_B1, 2, and the rest are similar.) In the example of FIG. 2D, both the transmitting end and the receiving end are provided with hierarchical transmit beam. In FIG. 2D, the transmit beams of the transmitting end are similar to those of FIG. 2C, and the receiving end is provided with three first level receive beams (i.e., RX_B1 to RX_B3), and each first level receive beam is further provided with two second level receive beams (for example, the two fine transmit beams of RX_B1 are RX_B1, 1 and RX_B1, 2, and the rest are similar). As shown in FIG. 2C and FIG. 2D, the beamwidth of the coarse transmit beam can be wider than that of the fine transmit beam, and the gain of the fine transmit beam can be larger than that of the coarse transmit beam.

In the beam scanning process, the transmitting end may perform transmit beam transmission one by one (i.e., transmit beam scanning). For example, considering situations of the receiving end, each transmit beam can be transmitted once or repetitively transmitted multiple times. The transmission of each transmit beam may be received at the receiving end one by one by using receive beams (i.e., receive beam scanning) to determine matching transmit and receive beams pairs. For example, in the example of FIG. 2A, the transmitting end can first repetitively transmit three times using the transmit beam TX_B1. Accordingly, the receiving end can receive the corresponding one transmission using the receive beams RX_B1 to RX_B3 one by one, and derive the respective correlation of synchronization sequences. Next, the transmitting end can repetitively transmit three times using the transmit beam TX_B2, and the receiving end can receive the corresponding one transmission using the receive beams RX_B1 to RX_B3 one by one and derive the respective correlation of synchronization sequences. After the transmitting end repetitively transmits using the transmit beams TX_B3 and TX_B4, the receiving end can determine the matching transmit and receive beams pair based on the derived correlation of synchronization sequences. Thus, subsequent communication between the transmitting end and the receiving end can be performed using this transmit and receive beams pair. The number of repetitive transmissions of each transmit beam in the above example can be an integer multiple of the number of receive beams. In the case that the receiving end has multiple radio frequency links so that multiple receive beams can be used for receiving simultaneously, the transmitting end does not have to repetitively transmit each transmit beam, but only sequentially transmit TX_B1-TX_B4. FIG. 2B is an example in which the receiving end does not use receive beamforming. In FIG. 2B, for each transmission at the transmitting end, the terminal device receives using a full-width receive beam and determines respective synchronization sequence correlation to determine a transmit beam that matches the full-width receive beam. Thus, in subsequent communications between the transmitting end and the receiving end, the transmitting end will communicate using the determined transmit beam.

In the case of hierarchical transmit beams in FIG. 2C, a matching first level transmit beam can be determined first, followed by determining a matching second level transmit beam under the matching first level transmit beam. For example, the transmitting end can first perform a first level transmit beam scanning, and the receiving end may determine a first level transmit beam matching thereto in a similar manner as described above. When the transmitting end performs beam scanning through the second level transmit beams under the matching first level transmit beam, the receiving end can similarly determine the second level transmit beam matching thereto. The second level transmit beam and the matching receive beam are thus ultimately determined as matching transmit and receive beams pair for use in subsequent communication. According to an exemplary implementation, when beam scanning is performed through the second level transmit beams, the receiving end can directly use the matching receive beam determined when beam scanning is performed through the first level transmit beams as the receive beam for receiving and determining, instead of all receive beams, thus reducing beam scanning overhead.

In the case where the transmit beams and the receive beams are both hierarchical in FIG. 2D, in the beam scanning, the transmitting end can first perform the first level transmit beam scanning, and the receiving end can receive using the corresponding first level receive beams, thereby determining the matching first level transmit beam and the first level receive beam in a similar manner as described above. When the transmitting end performs beam scanning through the second level transmit beams under the matching first level transmit beam, the reception can be made at the receiving end by using the second level receive beams under the corresponding matching first level receive beam, thus the matching second level transmit beam and second level receive beam are determined in a similar manner as described above as matching transmit and receive beams pair for use in subsequent communication.

It should be understood that in downlink communication, the transmitting end can correspond to the base station 120 and the receiving end can correspond to the terminal device 110. In uplink communication, the transmitting end may correspond to the terminal device 110, and the receiving end may correspond to the base station 120. In an embodiment herein, in the case where the matching transmit and receive beams in the uplink correspond to (e.g., are the same as) the matching receive and transmit beams in the downlink, the transmit and receive beams pair in the uplink and downlink are referred to has symmetry. The symmetry means that, in terms of matching with the terminal device 110, the transmit beam of the base station corresponds to the receive beam of the base station 120, and the matching corresponding receive beam (or transmit beam) can be determined according to the matching transmit beam (or receive beam) of the base station side. In terms of matching with the base station 120, the situation at the side of the terminal device 110 is similar.

Application of Beamforming Techniques in Synchronization Signals Transceiving

The application of the beamforming techniques in transceiving of the aforementioned synchronization signals will be briefly described below. In the field of wireless communications, beamforming techniques have been used to transmit data signals. According to an embodiment herein, beamforming can be used to transmit synchronization signals. For example, base station 120 can transmit synchronization signals using transmit beamforming to compensate for the loss of the synchronization signal to ensure that terminal device 110 properly performs downlink synchronization and RA process. The technical solution according to the present disclosure can be used in various communication frequency bands, including conventional radio frequency communication bands ranging from several hundred MHz to several GHz. As frequency bands in wireless communication systems increase, for example using bands of 26 GHz, 60 GHz or higher, radio channels will experience greater negative effects such as path losses, atmospheric absorption losses, etc. than low frequency bands (e.g., 2 GHz). Therefore, the technical solution according to the present disclosure is equally applicable to, and even more important for, high frequency band (for example, millimeter wave) communication.

In some embodiments herein, the transmission of the synchronization signal can indicate information of the transmit beam used to transmit the synchronization signal, such that the terminal device can obtain the information of the transmit beam by receiving the synchronization signal, such that beam scanning during subsequent data transmission is simplified and speeded up. According to some embodiments herein, the synchronization signal can be repetitively transmitted to a plurality of terminal devices including the terminal device by the base station using different transmit beams based on the transmit beam configuration, and the synchronization signal can comprise information of the transmit beam used to transmit the synchronization signal, as described herein below. For example, in some embodiments using beamforming techniques to transmit synchronization signals, considering that base station 120 will repetitively transmit synchronization signals in a plurality of different transmit beams, the synchronization signal time windows in the downlink frame are redesigned, as will be described in detail herein later. The repetition pattern of multiple transmit beams in the transmit beam scanning can be represented by a transmit beam configuration, and a synchronization signal can be transmitted based on the transmit beam configuration.

The terminal device can receive the synchronization signal in a variety of ways. Upon receiving the synchronization signal, the terminal device can determine at least the transmit beam of the base station that matches with the terminal device and feed back the matching transmit beam to the base station by any suitable ways, including ways described below in present disclosure and any other ways. At least the matching transmit beam of the base station can be used for subsequent communication between the base station and the terminal device (including a RA process and a data transceiving process).

In one embodiment, the terminal device 110 can not use receive beamforming when receiving the synchronization signal, thus reaching a compromise between fast synchronization and reduced subsequent beam scanning overhead. At this time, it can be considered that the terminal device 110 receives the synchronization signal transmitted by each of the transmit beams at the base station side with its own full-width beam, and feeds back the transmit beam of the base station side that matches with the full-width beam to the base station 120 when the synchronization signal is successfully received. In another embodiment, the terminal device 110 can alternatively use receive beamforming when receiving the synchronization signal, thus resisting fading of the high frequency synchronization signal and saving subsequent beam scanning overhead. At this time, the receive beam at the terminal device side and the transmit beam at the base station side that are matched when the synchronization signal is successfully received can be determined, and the matching transmit beam can be fed back to the base station 120. The matching transmit and receive beams pair will be used directly or indirectly for subsequent communications between the base station 120 and the terminal device 110 (including RA processes and data transceiving processes). For example, the base station 120 and the terminal device 110 use the same beams for data transceiving as the matching transmit beam and the receive beam for the synchronization signal, in other words, the beamforming codebooks of the synchronization signal and the data signal are the same. For another example, the base station 120 and the terminal device 110 use the matching transmit beam and the receive beam for the synchronization signal as the first level beam pair, and perform a second level beam scan within the coverage range of the first level beam pair to determine finer receive and transmit beam pair for used in data transceiving, in other words, the beamforming codebooks of the synchronization signal and the data signal are different, and the beamforming codebook of the data signal is a subset of the beamforming codebook of the synchronization signal.

In some embodiments, where the terminal device also employs beamforming techniques to receive the synchronization signal, the terminal device may also set the receive beam of the terminal device to receive the synchronization signal based on the transmit beam configuration used to transmit the synchronization signal by the base station (e.g., how many transmit beams in total, number of repetitions per transmit beam). For example, since the terminal device 110 needs to perform receive beam scanning, that is, using different receive beams to receive signals transmitted by the base station side through the same transmit beam, the terminal device 110 may need to know the transmit beam configuration of the base station 120. In one example, the transmit beam configuration of base station 120 can be informed to the terminal device in advance. For example, the terminal device can simultaneously obtain the services of the base station 120 and another base station (for example, an LTE eNB) that does not perform beamforming transceiving by way of dual connectivity, and the terminal device 110 can obtain information the transmit beam configuration of the base station 120 from the another base station. Specifically, the terminal device 110 first accesses the another base station (which may be referred to as a primary base station) according to a conventional manner, and the primary base station requests the base station 120 to add it as a secondary base station to the terminal device 110 via, for example, an Xn interface, and the base station 120 feeds back a confirmation of the secondary base station addition request to the primary base station, which includes information of transmit beam configuration for synchronization signal of base station 120, and may also include RA configuration information in some examples. Next, the primary base station provides such information, for example, included in a radio resource control connection reconfiguration message, to the terminal device 110 for completion of synchronization with the base station 120. In another example, the terminal device 110 can obtain the transmit beam configuration of the base station 120 from the synchronization signal transmitted by the base station 120. For example, the terminal device 110 can estimate the transmit beam configuration of the base station 120 by the measurement process of the synchronization signal.

Report of Beam Scanning Results

The feedback of the matching transmit beam at the base station side by the terminal device will be briefly described below. In an embodiment herein, in order for the terminal device 110 to be able to feed back the matching transmit beam at the base station side to the base station 120, it is necessary to indicate the transmit beam in some manner. The matching transmit beam at the base station side can be indicated in an implicit or explicit manner, thereby reporting beam scanning results. This report of beam scanning results can be included in the RA process performed by the terminal device. According to some embodiments, of course, the feedback related to the transmit beam at the base station side can be transmitted separately from the RA preamble, for example, before or after the RA preamble.

According to some embodiments herein, transmitting the RA preamble by the terminal device can indicate a transmit beam at the base station side in the downlink that matches with the reception behavior at the terminal device side, as described herein below. For example, in a case where the terminal device uses receive beamforming, transmitting a RA preamble by the terminal device can indicate a transmit beam at the base station side in the downlink that matches with the receive beam at the terminal device side; and in a case where the terminal device does not use receive beamforming, transmitting a RA preamble by the terminal device can indicate a transmit beam at the base station side in the downlink that matches with the reception behavior at the terminal device side that does not use beamforming.

In some embodiments, the terminal device 110 transmits a RA preamble based on the RA configuration information, to indicate a transmit beam at the base station side in the downlink that matches with the receive beam at the terminal device side. In some embodiments, the RA configuration information can include a correspondence between a receive beam at the base station side and a plurality of RA time windows. In one embodiment, the correspondence may include a correspondence between multiple levels of receive beams at the base station side and multiple RA time windows. The terminal device 110 can transmit a RA preamble based on this correspondence. In one example, the base station can identify the corresponding transmit beam at the base station side by receiving the RA preamble in a particular time window. This is one example of indicating a matching transmit beam at the base station side in an implicit manner.

In some embodiments, a transmit beam at the base station side that matches with the receive beam at the terminal device side in the downlink can also be indicated by an uplink message subsequent to a RA preamble, for example an additional bit or the like, this is one example of an explicit manner.

A first aspect in accordance with the present disclosure, which primarily discloses transceiving of a synchronization signal in accordance with an embodiment herein, is described below in conjunction with FIGS. 3A through 14. According to some embodiments, the synchronization signal is transmitted from the base station side to the terminal device side by beamforming, and the terminal device receives the synchronization signal, and obtains information of the transmit beam used to transmit the synchronization signal by the base station. Thereafter, the terminal device feeds back the obtained transmit beam information back to the base station, whereby the base station can learn from the feedback the transmit beam which it uses to transmit the synchronization signal, for subsequent communication use. According to some embodiments, the operations according to the first aspect of the present disclosure can be performed by electronic devices for the base station side and the terminal device side. The operation according to the first aspect of the present disclosure will be described in detail below.

Example of Electronic Device for Base Station Side

Figure 3A:
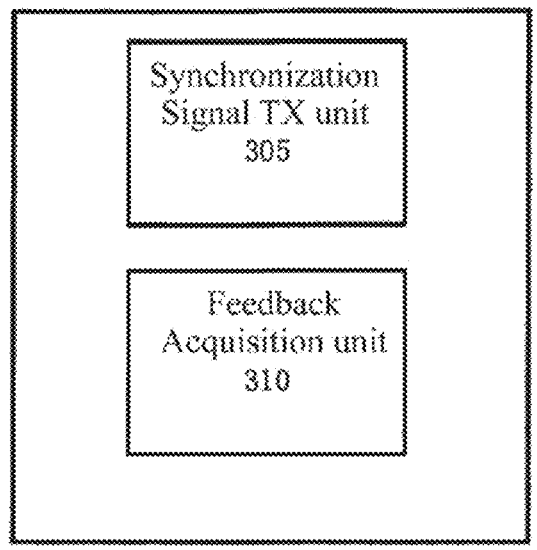
FIG. 3A illustrates an exemplary electronic device for a base station side in accordance with an embodiment herein.

FIG. 3A illustrates an exemplary electronic device for a base station side in accordance with an embodiment herein, where the base station can be used in various wireless communication systems. The electronic device 300A shown in FIG. 3A can include various units to implement the first general aspect in accordance with the present disclosure. As shown in FIG. 3A, the electronic device 300A may include, for example, a synchronization signal transmitting unit 305 and a feedback acquisition unit 310. According to one implementation, the electronic device 300A may be, for example, the base station 120 in FIG. 1 or may be part of the base station 120, or may also be a device for controlling a base station (for example, a base station controller) or a device for a base station or a portion of them. The various operations described below in connection with the base station can all be implemented by units 305, 310 or other units of electronic device 300A.

In some embodiments, the synchronization signal transmitting unit 305 can be configured to transmit a synchronization signal to the terminal device by beamforming, to indicate information of the transmit beam used to transmit the synchronization signal. The synchronization signal transmitting unit 305 can repetitively transmit the synchronization signal to the terminal device using different transmit beams based on the transmit beam configuration, the synchronization signal includes information of the transmit beam used to transmit the synchronization signal. In one example, the synchronization signal per se may include or indicate information of the transmit beam used to transmit the synchronization signal. In another example, transmission resources, such as frequency and time parameters, used to transmit the synchronization signal may indicate the above-described information of the transmit beam. In some embodiments, information of the transmit beam can include transmit beam IDs, each transmit beam ID corresponds to a particular oriented transmit beam.

In some embodiments, the feedback acquisition unit 310 can be configured to obtain feedback from the terminal device, the feedback includes information of the transmit beam for using in transmit beam management. The transmit beam corresponding to information of the transmit beam may be a transmit beam that matches with reception at the terminal device or that is with a highest degree of such matching. In one example, the feedback acquisition unit 310 can directly receive feedback sent from the terminal device. In another example, the feedback acquisition unit 310 can obtain feedback of the terminal device from another base station via, for example, the Xn interface, such as from the primary base station in the dual connectivity scenario described above. The feedback and the process of providing feedback will be described in detail below. The electronic device 300A can obtain information of the transmit beam, such as a transmit beam ID, from the feedback. The transmit beam represented by the transmit beam ID is a transmit beam that matches with reception at the terminal device, and the electronic device 300A can manage the transmit beam matching with each terminal device, for using the transmit beam in subsequent downlink communication with the terminal device.

Example of Electronic Device for Terminal Device Side

Figure 3B:
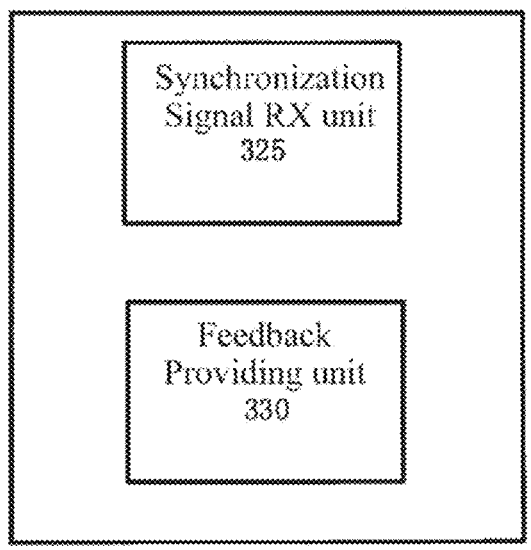
FIG. 3B illustrates an exemplary electronic device for a terminal device side in accordance with an embodiment herein.

FIG. 3B illustrates an exemplary electronic device for a terminal device side in accordance with an embodiment herein, where the terminal device can be used in various wireless communication systems. The electronic device 300B shown in FIG. 3B can include various units to implement the first general aspect in accordance with the present disclosure. As shown in FIG. 3B, in one embodiment, the electronic device 300B may include a synchronization signal receiving unit 325 and a feedback providing unit 330. According to one implementation, the electronic device 300B may be, for example, the terminal device 110 of FIG. 1 or may be part of the terminal device 110. The various operations described below in connection with the terminal device can all be implemented by units 325, 330 or other units of the electronic device 300B.

In some embodiments, the synchronization signal receiving unit 325 can be configured to receive a synchronization signal to obtain information of the transmit beam used to transmit the synchronization signal by the base station based on the received synchronization signal. In one embodiment, the synchronization signal receiving unit 325 can be configured to receive the synchronization signal based on a transmit beam configuration of the base station side of the wireless communication system. Alternatively or additionally, the synchronization signal receiving unit 325 can obtain the above-described information of the transmit beam based on a transmission resource, such as time or frequency parameters, used to transmit the synchronization signal. In some embodiments, information of the transmit beam can include a transmit beam ID.

In some embodiments, the feedback providing unit 330 can be configured to provide feedback to the base station, and the feedback can include or indicate information of the transmit beam for being used by the base station in transmit beam management. In one example, the transmit beam corresponding to the feedback information of the transmit beam is the transmit beam that matches with reception at the electronic device 300B or that is with a highest degree of such matching (e.g., determined based on synchronization signal transceiving). In one example, feedback providing unit 330 can send the feedback directly to the base station that has transmitted the synchronization signal to electronic device 300B. In another example, feedback providing unit 330 can forward the feedback to the base station via another base station (e.g., via the primary base station in the dual connectivity scenario).

A synchronization signal and its transceiving according to an embodiment herein will be described in detail below, wherein the synchronization signal can include or indicate information of the transmit beam transmitted by a base station. For example, the synchronization signal per se may indicate information of the transmit beam which transmits the synchronization signal by utilizing different synchronization sequences or by including different additional bits, or the particular transmission mode of the synchronization signal can indicate information of the transmit beam which transmits the synchronization signal.

Example of Synchronization Signal

According to an embodiment herein, the synchronization signals transmitted by the base station can be of different types. Each type of synchronization signal can generally include corresponding synchronization signal sequence. In some embodiments, the synchronization signal can include at least a PSS and a SSS. In other embodiments, the synchronization signal may further include a tertiary synchronization signal (TSS). In general, a synchronization signal needs to be transmitted on a time-frequency domain resource. In some embodiments, a plurality of synchronization signals can be continuous in time domain; in other embodiments, the plurality of synchronization signals can be discontinuous in time domain. In some embodiments, the plurality of synchronization signals can be continuous in frequency domain; in other embodiments, the plurality of synchronization signals can be discontinuous in frequency domain.

Figure 4A:
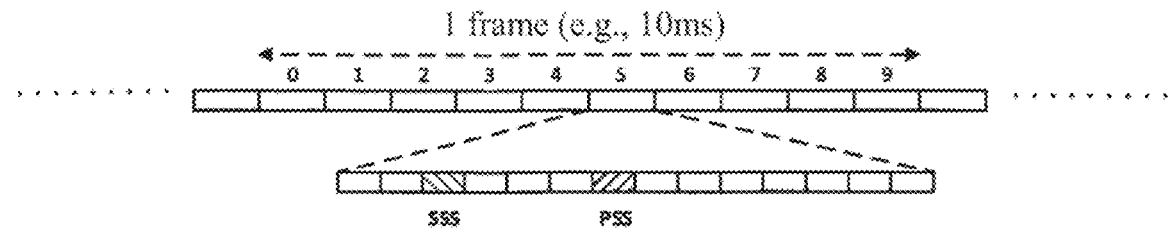
FIGS. 4A-4D illustrate exemplary time domain frequency domain resources for a synchronization signal in accordance with an embodiment herein.
Figure 4B:
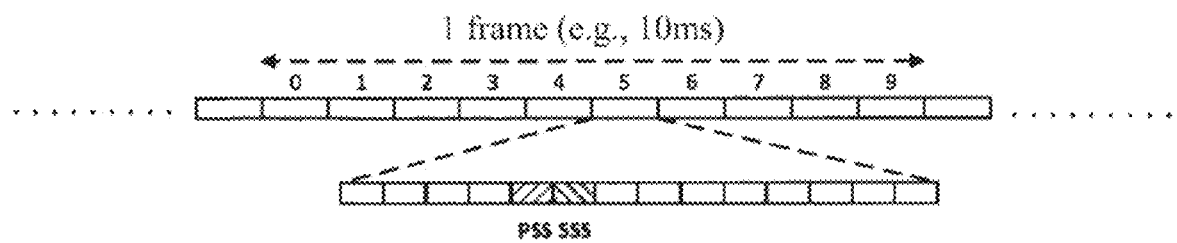

FIGS. 4A-4D illustrate exemplary time-frequency domain resources for a synchronization signal in accordance with an embodiment herein. In some embodiments, the frequency domain resources used for transmitting the synchronization signal can be relatively fixed, such as can be a number of resource blocks or subcarriers in the center of the frequency band, and the respective time domain resources can be located at predetermined positions in the downlink frame. As shown in FIGS. 4A and 4B, taking the frame structure in the LTE system as an example, the frequency domain resources used for transmitting the PSS and the SSS can be a number of (for example, six) resource blocks (not specifically shown) in the center of the frequency band, and the time domain resource for transmitting the PSS can be located at one OFDM symbol of a first time slot of a subframe, the frame number of which is 5, in one downlink frame, and the time domain resource for transmitting the SSS can be located at another OFDM symbol of the first time slot of the subframe in the downlink frame. In the example of FIG. 4A, the PSS and the SSS are discontinuous in time domain. FIG. 4B is similar to FIG. 4A, with the exception that the PSS and the SSS in the example of FIG. 4B are continuous in time domain. As is known, the frames including a plurality of subframes shown in FIGS. 4A and 4B are repeated in time domain, and each frame can have a radio frame number, which number has a certain period. For example, in the LTE system, the radio frame number is also referred to as system frame number (SFN), which has a period of 1024, and each frame can be identified within a range of 1024 frames.

Figure 4C:
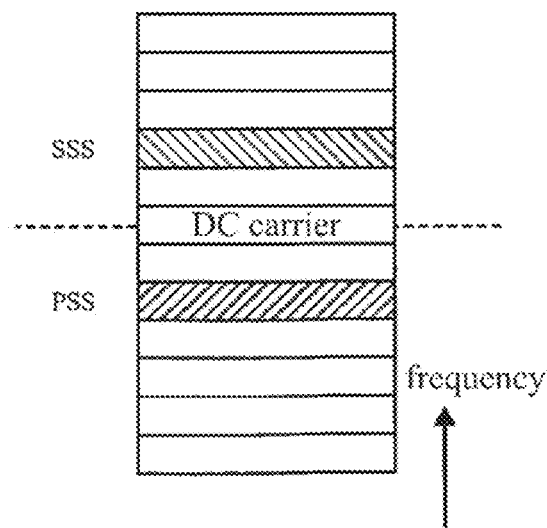

As shown in FIG. 4C, one frequency domain resource block can be used to transmit the PSS, and another frequency domain resource block can be used to transmit the SSS. In the example of FIG. 4C, the PSS and the SSS are discontinuous in frequency domain. See FIG. 4D (i.e., arrangements (1) through (5)) for more arrangements of different types of synchronization signals over time-frequency domain resources.

Further, as shown in FIGS. 4A and 4B, time domain resources for transmitting different types of synchronization signals can have a certain positional relationship. The positional relationship can include the order between time domain resources. For example, in FIG. 4A, the symbol for the SSS precedes the symbol for the PSS; whereas in FIG. 4B, the symbol for the PSS precedes the symbol for the SSS. Alternatively or additionally, the positional relationship can include an interval between time domain resources. For example, the symbols for the PSS and the SSS in FIG. 4A are separated by 3 symbols; whereas the symbols for the PSS and the SSS in FIG. 4B are not separated (0 symbols therebetween). Although not specifically described herein, it should be understood that frequency domain resource blocks for transmitting different types of synchronization signals can also have similar positional relationships. Moreover, the positional relationship can also be a combined time domain and frequency domain positional relationship. In some embodiments, system information can be represented by relative positions of different types of synchronization signals in the time or frequency domain. In one example, the system information can include at least one of a duplex type of a wireless communication system and a different cyclic prefix length. For example, the order of the PSS and the SSS can represent a duplex type (e.g., the PSS preceding represents TDD, and succeeding represents FDD), and the intervals between the PSS and the SSS can represent different cyclic prefix lengths (e.g., an interval of 3 symbols represents an extended cyclic prefix, etc.).

Figure 4D:
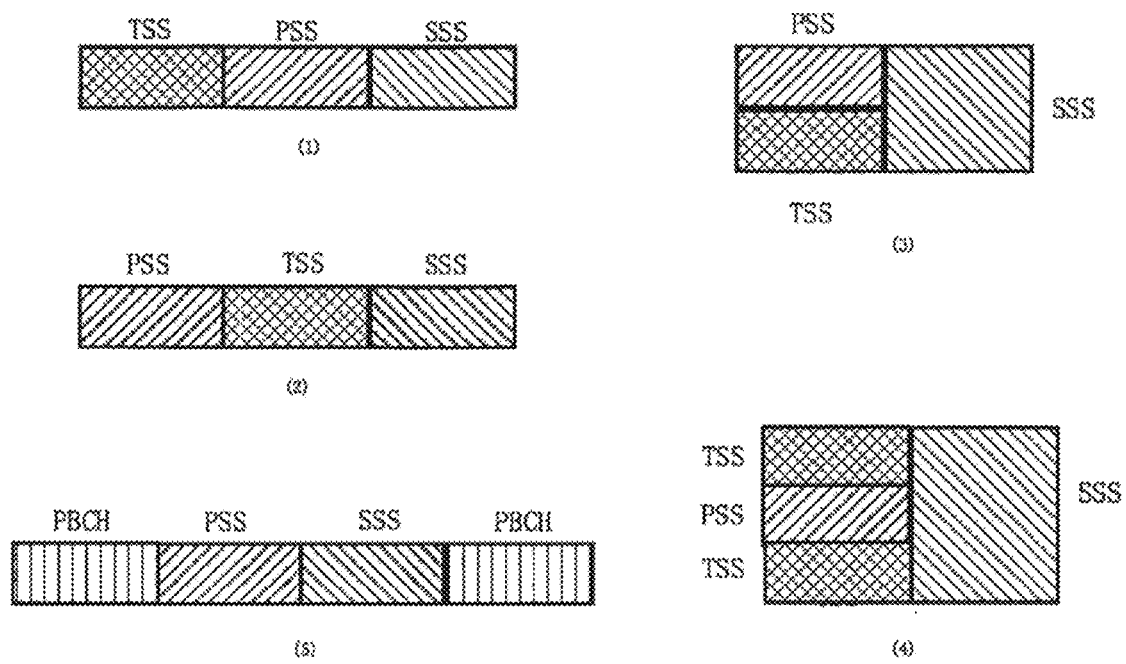

FIG. 4D illustrates five exemplary arrangements of synchronization signals over time-frequency domain resources (horizontal direction represents the time domain and vertical direction represents the frequency domain). As described previously, the positional relationship (time domain, frequency domain, or a combination thereof) between different types of synchronization signals in these arrangements can represent different system information. The exemplary arrangements in FIG. 4D have in common that individual synchronization signals are continuous, i.e., continuous in the time domain, frequency domain or time-frequency domain. It can be considered that these different types of continuous synchronization signals form a synchronization signal block (SS Block, SSB). Synchronization signals can be carried in each synchronization signal block and transmitted repetitively. For a given frequency band, the synchronization signal block can correspond to N OFDM symbols based on default subcarrier spacing, where N is a constant. The terminal device can obtain at least a slot index and a symbol (e.g., OFDM symbol) index in the radio frame from the synchronization signal block. In one example, the synchronization signal block can also include a channel for broadcasting from which the terminal device obtains the radio frame number. For example, in arrangement (5), the synchronization signal block can also include a PBCH broadcast channel.

According to some embodiments herein, the synchronization information can include information of the transmit beam used to transmit the synchronization signal by the base station. For example, different synchronization signal blocks can include different synchronization signal content (e.g., different synchronization signal sequences or different additional information bits) to indicate information of the transmit beam (transmit beam ID) used to transmit the synchronization signal block.

Figure 5A:
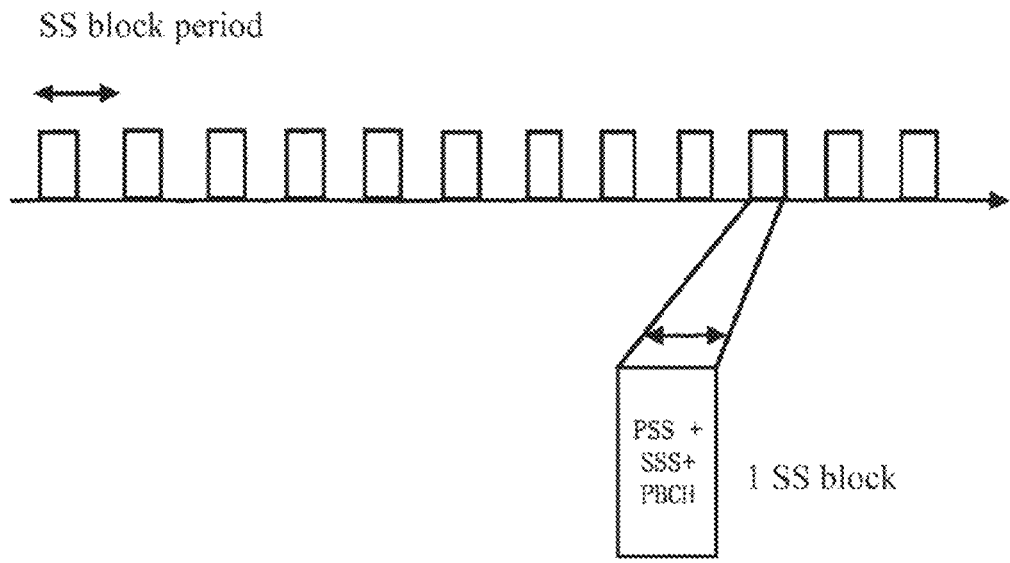
FIGS. 5A and 5B illustrate an exemplary synchronization signal time window in accordance with an embodiment herein.

Example of Transmission Time Window for Synchronization Signals/Synchronization Signal Blocks In general, synchronization signals can be transmitted in specific time windows in the downlink frames, which time windows can be arranged in certain time periods or in a time pattern. These time windows can correspond to particular transceiving occasions of the synchronization signals/synchronization signal blocks. In an embodiment herein, since beamforming is used to transmit synchronization signals, more transmission windows for synchronization signals are needed for: 1) transmitting using a plurality of different beams, and 2) repetitively transmitting using a single beam. Taking the transmission of SS blocks as an example, in some embodiments, time windows for a plurality of SS blocks can be scattered, i.e., discontinuous in the downlink frame. One respective example is seen from FIG. 5A. As shown in FIG. 5A, time windows for transmitting SS blocks are arranged at a certain period, and each SS block can comprise, for example, a PSS, a SSS, and a broadcast channel.

Figure 5B:
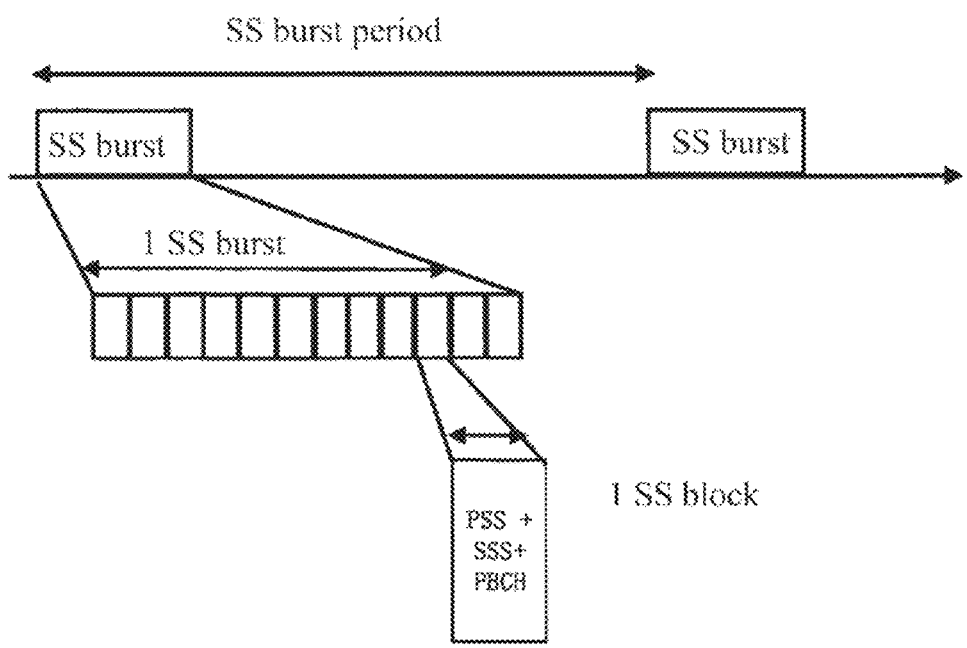

In some embodiments, multiple (e.g., 2, 4, 8, 12, 16) SS blocks can be made concentrated (i.e., continuous) in the time domain to form a synchronization signal burst (SS Burst), to transmit synchronization signals using transmit beamforming. In the time domain, the SS burst can include a plurality of continuous SS blocks. In one example, the length of the SS burst can be represented by the number of SS blocks included therein. Multiple SS bursts can be spaced by a certain interval in the time domain. Since a SS bursts can concentrate a plurality of SS blocks, enabling base stations and terminal devices to complete beam scanning faster while transceiving synchronization signals. One example of a SS burst is seen in FIG. 5B, where the length of the SS burst is 12. As shown in FIG. 5B, the 12 time windows for transmitting SS blocks are concentrated with each other to form one larger time window for the SS burst, and multiple larger time windows can be arranged in a certain period (such as SS burst period). Each SS block can also include, for example, a PSS, a SSS, and a broadcast channel.

In the wireless communication system, time windows for transmitting the synchronization signal are often designated to correspond to specific time parameters of the downlink frame. Thus, the SS burst, SS blocks, and synchronization signal in FIGS. 5A and 5B can be associated with the time parameters of the downlink frame via a time window, and example time parameters can include an OFDM symbol index, slot index in a radio frame and radio frame number, etc. For example, it can be determined that the SS burst, SS block or synchronization signal is located in a certain radio frame, and is specifically located at a certain OFDM symbol of a certain slot. That is, the terminal device can identify one or more of the OFDM symbol index, slot index in the radio frame, and the radio frame number based on reception of the SS block or the synchronization signal.

According to some embodiments herein, the manner in which the synchronization signal is transmitted (e.g., time window for transmission, time parameters, etc.) can indicate information of the transmit beam used to transmit the synchronization signal. For example, in some embodiments, these time parameters can be combined with a transmit beam configuration for identifying (e.g., by a terminal device) the transmit beam used to transmit the synchronization signal.

Synchronous Signals Transmission at Base Station Side

According to some embodiments, the base station can transmit synchronization signals based on a transmit beam configuration. As described previously, the repetition pattern of multiple transmit beams at the base station side can be represented by the transmit beam configuration. In general, in order to represent the repetition pattern of transmit beams, the transmit beam configuration may include or indicate information of at least two aspects, namely a number of transmit beams and a number of times each transmit beam can be used to repetitively transmit (e.g., synchronization signals). In some embodiments, the transmit beam configuration can also specify time parameters for at least one synchronization signal transmission.

In some embodiments, the transmit beam configuration can specify a number of transmit beams that can be used to transmit synchronization signals by the base station and a number of times each transmit beam can be consecutively used to transmit. FIGS. 6A and 6B illustrate an exemplary transmit beam configuration at the base station side in accordance with an embodiment herein. As shown in FIG. 6A, the transmit beam configuration 600A specifies that the base station side has 4 transmit beams TX_B1 to TX_B4 for transmitting synchronization signals, and can consecutively use each of the transmit beams three times to transmit synchronization signals. As shown in FIG. 6B, the transmit beam configuration 600B specifies that the base station side has 12 transmit beams TX_B1 to TX_B12 for transmitting synchronization signals, and can only use each of the transmit beams once to transmit synchronization signals. In some cases, the transmit beam configuration can be represented in the form of N (beams)×M (times). For example, the exemplary transmit beam configuration of four different transmit beams, each transmit beam repeated three times in FIG. 6A, can be referred to briefly as 4 (beams)×3 (times) configuration. Similarly, the example configuration in FIG. 6B can be referred to briefly as 12×1 configuration. These transmit beam configurations are only examples. In various embodiments, the number of transmit beams can be any number, and the number of repetitions can be one or more times. In a corresponding embodiment, electronic device 300A can transmit a synchronization signal using each of a plurality (e.g., 4 or 12) of transmit beams based on the transmit beam configuration, and consecutively transmit the synchronization signal using each transmit beam for a specified number of times (for example, 3 times or 1) (i.e., transmit beam scanning).

According to some embodiments herein, it is also possible to sequentially transmit the synchronization signal once using each transmit beam, and then repeat the process for a specified number of times, thereby performing transmit beam scanning.

In some embodiments, the transmit beam configuration can specify a number of transmit beams of different levels that can be used to transmit the synchronization signal by the base station and a number of times each transmit beam of different levels can be consecutively used to transmit. FIG. 6C illustrates an exemplary transmit beam configuration in the case of hierarchical transmit beams at the base station side, in accordance with an embodiment herein. It is assumed that there are four first level transmit beams at the base station side, and each first level transmit beam has two second level transmit beams. The first level of the transmit beam configuration can be, for example, as shown in FIG. 6A, and the second level of the transmit beam configuration can be, for example, as shown in FIG. 6C. The second level of the transmit beam configuration 600C specifies eight second level transmit beams TX_B1,1 to TX_B4,2 for transmitting synchronization signals, and each of the second level transmit beams can be consecutively used for three times to transmit synchronization signals. In some cases, the hierarchical transmit beam configuration can also be represented in the form of N (beams)×M (times). For example, the first level of the transmit beam configuration of FIG. 6C can be represented as 4 (beams)×3 (times) configuration, and the second level of the transmit beam configuration can be represented as 2 (beams)×3 times configuration (where "2" second level transmit beams correspond to a single first level transmit beam) or 8×3 configuration (where "8" second level transmit beams correspond to all the first level transmit beams).

In a corresponding embodiment, electronic device 300A can be configured to transmit a synchronization signal using each of said different levels of transmit beams and transmit the synchronization signal by consecutively using each transmit beam for specified number of times.

In some embodiments, the transmit beam configuration can also indicate correspondence between transmit beams at the base station side and a plurality of time windows for synchronization signals, such as by indicating correspondence between a particular transmission of a particular transmit beam and a time window for a synchronization signal. For example, transmit beam configuration 600A can specify a time window for a first transmission of the synchronization signal using the transmit beam TX_B1 (e.g., specify time parameters of the time window including a particular frame, subframe, time slot, and/or OFDM symbol, etc.). At this time, the electronic device 300A can transmit the synchronization signal using the transmit beam TX_B1 based on the time window/time parameters, and continue with the subsequent transmissions based on the arrangement of the time windows for synchronization signals and the transmit beam configuration. Accordingly, the electronic device 300B can determine the transmit beam used to transmit the synchronization signal based on the time window/time parameters when the synchronization signal is successfully received and on the transmit beam configuration. Specific examples can be referred to the following description of FIGS. 7A to 7D.

Figure 7A:
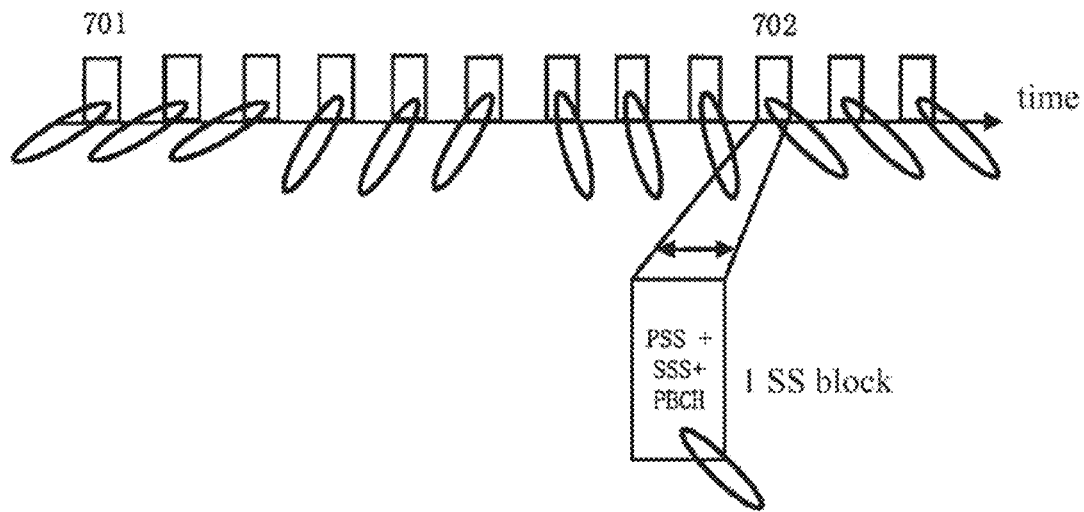
FIGS. 7A-7D illustrate an exemplary correspondence between a transmit beam and a synchronization signal time window in accordance with an embodiment herein.
Figure 7B:
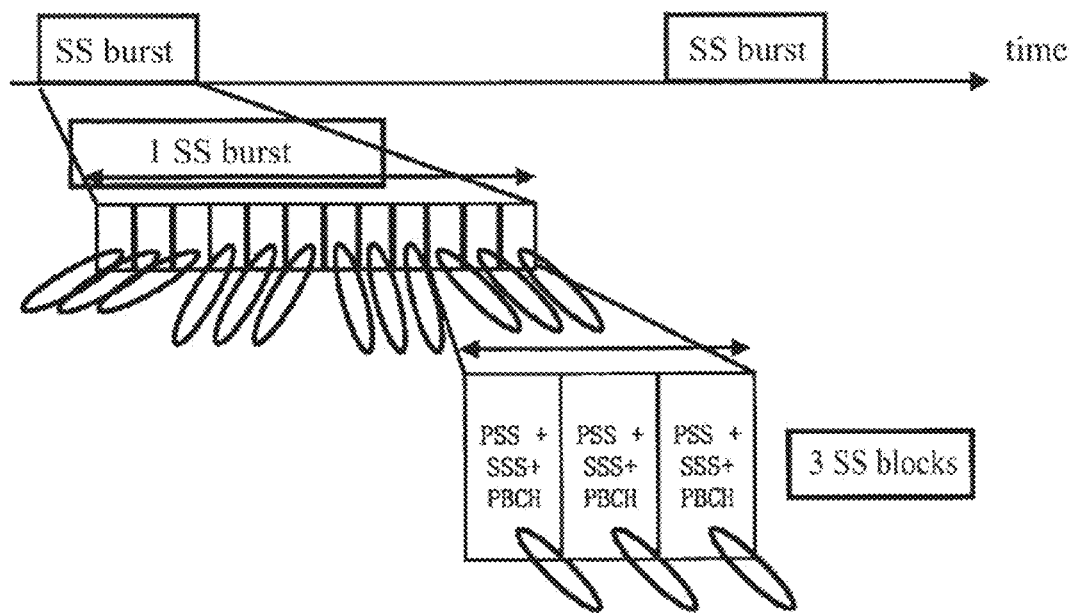

FIGS. 7A to 7D illustrate correspondence between transmit beams and SS blocks (or synchronization signals), according to an embodiment herein. FIGS. 7A and 7B illustrate exemplary correspondences in a configuration of 4 (beams)×3 times, in which FIG. 7A corresponds to a case where SS blocks are temporally dispersed, and FIG. 7B corresponds to a case where SS blocks form SS bursts.

In FIG. 7A, based on the correspondence between transmit beams at the base station side and a plurality of time windows for the synchronization signal, on each of the three SS block positions of the first group, the first transmit beam is used to transmit the SS block. On each of the three SS block positions of the second group, the second transmit beam is used to transmit the SS block. Next, on each of the SS block positions of the third group and the fourth group, the third and fourth transmit beams are used, respectively, to transmit the SS block. It is to be noted that FIG. 7A illustrates only one cycle of the exemplary beam configuration, and the above arrangement can be repeated at a later time to transmit the synchronization signals.

In FIG. 7B, the SS blocks are arranged as SS bursts in time domain, and the SS bursts can be transmitted based on a certain period. Thereto, the length of the SS burst is exactly 12 SS blocks, so it matches with the 12 transmissions of synchronization signal in the 4×3 configuration. In some embodiments, there may be cases where the length of the SS burst does not exactly match with the transmit beam configuration (e.g., SS bursts of length 15 may not exactly match with the configuration of 4×3), and this matching can be obtained by pre-configurations. In FIG. 7B, for the first SS burst, on each of the three SS block positions of the first group, the first transmit beam is used to transmit the SS blocks. On each of the three SS block positions of the second group, the second transmit beam is used to transmit the SS blocks. Next, on the SS block positions of the third group and the fourth group, the third and fourth transmit beams are used, respectively, to transmit the SS blocks. Thereafter, for the following SS bursts, the above arrangement is repeated to transmit the synchronization signals.

In addition to the configuration of 4 (beams)×3 (times), different transmit beam configurations can be selected as needed, for example, 6 (beams)×3 (times), 8 (beams)×2 (times), and the like. In particular, in the case of SS bursts, for example for a SS burst of length 12, there can be configurations of, for example, 2×6, 3×4, 6×2, 12×1. Moreover, there can be other lengths of SS bursts and corresponding transmit beam configurations (e.g., configuration of 5×3, SS bursts of length 15).

Figure 7C:
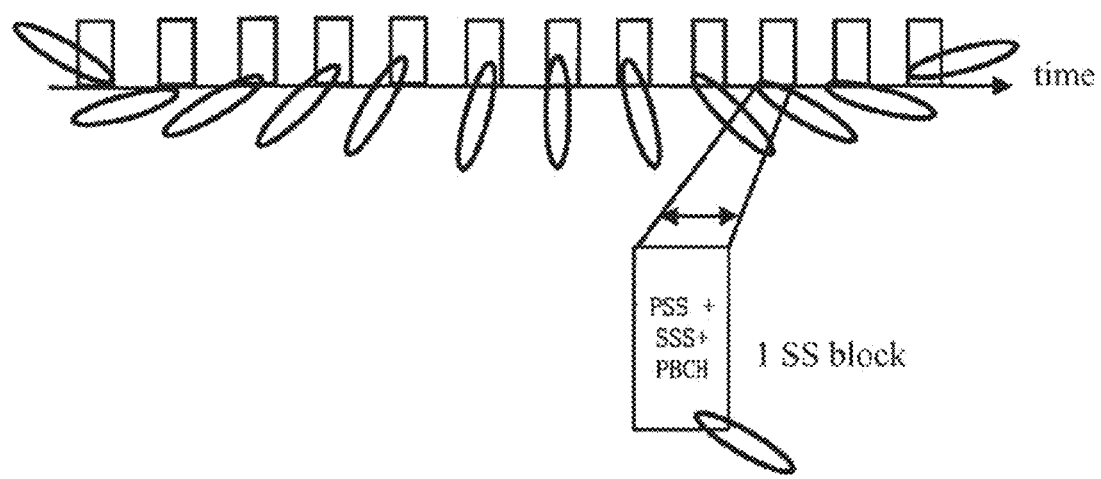
Figure 7D:
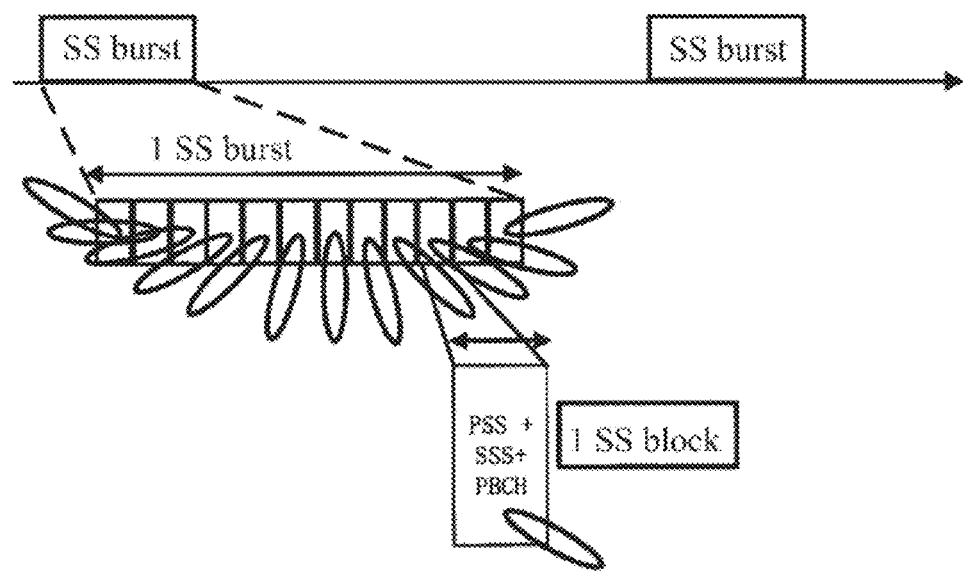

FIGS. 7C and 7D illustrate a configuration of 12 (beams)×1 (times). For the understanding of FIGS. 7C and 7D, reference can be made to the above description of FIGS. 7A and 7B, and description thereof will not be repeated herein. The choice of the transmit beam configurations is based on, for example, the number of transmit beams supported by the base station, the number of transmit beams supported by the terminal device, and the like. For example, in the case where the cell coverage is larger, the synchronization signal is required to be able to cover a further distance, thus a larger transmit beamforming gain at the base station side is required, and each transmit beamcan be relatively narrow, and accordingly, the larger the number of transmit beams can be. At this time, it is possible to select, for example, a configuration of 6×2 or 12×1. In contrast, in the case where the cell coverage is smaller, each transmit beam can be relatively wide, and accordingly, the less the number of transmit beams can be. In the case where there are more of receive beams at the terminal device, it is possible to select, for example, 2×6, 3×4 configurations. In the case where the terminal device uses a full-width receive beam, it is possible to select a 12×1 configuration. Since the synchronization signal transmit beam configuration of the base station is cell-specific rather than terminal device-specific, in some examples the base station can collect receive beamforming capabilities of its already served terminal devices, and set the transmit beam configuration in accordance with a fairness principle.

As described above, in the case where the correspondence between transmit beams at the base station side and time windows for the synchronization signal is known, the transmit beam used to transmit the synchronization signal can be determined based on the time windows/time parameters when the synchronization signal is successfully received and the transmit beam configuration. Taking FIG. 7A as an example, it is assumed that the time parameter t1 corresponding to the first transmit beam 701 is known, and the terminal device receives the synchronization signal from the SS block and determines the time parameter t2 of the transmit beam 702. Assuming that a period of the SS blocks is T, then (t1−t2)/T represents how many transmit beam transmissions the transmit beam 702 is after the transmit beam 701. In the example of FIG. 7A, the terminal device can determine that the transmit beam 702 is the ninth transmit beam transmission after the transmit beam 701, and in consideration the fact that there are four beams and each beam repeats three times in the 4×3 configuration, it can be determined that transmit beam 702 is the fourth transmit beam. The method is applicable to FIG. 7B as well, except that the periods to be considered include a period of the SS burst and a period of the SS blocks within the SS burst.

Synchronization Signal Reception at Terminal Side

According to some embodiments, the terminal device can receive synchronization signals from the base station side in a variety of ways. According to one embodiment, if the terminal device does not use beamforming to receive the synchronization signal (i.e., using a full-width receive beam), the electronic device 300B at the terminal device side just needs to receive, by using the full-width beam, the synchronization signals transmitted through different transmit beams by the base station. According to one example, for specified times of consecutive transmissions of each transmit beam, all transmissions of the transmit beam, or just one transmission (such as the first transmission) of the transmit beam can be received by using the full-width beam. According to another example, for a specified number of transmissions sequentially transmitted by all transmit beams, all transmissions of the transmit beams, or just one round of transmissions (such as a first round of transmissions) of all transmit beams can be received by using the full-width beam.

According to another embodiment, if the terminal device needs to use receive beamforming, then for a specified number of transmissions by the base station using each transmit beams, the electronic device 300B at the terminal device side can be configured to receive synchronization signals by using different receive beams (i.e., the receive beam scanning). As one example, for a specified number of consecutive transmissions by the base station using each transmit beam, different receive beams can be used to receive the synchronization signals transmitted by the same transmit beam. According to another example, for a specified number of transmissions sequentially transmitted by all transmit beams, a same receive beam can be used to receive all transmit beams in a single round of sequential transmissions, or different receive beams are used to receive the transmit beams until each receive beam can receive all the transmit beams. In the above embodiment, in the case where the receive beam scanning is required, the electronic device 300B at the terminal device side needs to have known or be able to know the transmit beam configuration, thereby determining its own receive beam arrangement.

The receive beam arrangements employed by the terminal device when the terminal device receives synchronization signals will be exemplarily described below.

Figure 8A:
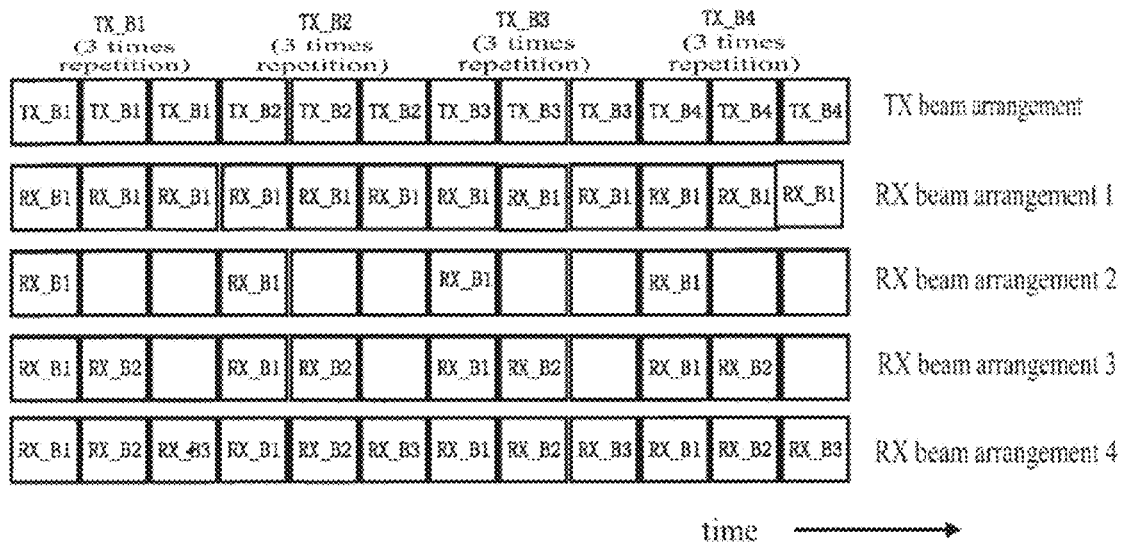
FIGS. 8A and 8B illustrate an exemplary receive beam arrangement at the terminal device side under a base station side specific transmit beam configuration, in accordance with an embodiment herein.

As described previously, the terminal device may or may not use receive beamforming to receive synchronization signals transmitted by the base station via transmit beamforming. FIG. 8A illustrates an exemplary receive beam arrangement of a terminal device in a 4×3 transmit beam configuration. The receive beam arrangements 1 and 2 in FIG. 8A correspond to the case where the terminal device does not use receive beamforming to receive synchronization signals. Then, electronic device 300B can generally use receive beam arrangement 1, that is, use a full-width receive beam (e.g., RX_B1) to receive each transmission of each transmit beam. The advantage of the receive beam arrangement 1 is that, a plurality of transmissions by each transmit beam can be received, and diversity gain can be obtained. When receiving the synchronization signals, the electronic device 300B can perform a correlation operation based on the content of the SS blocks, and the transmit/receive beams pair with a highest correlation or a correlation higher than a certain predetermined threshold is the matching transmit beam. For example, when the correlation in receiving the synchronization signal transmitted by the transmit beam 2 is higher than that in the case of other transmit beams, the transmit beam 2 can be considered to match with the full-width receive beam. In one preferred specific example, considering that the number of sequences in the PSS sequence set is much smaller than the number of sequences in the SSS sequence set, the electronic device 300B is designed to first perform a correlation operation between the PSS sequence in the SS block carried by the received transmit beam and each sequence in the pre-stored set of PSS sequences, and determine the matching transmit beam (and the matching PSS sequence) therein according to the degree of the correlation of the PSS sequence carried by each transmit beam, and then perform a correlation between the SSS sequence in the SS block carried by the matching transmit beam and each sequence in the set of SSS sequences to determine a matching SSS sequence, and the electronic device 300B then calculates to obtain the physical cell identity (PCI) of the corresponding cell according to the matching PSS sequence and the SSS sequence, for example, PCI=PSS+3*SSS, and determines the downlink reference signal structure according to the PCI to decode the PBCH. In some examples, the PSS values are 0 . . . 2 (refers to 3 different PSS sequences), and the SSS values are 0 . . . 167 (refers to 168 different SSS sequences). The range of PCIs that can be obtained by using above formula is from 0 . . . 503, so there are 504 PCIs in the physical layer. In the example in which synchronization signals further includes the TSS, the matching of the TSS sequences are performed lastly and the the PCI is calculated according to a redesigned PCI calculation formula (the specific formula is not the technical problem intended to be solved by the present disclosure, and is not described herein). Thereby, the complexity of the synchronization scheme based on the present disclosure can be effectively reduced, and in particular, the number of SSSs in the next generation cellular network may increase to thousands, and then the technical effect of the preferred example is particularly remarkable. Where the electronic device 300B is aware of the transmit beam configuration of the base station, only part of transmissions in multiple repetitive transmissions of each transmit beams may be received. For example, electronic device 300B can use receive beam arrangement 2, that is, for multiple transmissions of each transmit beam, a full-width receive beam (e.g., RX_B1) is used to receive only once (e.g., only receive the first transmission). The advantage of the receive beam arrangement 2 is that the receiving resources (e.g., power consumption, etc.) of the terminal device can be saved.

The receive beam arrangements 3 and 4 in FIG. 8A correspond to the cases where the terminal device receives the synchronization signals using 2 or 3 different receive beams, respectively. Then, for multiple transmissions of each transmit beam, the electronic device 300B needs to receive using different receive beams. To this end, the electronic device 300B needs to know the transmit beam configuration of the base station to arrange corresponding receive beams. In the receive beam arrangement 3 or 4, since the electronic device 300B knows that each transmit beam is repeated 3 times, it is possible to arrange its own receive beams in these 3 repetitions so that each receive beam is used at least once, thereby realizing the purpose of beam scanning. FIG. 8A illustrates only one cycle of transmissions of different transmit beams, which can be followed by the next cycle.

For the above 4×3 transmit beam configurations, when the terminal device has more than 3 receive beams, the scan of all receive beams cannot be completed within one cycle of different transmit beam transmissions. However, since the electronic device 300B knows the transmit beam configuration, it can arrange remaining receive beams for scanning in the next cycle. In light of the teachings herein, those skilled in the art can contemplate various variations of the receive beam arrangements to achieve beam scanning, all of which are within the scope of the present disclosure.

In addition, FIG. 8A is merely a schematic arrangement of time windows that can represent the relative positions of the various time windows, but not indicate their exact positions in the downlink frame. For example, multiple discontinuous time windows can be used as in FIGS. 7A and 7C, or multiple continuous time windows can be used as in FIGS. 7B and 7D. Further, the time windows in the various figures herein and the spaced therebetween are merely illustrative and not necessarily drawn to scale.

Figure 8B:
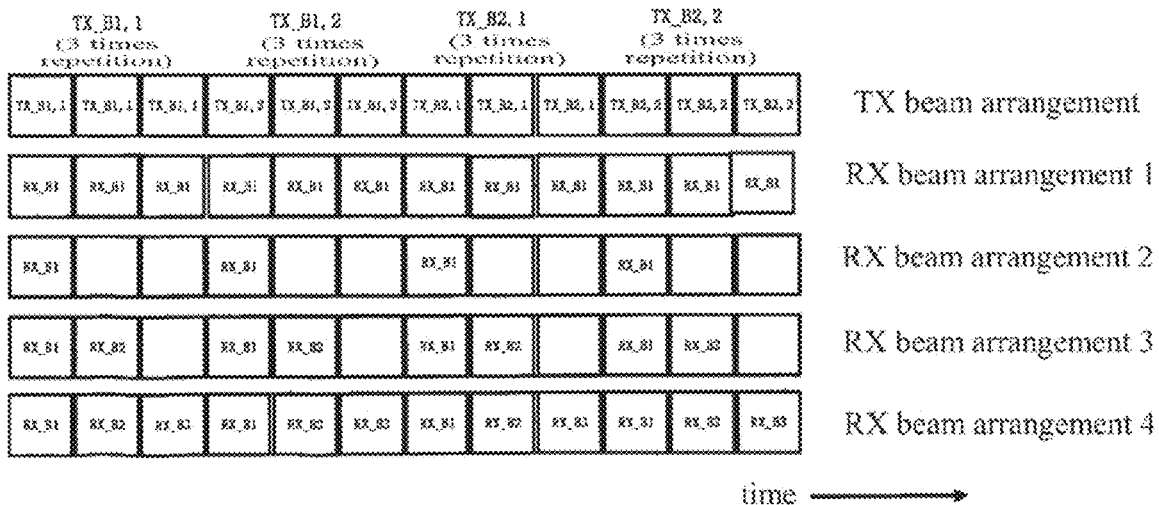

It should be understood that in a hierarchical transmit beam configuration, it can be considered that FIG. 8A show a first level transmit beams and corresponding various receive beam arrangements. The first level transmit beams can be followed by a second level transmit beams. FIG. 8B illustrates a second level of transmit beam configuration and an exemplary receive beam arrangement of the terminal device. The first level configuration of the hierarchical transmit beam configuration can be the above 4×3 transmit beam configuration, and the second level configuration can be 2×3 transmit beam configuration, i.e., each coarse transmit beam corresponds to two fine transmit beams, each of which is repeated three times (for simplicity, only the fine beams corresponding to the first two coarse beams are shown). In one example, after transmissions using the first level transmit beams as that in FIG. 8A, the transmission can then be done using the second level transmit beams, as shown by the transmit beam configuration in FIG. 8B. In FIG. 8B, individual fine transmit beams corresponding to each coarse transmit beam are successively repeated up to the number of times indicated in the transmit beam configuration. For example, the fine transmit beam TX_B1,1 corresponding to the coarse transmit beam TX_B1 is first repeated 3 times, and then TX_B1, 2 is also repeated 3 times, thereby completing the scanning of the fine transmit beam corresponding to the first coarse transmit beam TX_B1. Next, scanning of the fine transmit beams corresponding to the next coarse transmit beam is sequentially performed.

Similar to that described in FIG. 8A, in FIG. 8B, the receive beam arrangements 1 and 2 correspond to the cases where the terminal device does not use receive beamforming. Then, the electronic device 300B can use the receive beam arrangement 1, i.e., use a full-width receive beam (e.g., RX_B1) to receive each transmission of each transmit beam. The advantage of the receive beam arrangement 1 is that, a plurality of transmissions by each transmit beam can be received, and diversity gain can be obtained. When receiving the synchronization signal transmitted by each of the fine transmit beams, the electronic device 300B can perform a correlation operation based on the content of the SS blocks, and the transmit/receive beams pair with a highest correlation or a correlation higher than a certain predetermined threshold is the matching transmit/receive beams pair. For example, when the correlation in receiving the synchronization signal transmitted by TX_B2, 1 is higher than that in the case of other transmit beams, TX_B2, 1 can be considered to match with RX_B1. In the case where the electronic device 300B knows the transmit beam configuration of the base station, the electronic device 300B can also use the receive beam arrangement 2, that is, for multiple repetitive transmissions of each transmit beam, only part of transmissions are received. For example, a full-width receive beam (e.g., RX_B1) can be used to receive only once (e.g., only receive the first transmission). The advantage of the receive beam arrangement 2 is that the receiving resources (e.g., power consumption, etc.) of the terminal device can be saved.

The receive beam arrangements 3 and 4 in FIG. 8B correspond to the cases where the terminal device receives the synchronization signals using 2 or 3 different receive beams, respectively. Then, for multiple transmissions of each fine transmit beam, the electronic device 300B needs to receive using different receive beams. To this end, the electronic device 300B needs to know the transmit beam configuration of the base station to arrange corresponding receive beams. In the receive beam arrangement 3 or 4, since the electronic device 300B knows that each fine transmit beam is repeated 3 times, it is possible to arrange its own receive beams in these 3 repetitions, so that each receive beam is used at least once, thereby realizing the purpose of the beam scanning. FIG. 8B illustrates one cycle of transmissions of different fine transmit beams. In the case of hierarchical transmit beam scanning, after completing one cycle of fine transmit beam scanning, the next cycle of coarse transmit beam scanning and fine transmit beam scanning can be performed. In light of the teachings herein, those skilled in the art can contemplate various variations of the receive beam arrangements to achieve beam scanning, all of which are within the scope of the present disclosure.

Figure 24:
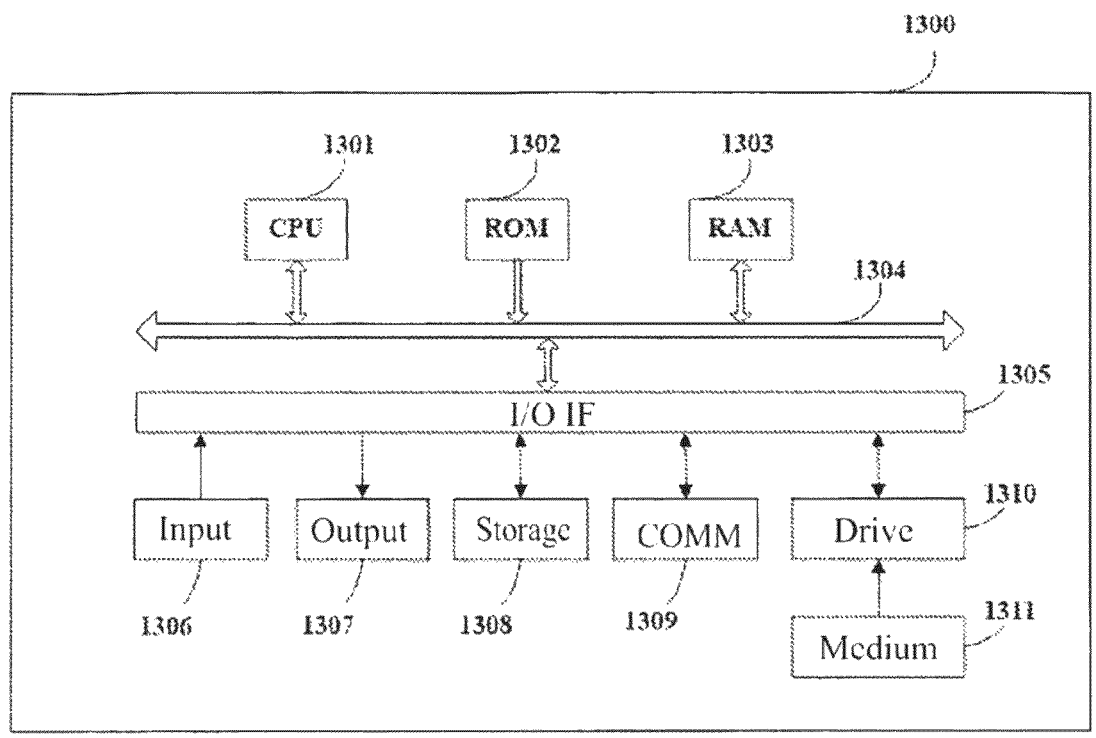
FIG. 24 is a block diagram of example structure of a personal computer which is an information processing device that can be employed in an embodiment herein.

It should be understood that in the example of FIG. 8B, 24 (8×3) time windows are required for all transmit beam scans of the second level to complete. Therefore, it may be necessary to complete in two SS bursts of length 12.

As previously described, the length of the SS burst can be matched with the transmit beam configuration by pre-configurations such that the full transmit beam configuration can be known with knowledge of one of the number of transmit beams or the number of repetitions. For example, a SS burst of length 12 matches with the 4×3 configuration described above. In the case of a SS burst of length 12, once it is known that there are 4 transmit beams, it can be known that each transmit beam is repeated 3 times; vice versa.

Acquisition of Transmit Beam Configuration by Terminal Device

In some embodiments, in order to facilitate reception of the synchronization signal by the terminal device, the terminal device needs to know the transmit beam configuration of the base station side. However, the terminal device cannot obtain any information about the transmit beam configuration from the base station by signaling before successfully receiving the synchronization signal. According to an embodiment herein, the terminal device can obtain the transmit beam configuration by at least obtaining the transmit beam configuration via other base stations, and/or obtaining the transmit beam configuration by transmitting beam measurements.

According to some embodiments herein, the electronic device 300A for the base station can be configured to deliver a transmit beam configuration to another base station that serves the terminal device together with the base station by dual connectivity, the transmit beam configuration can be indicated to the terminal device by the other base station.

As is known, dual connectivity is a technology that enables a terminal device to communicate with a plurality of base stations, thereby increasing the data rate. For example, the terminal device can maintain a connection with both the first base station and the second base station. In the process of the first base station communicating with the terminal device, the second base station can be added to form a dual connectivity as needed (for example, increased data rate is desired), then the first base station becomes the primary node, and the second base station becomes the secondary node. In some cases, the primary node can be an eNB in an LTE system, and the secondary base station can be a corresponding node in a 5G system, such as a gNB in an NR system. According to an embodiment herein, the adding operation can be implemented by a secondary node addition operation as follows.

Figure 9:
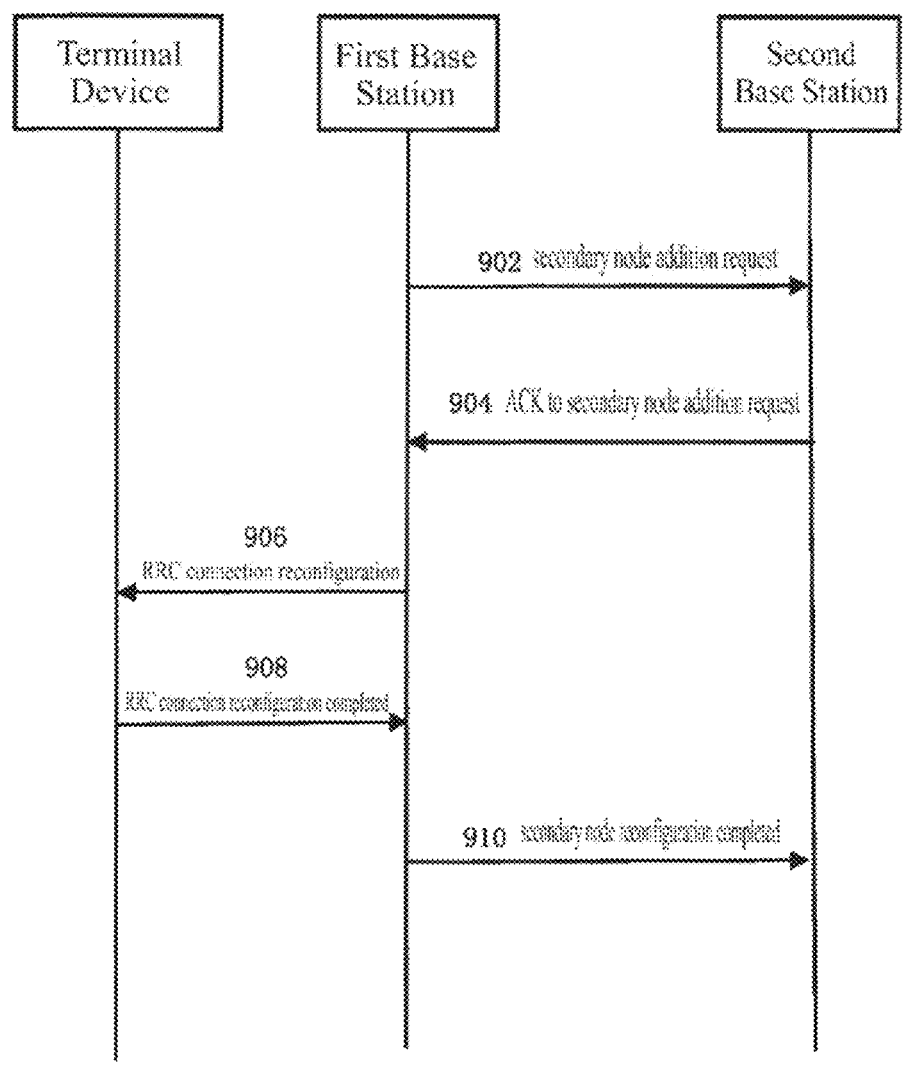
FIG. 9 illustrates an exemplary operation of a secondary node addition in accordance with an embodiment herein.

FIG. 9 illustrates exemplary operations of secondary node addition in accordance with an embodiment herein. In FIG. 9, the electronic device 300A can correspond to a second base station, by these exemplary operations, the terminal device forms a dual connectivity with the two base stations. At 902, the first base station can transmit a secondary node addition request message to the second base station, to request the second base station to allocate radio resources for communicating with the terminal device. Here, the first base station can indicate the configuration for the main cell group (MCG) serving the terminal device and the terminal device capability, and can provide measurement results for the cell in a secondary cell group (SCG) of a second base station that is required to be added to the terminal device. At 904, the second base station can allocate corresponding resources and send a secondary node addition request ACK to the first base station upon the radio resource management entity grants the resource request. Here, the second base station can trigger RA process so that synchronization of radio resource configuration of the secondary node can be performed. The second base station can provide the first base station with new radio resources of the SCG and beam configuration information of the primary cell (PSCell) among the SCG. Of course, in some cases, the beam configuration information can also include beam configuration information of other cells in the SCG. At 906, the first base station can instruct the terminal device to perform RRC connection reconfiguration and indicate the above transmit beam configuration to the terminal device. At 908, the terminal device can indicate to the first base station that the RRC connection reconfiguration is complete. At 910, the first base station can indicate to the second base station that the secondary node reconfiguration is complete. In this way, the terminal device can perform a synchronization process with the PSCell of the secondary node based on the obtained transmit beam configuration information. The second base station which serves as the secondary node does not need to broadcast system information other than the radio frame timing and the SFN, and system information (initial configuration) is provided to the terminal device through the dedicated RRC signaling of the first base station which serves as the primary node. The radio frame timing and SFN of the SCG can be obtained from at least the synchronization signals of the PSCell (e.g., PSS, SSS, and PBCH).

In some embodiments, the first base station may not be limited to an eNB, and the second base station may not be limited to a gNB. For example, the first base station and the second base station can be any base stations belonging to the same wireless communication system or different wireless communication systems. In some examples, the first base station described above may be a base station belonging to a wireless communication system of a prior generation.

According to some embodiments herein, the terminal device can include an omnidirectional antenna. Before receiving the synchronization signals using different receive beams, the electronic device 300B can be configured to receive synchronization signals without using beamforming to obtain a transmit beam configuration at the base station side.

Figure 10:
FIG. 10 illustrates example performance of beam detection in accordance with an embodiment herein.

Referring to FIG. 2B, it is assumed that the electronic device 300B receives, with a full-width receive beam, synchronization signals transmitted by the base station side using different transmit beams. For the electronic device 300B, different transmit beams at the base station side mean different reception performance. In the 3×3 configuration, the reception performance at the electronic device 300B can be as shown in FIG. 10. Therein, A, B, and C represent different reception performance, respectively. By measuring for a certain period of time, it is possible to determine that there are three transmit beams based on three types of reception performances existing, and it is possible to determine that each transmit beam is repeated three times based on three repetitions of each type of reception performance. In the case where the transmit beam configuration is mated with the SS burst, the transmit beam configuration can be determined based on the length of the SS burst combined with one of the number of different reception performances and the times of repetitions of each reception performance. In this example, in the case where the length of the SS burst is 9, it can be determined that each transmit beam is repeated (9/3)=3 times based on three types of reception performances existing, or it can be determined that there is (9/3)=3 transmit beams based on each type of reception performance is repeated 3 times.

Indication and Feedback of Transmit Beams

In an embodiment herein, transmitting a synchronization signal through transmit beamforming can be used to indicate information of the transmit beam used to transmit the synchronization signal, such as a transmit beam ID. The transmission of the synchronization signal can indicate or include the transmit beam ID by at least one of the followings.

Figure 11A:
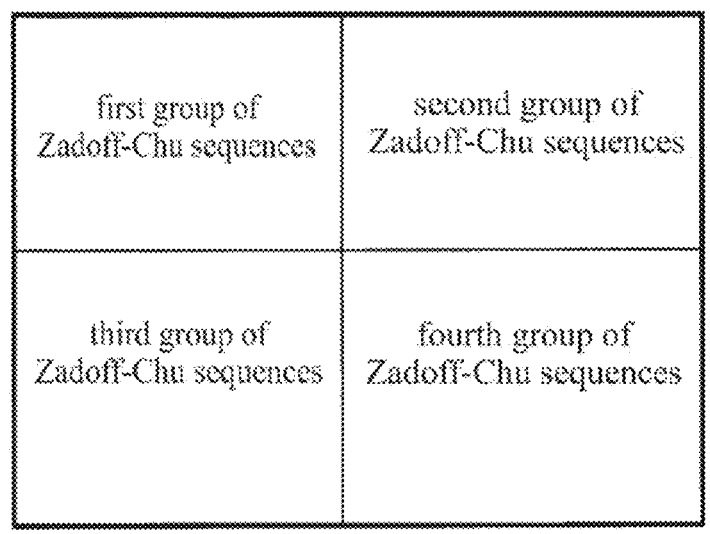
FIGS. 11A and 11B illustrate an example manner of indicating information of a transmit beam at base station side, in accordance with an embodiment herein.

As previously described, the synchronization signal can include a synchronization sequence. In one embodiment, the synchronization sequence per se can represent a transmit beam ID. For example, the synchronization sequences can be divided into groups, and all synchronization sequences in a same group can represent a same transmit beam. Taking the PSS in the LTE system as an example, there can be multiple Zadoff-Chu sequences of length 63 in the system. For 4×3 transmit beam configurations, these Zadoff-Chu sequences can be divided (e.g., equally divided) into 4 groups as shown in FIG. 11A, and the sequences in each group can represent one of 4 transmit beams. For example, any sequence in the first group of sequences (1st to N/4th sequences) can represent the transmit beam ID 1. When the electronic device 300A transmits a synchronization signal using this transmit beam, the synchronization sequence included in the synchronization signal can be any sequence in the first group. Thus, when receiving the synchronization signal, the electronic device 300B can determine, based on the synchronization sequence in the synchronization signal, that ID of the transmit beam used to transmit the synchronization signal is 1. Of course, in such an embodiment, the base station and the terminal device are required to agree upon the correspondence between each group of synchronization sequences and transmit beams (for example, specify in communication protocols and pre-store the correspondence into the chips of both communicating parties).

Figure 11B:
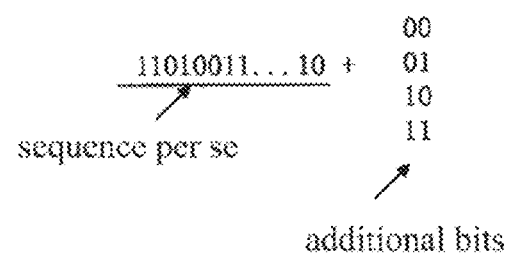

In one embodiment, in addition to the synchronization sequence, the synchronization signal also includes additional information bits, which can represent the transmit beam ID. As shown in FIG. 11B, for 4×3 configuration for transmit beam, additional bits 00, 01, 10, 11 can be designated to represent one of the 4 transmit beams, respectively. For example, an additional information bits 00 can represent the transmit beam ID 1. When the electronic device 300A transmits a synchronization signal using this transmit beam, the synchronization signal can include the additional information bits 00. Thus, when receiving the synchronization signal, the electronic device 300B can determine, based on the additional bits 00 in the synchronization signal, ID of the transmit beam used to transmit the synchronization signal to be 1. In such an embodiment, similarly, the base station and the terminal device are required to agree upon the correspondence between the additional bits and the transmit beams.

In one embodiment, the transmit beam ID can be represented by time windows/time parameters where the synchronization signal is located. For example, the electronic device 300B can determine the transmit beam ID of the matching transmit beam based on the time parameters of the synchronization signal transmitted by the matching transmit beam and the transmit beam configuration (i.e., the number of transmit beams and the number of repetitions). A specific example can be seen in the description of FIG. 7A.

In various embodiments, after determining the transmit beam ID of the matching transmit beam, the terminal device can feed back the transmit beam ID to the base station in various suitable manners. For example, after a dual connectivity is established with two base stations via the process of FIG. 9 and the base station serves as the secondary node and the other base station serves as the primary node, the terminal device can provide the transmit beam ID to the base station via the primary node.

According to some examples, a matching transmit beam at the base station side can be indicated in implicit or explicit manners to feed it back to the base station. According to some examples, as an explicit manner, the transmit beam ID can be indicated by additional bits in the feedback from the terminal device to the base station. According to some examples, as an implicit manner, feedback can be done in accordance with specific transmission time windows, and the transmit beam can be known from the correspondence between the transmission time windows and the beams.

This feedback can be included in the RA process performed by the terminal device. Of course, according to some embodiments, the feedback related to the transmit beam at the base station side can be transmitted separately from the RA preamble, for example, before or after the RA preamble. This feedback operation will be described in detail later in conjunction with the RA process.

Exemplary Method

Figure 12A:
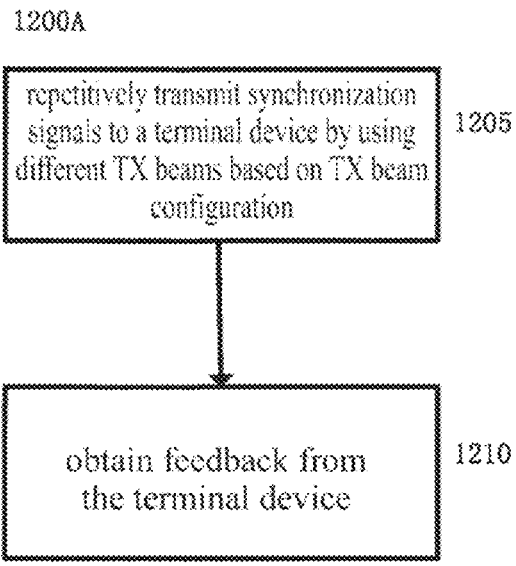
FIGS. 12A and 12B illustrate an example method for communication in accordance with an embodiment herein.

FIG. 12A illustrates an example method for communication in accordance with an embodiment herein. As shown in FIG. 12A, the method 1200A can include repetitively transmitting a synchronization signal to a terminal device by using different transmit beams based on a transmit beam configuration, where the synchronization signal includes information of transmit beam used to transmit the synchronization signal (block 1205). The method also includes obtaining feedback from the terminal device, where the feedback comprises information of the transmit beam for being used in transmit beam management (block 1210). The method can be performed by the electronic device 300A, and detailed example operations of the method can be referred to the above description of operations and functions performed by the electronic device 300A, which are briefly described as follows.

In one embodiment, the transmit beam corresponding to the information of transmit beam fed back from the terminal device is a transmit beam with a highest degree of reception matching with the terminal device.

In one embodiment, the transmit beam configuration specifies a number of a plurality of transmit beams that the can be used to transmit the synchronization signal by the base station and a number of times each transmit beam can be consecutively used to transmit, and the method further comprises transmitting the synchronization signal by using each transmit beam of the plurality of transmit beams, and transmitting the synchronization signal by using each transmit beam consecutively for the number of times.

In one embodiment, the transmit beam configuration specifies a number of transmit beams of different levels that can be used to transmit synchronization signal by the base station and a number of times each transmit beam of different levels can be consecutively used to transmit, the method further comprises transmitting the synchronization signal by using each transmit beam of the plurality of transmit beams of different levels, and transmitting the synchronization signal by using each transmit beam consecutively for the number of times.

In one embodiment, the transmit beam configuration further comprises a correspondence between the transmit beams at the base station side and a plurality of synchronization signal time windows, and the method further comprises transmitting the synchronization signal by using the transmit beams based on the correspondence between the transmit beams and the plurality of synchronization signal time windows.

In one embodiment, the method further comprises delivering the transmit beam configuration to another base station that serves the terminal device together with the base station through dual connectivity, wherein the transmit beam configuration is indicated to the terminal device by the other base station.

In one embodiment, the other base station is a base station in the wireless communication system or a base station in a wireless communication system of a previous generation than the wireless communication system.

In one embodiment, the wireless communication system is a 5G system and the wireless communication system of the previous generation is an LTE system.

In one embodiment, a SS block is formed from different types of continuous synchronization signals, and a SS burst is formed from a plurality of continuous SS blocks.

In one embodiment, the information of transmit beam comprises a transmit beam ID, and the transmit beam ID is indicated by the synchronization signal through one of: the synchronization signal comprises a synchronization sequence, the synchronization sequence per se represents the transmit beam ID; besides the synchronization sequence, the synchronization signal comprises additional information bits, and the additional information bits represent the transmit beam ID; or time parameters in which the synchronization signal is located.

In one embodiment, the information of the transmit beam with the highest degree of matching is determined based on the transmit beam configurations and the time parameters of the synchronization signal transmitted by using the transmit beam with the highest degree of matching.

In one embodiment, the time parameters comprise indices of OFDM symbols, indices of slots in a radio frame and a radio frame number.

In one embodiment, the synchronization signal comprises a primary synchronization signal PSS and a secondary synchronization signal SSS, or comprises a primary synchronization signal PSS, a secondary synchronization signal SSS and a tertiary synchronization signal TSS.

In one embodiment, system information is represented by relative positions of different types of synchronization signals in a time or frequency domain, and the system information comprises at least one of: a duplex type of a wireless communication system; or a different cycle prefix length.

Figure 12B:
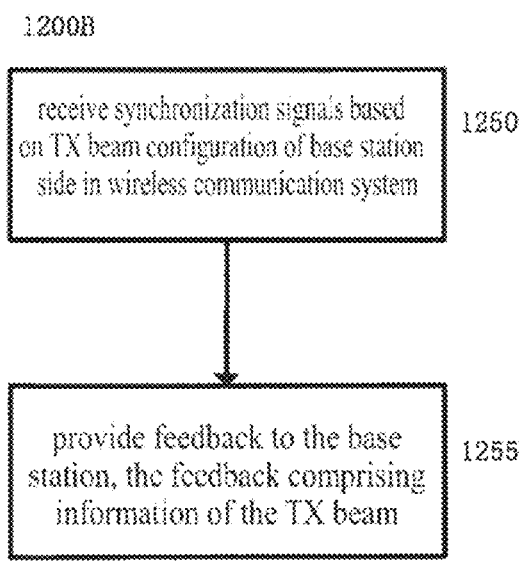

FIG. 12B illustrates another example method for communication in accordance with an embodiment herein. As shown in FIG. 12B, the method 1200B can include receiving a synchronization signal based on a transmit beam configuration at a base station side in a wireless communication system, where the synchronization signal includes information of the transmit beam used to transmit the synchronization signal by the base station (block 1250). The method also comprises providing feedback to the base station, where the feedback comprises information of the transmit beam for being used by the base station in transmit beam management (block 1255). The method can be performed by the electronic device 300B, and detailed example operations of the method may refer to the above description of operations and functions performed by the electronic device 300B, which are briefly described as follows.

In one embodiment, the transmit beam corresponding to the information of transmit beam in the feedback is the transmit beam with the highest degree of reception matching with the terminal device.

In one embodiment, the transmit beam configuration specifies a number of a plurality of transmit beams that can be used to transmit the synchronization signal by the base station and a number of times each transmit beam can be consecutively used to transmit, the method further comprising for each of the number of times of transmissions by the base station by using each transmit beam consecutively, receive the synchronization signal by using different receive beams.

In one embodiment, the transmit beam configuration specifies a number of transmit beams of different levels that can be used to transmit the synchronization signal by the base station and a number of times each transmit beam of different levels can be consecutively used to transmit, and the method further comprising for each of the number of times of transmissions by the base station by using each transmit beam consecutively, receive the base station by using different receive beams.

In one embodiment, the transmit beam configuration further comprises correspondence between the transmit beams at the base station side and a plurality of synchronization signal time windows.

In one embodiment, the method further comprises obtaining the transmit beam configuration from another base station that serves the terminal device together with the base station through dual connectivity.

In one embodiment, the other base station is a base station in the wireless communication system, or a base station in a wireless communication system of a previous generation than the wireless communication system.

In one embodiment, the wireless communication system is a 5G system, and the wireless communication system of the previous generation is an LTE system.

In one embodiment, the terminal device or electronic device 300B may comprise an omnidirectional antenna, the method further comprising receiving the synchronization signal without using beamforming to obtain the transmit beam configuration at the base station side, prior to receiving the synchronization signal by using the different receive beams.

In one embodiment, the information of the transmit beam comprises a transmit beam ID, the method further comprising obtaining the transmit beam ID from the synchronization signal, and the transmit beam ID is indicated by the synchronization signal through one of: the synchronization signal comprises a synchronization sequence, and the synchronization sequence per se represents the transmit beam ID; besides the synchronization sequence, the synchronization signal comprises additional information bits, and the additional information bits represent the transmit beam ID; or time parameters in which the synchronization signal is located.

In one embodiment, the method further comprises determining the information of the transmit beam with the highest degree of matching based on the transmit beam configuration and the time parameters of the synchronization signal transmitted by using the transmit beam with highest degree of matching.

In one embodiment, the time parameters comprise indices of OFDM symbols, indices of slots in a radio frame and a radio frame number.

In one embodiment, the synchronization signal comprises a primary synchronization signal PSS and a secondary synchronization signal SSS, or comprises a primary synchronization signal PSS, a secondary synchronization signal SSS and a tertiary synchronization signal TSS.

In one embodiment, the method further comprises obtaining system information from relative positions of different types of synchronization signals in a time or frequency domain, the system information comprising at least one of: a duplex type of the wireless communication system; or a different cyclic prefix length.

Figure 13:
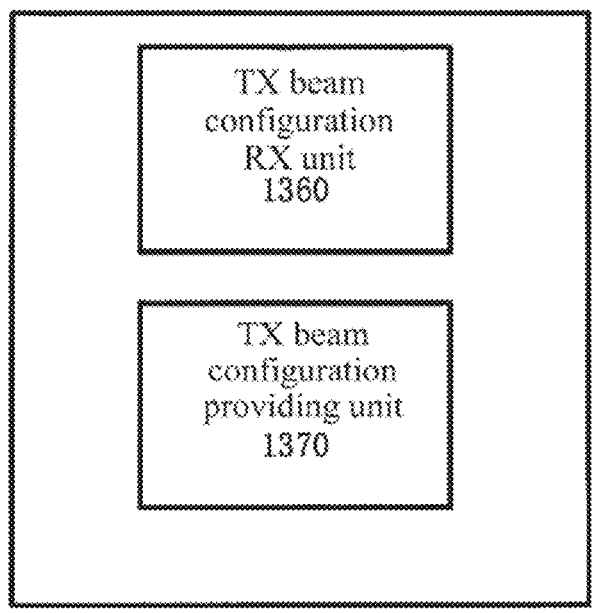
FIG. 13 illustrates an exemplary electronic device for a base station side in accordance with an embodiment herein.

Example of another Electronic Device for Base Station Side FIG. 13 illustrates an exemplary electronic device for a base station side in accordance with an embodiment herein, where the base station can be used in various wireless communication systems. The electronic device 1300A shown in FIG. 13 can include various units to implement operations or functions in accordance with the present disclosure. As shown in FIG. 13, the electronic device 1300A can include, for example, a transmit beam configuration receiving unit 1360 and a transmit beam configuration providing unit 1370. In some embodiments, the transmit beam configuration receiving unit 1360 can be configured to receive a transmit beam configuration from another base station that transmits a synchronization signal to the terminal device based on the transmit beam configuration. The transmit beam configuration providing unit 1370 can be configured to provide a transmit beam configuration to the terminal device for the terminal device to receive signals from base station based on the transmit beam configuration.

In one example, the electronic device 1300A can be used with the other base station described above in the same wireless communication system, or can be used in a wireless communication system that is the previous generation than the other base station described above. For example, electronic device 1300A may be used for an LTE eNB, and the other base station described above may be a 5G base station, such as a gNB in an NR system. According to one implementation, the electronic device 1300A may be, for example, the first base station in FIG. 9, and the other base station may be the second base station in FIG. 9.

Example Application of Synchronous Signal Beam Scanning

Figure 14:
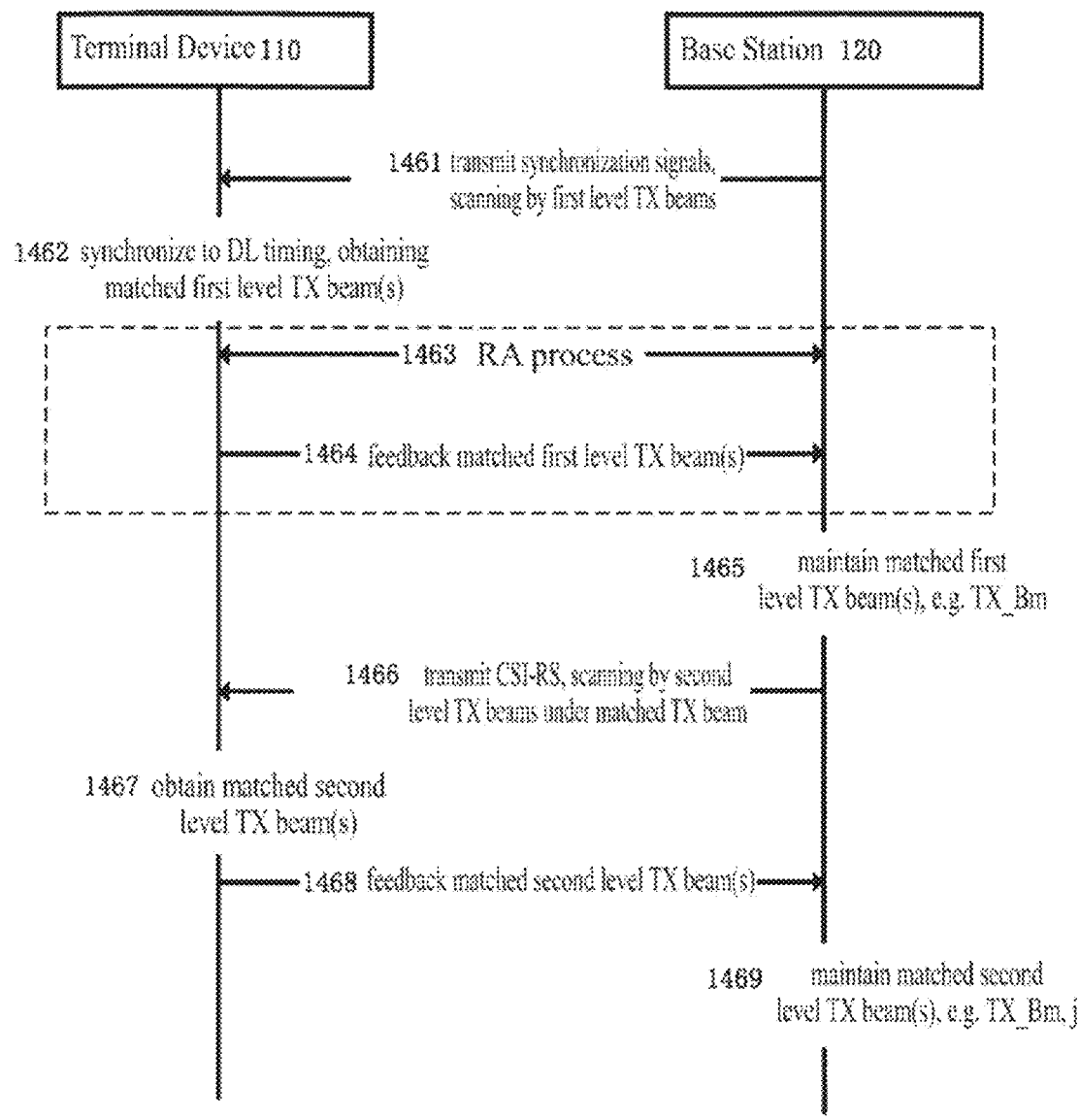
FIG. 14 illustrates an example hierarchical transmit beam scanning process flow in accordance with an embodiment herein.

According to one embodiment herein, hierarchical transmit beamforming can be performed throughout synchronization processes and data communication processes. In one example, a first level transmit beam scanning can be performed during the synchronization process and a matching first level transmit beam can be determined. After obtaining the matching first level transmit beam, the base station can use a second level transmit beam under the first level transmit beam to transmit a reference signal (such as CSI-RS) in the data communication process, to determine a matching second level transmit beam for data communication. FIG. 14 illustrates an example hierarchical transmit beam scanning process flow in accordance with an embodiment herein. As shown in FIG. 14, at 1461, the base station can transmit synchronization signals by a first level transmit beam scanning. At 1462, the terminal device receives the synchronization signals, synchronizes to downlink timing and obtains a first level transmit beam that matches with itself (using receive beamforming or not). Next, at 1463 and 1464, a RA process is performed and the terminal device feeds back the matching first level transmit beam to the base station. As mentioned previously, this feedback can be made in a variety of appropriate ways. In one implementation, the feedback of the matching beam can be performed through a RA process. At 1465, the base station records and maintains the matching first level transmit beam, such as TX_Bm. Next is the data communication process. At 1466, since the base station knows that the first level transmit beam TX_Bm matches the terminal device, the CSI-RS can be transmitted by the second level transmit beam under the TX_Bm. At 1467, the terminal device receives the CSI-RS and obtains a second level transmit beam that matches with itself. At 1468, the terminal device feeds back the matching second level transmit beam to the base station. At 1469, the base station records and maintains the matching second level transmit beam, such as TX_Bm,j. Thereafter, the base station can perform data communication with the terminal device using the transmit beam TX_Bm,j.

The example process of FIG. 14 can save training overhead for beam scanning during the process of data communication, due to the possibility of utilizing the result of the first level transmit beam scanning in the synchronization process, and performing a second level transmit beam scanning during the process of data communication directly, as compared to the conventional method of performing a hierarchical transmit beam scan in a data communication process to determine a matching second level transmit beam.

A second general aspect in accordance with the present disclosure, which primarily discloses a RA process in accordance with embodiments herein, is described below in conjunction with FIGS. 15A-23B. According to some embodiments, a RA signal is transmitted from the terminal device side to the base station side by beamforming, the base station receives the RA signal, and obtains information of a transmit beam used by the base station to transmit the synchronization signal. Thereby the base station can know the appropriate transmit beam and receive beam information for a particular terminal device for subsequent communication use. According to one example, in the case the RA is successful, the base station will inform the terminal device of the transmit beam in the uplink that matches with the base station. According to some embodiments, the operations according to the second aspect of the present disclosure can be performed by electronic devices at the base station side and the terminal device side. The operation according to the second aspect of the present disclosure will be described in detail below.

Example of Electronic Device for Terminal Device Side

Figure 15A:
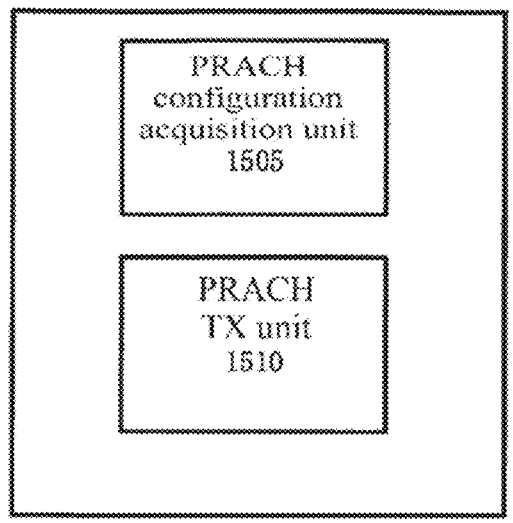
FIG. 15A illustrates an exemplary electronic device for a terminal device side according to an embodiment herein.

FIG. 15A illustrates an exemplary electronic device for a terminal device side in accordance with an embodiment herein, where the terminal device can be used in various wireless communication systems. The electronic device 1500A shown in FIG. 15A can include various units to implement a second general aspect in accordance with the present disclosure. As shown in FIG. 15A, in one embodiment, the electronic device 1500A can include a PRACH configuration acquisition unit 1505 and a PRACH transmitting unit 1510. According to one implementation, the electronic device 1500A can be, for example, the terminal device 110 of FIG. 1 or may be part of the terminal device 110. The various operations described below in connection with the terminal device can be implemented by units 1505, 1510 or other units of electronic device 1500A.

In some embodiments, the PRACH configuration acquisition unit 1505 can be configured to obtain RA configuration information. For example, after obtaining downlink cell synchronization at the terminal device side, the electronic device 1500A (e.g., unit 1505) can obtain RA configuration information at an appropriate location in the downlink frame through the channel for broadcast. For another example, the terminal device obtains RA configuration information of the secondary base station through the primary base station in dual-connectivity. The RA configuration information can include a time-frequency domain resource, that is, physical random accesses channel (PRACH), which allows each terminal device to transmit a RA preamble thereon. In one embodiment, the RA configuration information can further include a correspondence between the receive beams at the base station side and the time domain resources (time windows), as described in detail below.

In some embodiments, the PRACH transmitting unit 1510 can be configured to transmit a RA preamble based on RA configuration information (e.g., time-frequency domain resources), to indicate one or more transmit beams at the base station side in the downlink that matches with one or more receive beams at the terminal device side. In one embodiment, the matching one or more transmit beams at the base station side are determined by the terminal device based on receiving the synchronization signal, as described in the first aspect herein. Indicating the matching transmit beam by transmission of a RA preamble can be used as a possible way for the terminal device to feed back the matching transmit beam.

Example of Electronic Device for Base Station Side

Figure 15B:
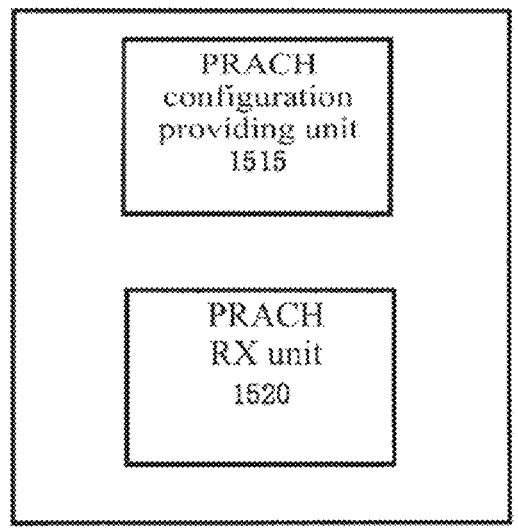
FIG. 15B illustrates an exemplary electronic device for a base station side in accordance with an embodiment herein.

FIG. 15B illustrates an exemplary electronic device for a base station side in accordance with an embodiment herein, where the base station can be used in various wireless communication systems. The electronic device 1500B shown in FIG. 15B can include various units to implement a second general aspect in accordance with the present disclosure. As shown in FIG. 15B, the electronic device 1500B can include, for example, a PRACH configuration providing unit 1515 and a PRACH receiving unit 1520. According to one implementioan, the electronic device 1500B may be, for example, the base station 120 in FIG. 1 or may be part of the base station 120, or may be a device for controlling a base station (for example, a base station controller) or a device for a base station, or a part of thereof. The various operations described below in connection with the base station can be implemented by units 1515, 1520 or other units of electronic device 1500B.

In some embodiments, the PRACH configuration providing unit 1515 can be configured to transmit RA configuration information. For example, electronic device 1500B (e.g., unit 1515) can broadcast system information, which can include RA configuration information, at appropriate locations in the downlink frame. The RA configuration information can be as described above with reference to unit 1505.

In some embodiments, the PRACH receiving unit 1520 can be configured to receive a RA preamble transmitted from the terminal device, to obtain one or more transmit beams at the base station side in the downlink that are paired with one or more receive beams at the terminal device side. In one embodiment, these one or more matching transmit beams at the base station side are determined by the terminal device based on receiving the synchronization signal.

Random Access Configuration Information

The RA configuration information can include time-frequency domain resources on which each terminal device is allowed to transmit a RA preamble. In one embodiment, the RA configuration information can further include a correspondence between the receive beams at the base station side and a plurality of RA time windows. The correspondence is generally specified by the receive beam configuration at base station side (as described below), but can be sent to the terminal device through RA configuration information.

In some embodiments, the RA configuration information can also include other information. For example, the RA configuration information can further include indication information of beam symmetry, such as 1 bit. For example, in the case of having beam symmetry, the bit has a value of 1; in the case of not having beam symmetry, the bit has a value of 0. According to one example, without beam symmetry, the RA configuration information can alternatively or additionally include a receive beam configuration at the base station side, thereby enabling the terminal device to know the receive beam configuration at the base station side.

In some embodiments, above other information and the correspondence between the receive beams at the base station side and the plurality of RA time windows can also be sent to the terminal device in other ways, for example, by way of dual connectivity.

Random Access Time Window and Random Access Preamble

Figure 16:
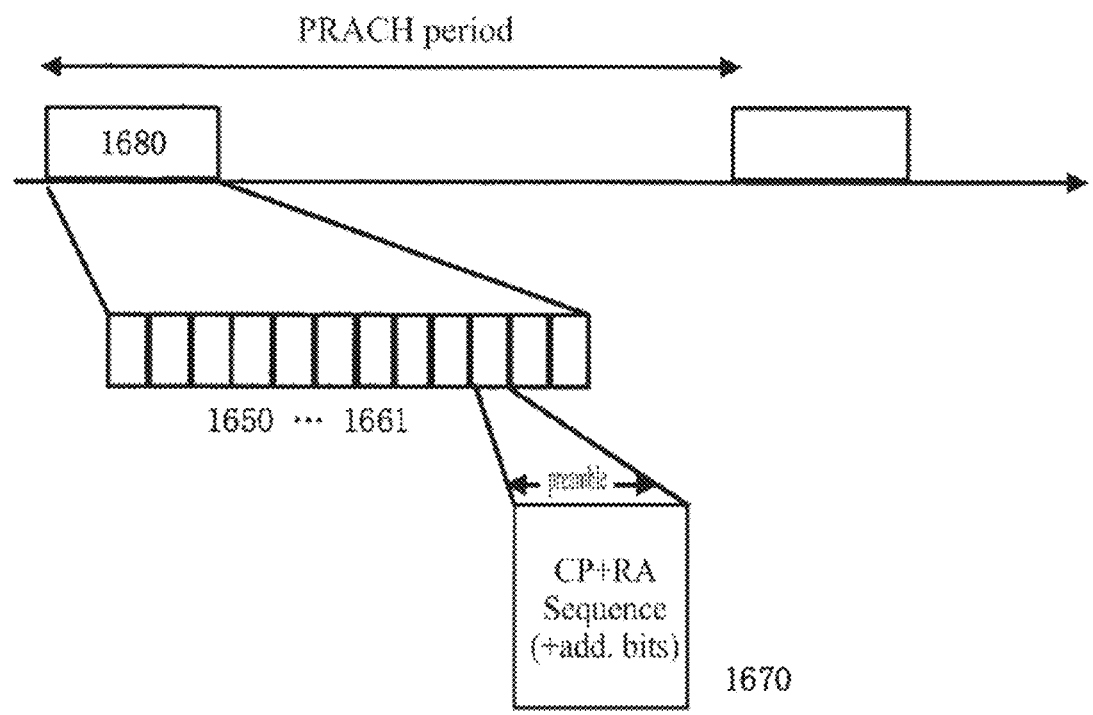
FIG. 16 illustrates an exemplary random access time window in accordance with an embodiment herein.

In general, RA preambles can be transmitted in specific time windows in uplink frames, and these time windows can be arranged with a certain time period or time pattern. These time windows can correspond to a particular transceiving occasion of the RA signal. In an embodiment herein, since the base station side uses beamforming to receive the RA preambles, more RA time windows are needed for receive beam scanning, ie: 1) receptions using multiple different beams, and 2) repetitive receptions using a single beam. In some embodiments, consecutive RA time windows can be arranged within one frame or across multiple frames. One corresponding example can be seen in FIG. 16. As shown in FIG. 16, a plurality of RA time windows 1650 to 1661 can be consecutive in the time domain to form a larger RA time window 1680. The RA time window 1650 to 1661 can also be referred to as basic RA resources. Taking the frame structure in the LTE system as an example, the basic RA resources can correspond to several (for example, six) resource blocks in the center of the frequency band, and its length may be 1 ms, 2 ms, or 3 ms according to the system configuration. The larger RA time window 1680 can be arranged with a certain period. One purpose of forming a RA time window 1680 is to enable the base station to finish a complete receive beam scanning within the larger time window.

In some embodiments, the RA time windows can be designated to correspond to particular time parameters of the uplink frame. For example, a frame number, a subframe number, a slot index, and/or a symbol index of a RA time window can be specified. In some embodiments, the terminal device can identify a RA time window based on the time parameters such that the RA preamble can be selectively transmitted in the RA time window.

As shown in FIG. 16, a RA preamble (e.g., RA preamble 1670) can be transmitted in any of the RA time windows 1650 to 1661. In some embodiments, the RA preamble can include a cyclic prefix and a RA sequence, which RA sequence can be, for example, a Zadoff-Chu sequence. In some embodiments, the RA preamble can also include additional information bits. According to an embodiment herein, the RA preamble can be used to indicate one or more transmit beams at the base station side that match with the terminal device. For example, a RA sequence or additional information bits can be used to indicate the matching transmit beams at the base station side described above.

Receive Beam Configuration at Base Station Side

In receive beamforming, a repetition pattern of a plurality of receive beams at the base station side can be represented by a receive beam configuration. In some embodiments, on one hand, the base station can receive a RA preamble from each terminal device based on the receive beam configuration; on the other hand, the terminal device may need to transmit RA preambles based on the receive beam configuration, for example, when the terminal device transmits by using transmit beamforming. In general, to represent a repetition pattern of receive beams, the receive beam configuration can include or indicate at least two aspects of information, i.e., the number of receive beams and the number of times each receive beam is repetitively used to receive (e.g., a RA preamble).

In some embodiments, the receive beam configuration can specify the number of receive beams that can be used by the base station to receive the RA preamble and the number of times each receive beam is consecutively used to receive. FIG. 17A illustrates an exemplary receive beam configuration at the base station side in accordance with an embodiment herein. As shown in FIG. 17A, the receive beam configuration 1700A designates that the base station side has four receive beams RX_B1 to RX_B4 for receiving the RA preamble, and can consecutively use each receive beam three times for the reception. Similar to the above example of the transmit beam configuration, the receive beam configuration can also be represented in N (beams)×M (times). For example, the receive beam configuration 1700A can be referred to as 4×3 configuration for short. This receive beam configuration is only an example. In various embodiments, the number of receive beams can be any number, and the number of repetitions can be any number of times.

In a corresponding embodiment, the electronic device 1500B can be configured to receive RA preambles using each of a plurality of (e.g., four) receive beams based on a receive beam configuration, and to consecutively use each receive beam to perform this reception for a specified number of times (e.g., 3 times). If the terminal device does not use transmit beam scanning to transmit the RA preamble, the electronic device 1500A can only need to use the full-width beam to perform the transmission to the base station; if the terminal device needs to use transmit beamforming, the electronic device 1500A any use different transmit beam to transmit the RA preambles for the base station to receive based on the receive beam configuration.

In some embodiments, the receive beam configuration can specify the number of different levels of receive beams that the base station can use to receive the RA preambles and the number of times each receive beam of different levels is consecutively used to received. FIG. 17B illustrates an exemplary receive beam configuration in the case of a hierarchical receive beam at the base station side in accordance with an embodiment herein. It is assumed that there are four first level receive beams at the base station side, and each first level receive beam has two second level receive beams. The first level of receive beam configuration can be, for example, as shown in FIG. 17A, and the second level of receive beam configuration can be, for example, as shown in FIG. 17B. The second level of receive beam configuration 1700B is assigned with eight second level receive beams RX_B1, 1 to RX_B4, 2 for receiving RA preambles, and each second level receive beam can be used consecutively for 3 times for reception. In some cases, the hierarchical receive beam configuration can also be represented in the form of N×M. For example, the first level receive beam configuration of FIG. 17B can be represented as 4×3 configuration, and the second level receive beam configuration can be represented as 2×3 configuration (where "2" second level receive beams correspond to a single first level transmit beam) or 8×3 configuration (where "8" second level receive beams correspond to the whole first level transmit beam).

In a corresponding embodiment, the electronic device 1500B can be configured to receive RA preambles using each of the different levels of receive beams and consecutively use each receive beams for the specified number of times for the reception. If the terminal device does not use beamforming to transmit the RA preamble, the electronic device 1500A can only need to use the full-width beam to perform the transmission to the base station; if the terminal device needs to use transmit beamforming, the electronic device 1500A can be configured to transmit the RA preambles using different levels of transmit beams for the base station to receive based on the receive beam configuration.

In the above embodiments, in the case where the terminal device is required for the transmit beam scanning, the electronic device 1500A needs to know or be able to know the receive beam configuration at the base station side, thereby determining its own transmit beam arrangement, as described below with reference to FIG. 19A to 20B.

In some embodiments, the receive beam configuration can also indicate a correspondence between the receive beams at the base station side and a plurality of RA time windows. In one example, the receive beam configuration can indicate a correspondence between each reception of each receive beam and a plurality of RA time windows (or referred to as a full correspondence). In another example, the receive beam configuration can indicate a correspondence between a reception of a certain receive beam and a plurality of RA time windows (or referred to as a partial correspondence). For example, it may be specified that the first reception using the first receive beam RX_B1 corresponds to the first RA time window. The base station side or the terminal device side can determine a full correspondence based on a partial correspondence in connection with the repetition pattern of receive beams. In such an embodiment, the electronic device 1500B can perform the first reception and subsequent reception of the RA preambles using the receive beam RX_B1 based on the above-described correspondence. Accordingly, the electronic device 1500A can transmit a RA preamble based on the correspondence.

Figure 18:
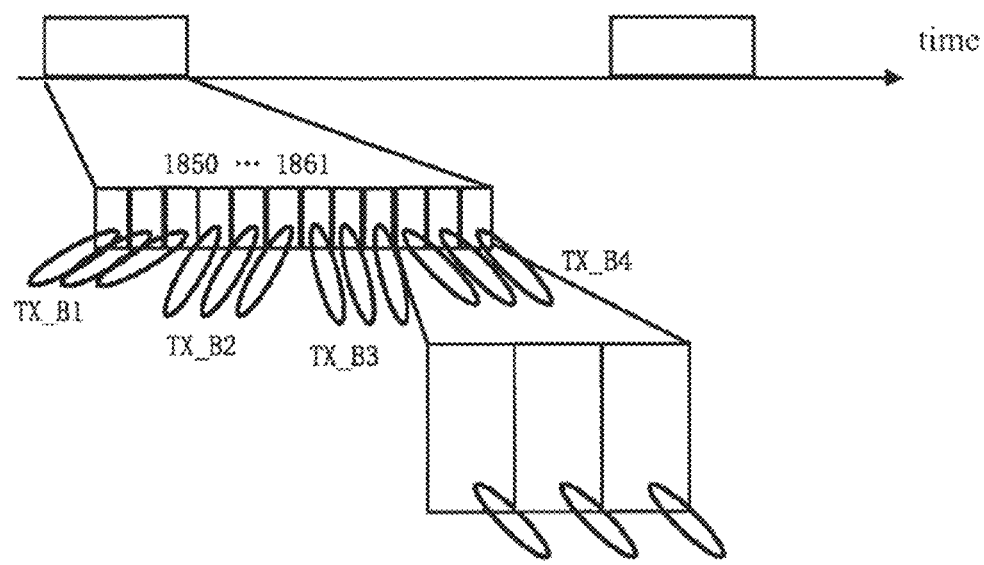
FIG. 18 illustrates an exemplary correspondence between receive beam at the base station side and a random access time window in accordance with an embodiment herein.

FIG. 18 illustrates a correspondence between receive beams at the base station side and RA time windows in accordance with an embodiment herein. FIG. 18 illustrates an exemplary correspondence in a 4×3 receive beam configuration. As shown in FIG. 18, based on the correspondence that the first reception using the first receive beam RX_B1 corresponds to the first RA time window, in the first set of three RA time windows, the RA preambles are received each using the first receive beams (e.g., RX_B1). In the second set of three RA time windows, they are received each using the second receive beam. Next, in the third, the fourth sets of RA time windows, they are received each using the third and fourth receive beams, respectively. It is to be noted that FIG. 18 only illustrates one cycle of an exemplary beam configuration, the above arrangement may be repeated at a later time to receive RA preambles.

In some embodiments, in the hierarchical beamforming, a correspondence between receive beams at the base station side and a plurality of RA time windows can include a correspondence between a plurality of levels of receive beams at the base station side and a plurality of RA time windows.

Transmit Beam Arrangement on Terminal Device Side

In the case where transmit and receive beams in the uplink and downlink have symmetry, if a terminal device has obtained a transmit beam configuration at a base station side before transmitting a RA preamble (for example, during the reception of synchronization signal), the terminal device can determine a receive beam configuration at the base station side according to the beam symmetry. Then, if the terminal device has determined its own receive beam arrangement as that in FIG. 8, its transmit beam configuration can be determined directly based on the correspondence between receive and transmit beams on either side (transmitting or receiving side) under beam symmetry. That is, the terminal device only needs to be on the basis of indication of beam symmetry to determine its own transmit beam configuration.

Without the beam symmetry, if a terminal device needs to use transmit beamforming to transmit a RA preamble, it can determine its own transmit beam arrangement based on the receive beam configuration at the base station side. Then, the base station can notify the terminal device of its receive beam configuration. For example, the receive beam configuration can be notified via the dual connectivity shown in FIG. 9. After the dual connectivity is established with the two base stations via the process of FIG. 9 and the base station serves as the secondary node and the other base station serves as the primary node, the terminal device can obtain the receive beam configuration of the base station which serves as the secondary node via the primary node. As another example, the base station can inform its receive beam configuration through system information. After obtaining the receive beam configuration at the base station side, the terminal device can determine its own transmit beam arrangement, as described in detail below.

Figure 19A:
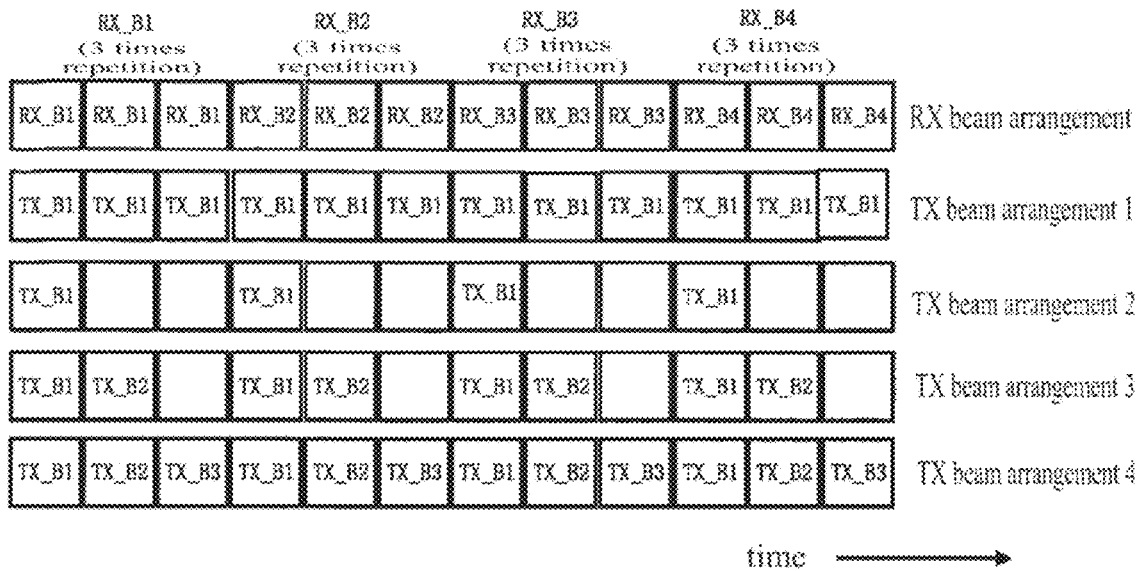
FIGS. 19A and 19B illustrate an exemplary transmit beam arrangement on a terminal device side under a base station side specific receive beam configuration, in accordance with an embodiment herein.

The terminal device may transmit a RA preamble with or without transmit beamforming. FIG. 19A illustrates an exemplary transmit beam arrangement of a terminal device under a 4×3 receive beam configurations at the base station side. The transmit beam arrangements 1 and 2 in FIG. 19A correspond to the case where the terminal device does not use transmit beamforming to transmit a RA preamble. Then, the electronic device 1500A can generally use transmit beam arrangement 1, i.e., use a full-width transmit beam (e.g., TX_B1) for each transmission of each transmit beam. The advantage of the transmit beam arrangement 1 is, for example, that the RA preamble can be transmitted multiple times to achieve a diversity gain. The electronic device 1500A, in the case of knowing the receive beam configuration of the base station side, can also use the transmit beam arrangement 2, i.e., for multiple receptions of each receive beam, only to transmit once by using a full-width transmit beam (e.g. TX_B1). The advantage of the transmit beam arrangement 2 is that the transmission resources (e.g., power, etc.) of the terminal device can be saved and the occupation of RA resources can be reduced, thus avoiding collisions between terminal devices.

The transmit beam arrangements 3 and 4 in FIG. 19A correspond to the case where a terminal device transmits RA preambles using 2 or 3 different transmit beams, respectively. Then, for multiple receptions of each receive beam, the electronic device 1500A needs to transmit using different transmit beams. In the receive beam arrangement 3 or 4, since the electronic device 1500A knows that each receive beam is repeated 3 times at the base station side, it is possible to arrange its own transmit beam in these 3 repetitions, so that each transmit beam is used at least once, thereby realizing the purpose of beam scanning. FIG. 19A illustrates only one cycle of transmission of different transmit beams, which can be followed by the next cycle.

Similar to the case of the aforementioned receive beam arrangement at a terminal device side, in light of the teachings herein, those skilled in the art can conceive various variations of receive beam configurations to implement beam scanning, all of which fall within the scope of the present disclosure.

Figure 19B:
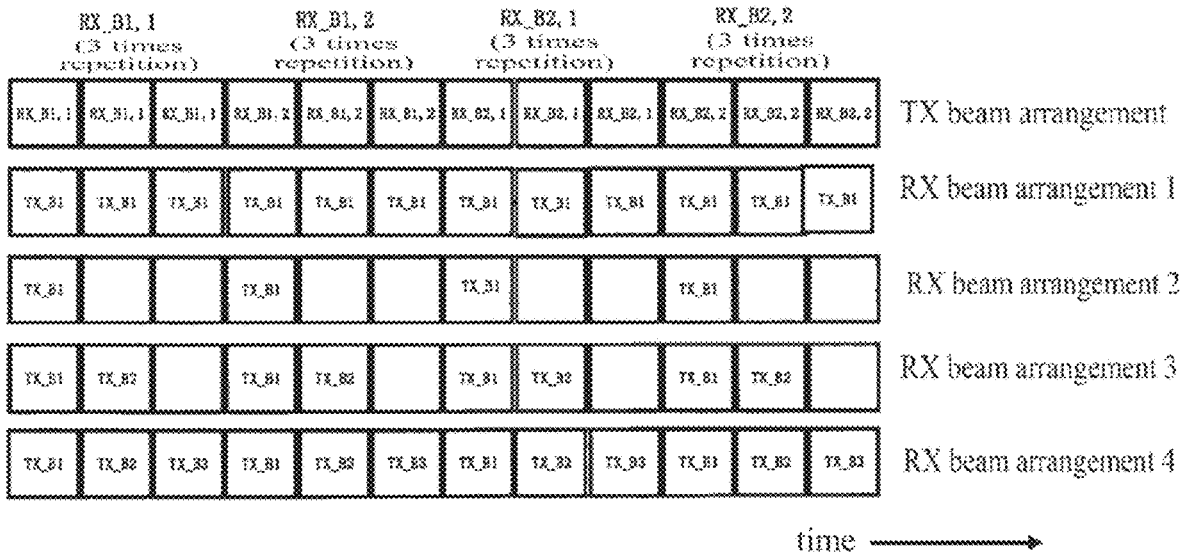

It should be understood that in the hierarchical receive beam configuration at the base station side, FIG. 19A can be considered to have shown the first level receive beams and various transmit beam arrangements at the corresponding terminal device side. The first level beams can be followed by the second level the beams. FIG. 19B illustrates a second level of receive beam configuration and an exemplary transmit beam arrangement of a terminal device. The first level of the hierarchical receive beam configuration is 4×3 configuration, and the second level of the configuration is 2×3 configuration (where each first level receive beam corresponds to two second level receive beams) (For simplicity, only the second level beams corresponding to the first two first level beams are shown). In one example, after receptions using the first level receive beams as that in FIG. 19A, the receptions can then be done using the second level receive beams, as shown in the receive beam configuration in FIG. 19B. In FIG. 19B, each of the second level receive beams corresponding to each of the first level receive beams is successively repeated up to the number of times indicated in the receive beam configuration. For example, the second level receive beam RX_B1,1 corresponding to the first level receive beam RX_B1, is first repeated 3 times, and then RX_B1, 2 is also repeated 3 times, thereby completing the scanning of the second level transmit beams corresponding to the first level receive beam RX_B1. Next, scanning of the second level receive beams corresponding to the next second level receive beams is sequentially performed.

Similar to that described in FIG. 19A, in FIG. 19B, the transmit beam arrangements 1 and 2 correspond to the case where the terminal device does not use transmit beamforming. Thus, the electronic device 1500A can use the transmit beam arrangement 1, i.e., use a full-width transmit beam (e.g., TX_B1) to transmit a RA preamble. As mentioned previously, the transmit beam arrangement 1 can achieve a diversity gain. In the case where the electronic device 1500A knows a receive beam configuration at a base station, the electronic device 1500A can also use the transmit beam arrangement 2, i.e., for multiple receptions of each receive beam, only to transmit once using a full-width transmit beam (e.g., TX_B1). The advantage of the transmit beam arrangement 2 is that the transmitting resources (e.g., power, etc.) of the terminal device can be saved and the occupation of RA resources can be reduced, thus avoiding collisions between terminal devices.

The transmit beam arrangements 3 and 4 in FIG. 19B correspond to the case where a terminal device transmits RA preambles using 2 or 3 different transmit beams, respectively. Thus, for multiple receptions of each second level the receive beams, the electronic device 1500A needs to transmit using different transmit beams. To this end, the electronic device 1500A needs to know the receive beam configuration of the base station to arrange the corresponding transmit beams. In the transmit beam arrangement 3 or 4, since the electronic device 1500A knows that each second level receive beam is repeated 3 times, it is possible to arrange its own transmit beams in these 3 repetitions, so that each transmit beam is used at least once, thereby realizing the purpose of beam scanning. FIG. 19B illustrates one cycle of different second level beam transmissions. In the case of a hierarchical beam scan, after completing one cycle of the second level beam scan, a first level beam scan and a second level beam scan of the next cycle can be performed. Those of ordinary skill in the art, in the light the teachings herein, can conceive various variations of transmit beam configurations to implement beam scanning, all of which are within the scope of the present disclosure.

Feedback of Matching Transmit Beam at Base Station Side

An example operation of a terminal device feeding back a matching transmit beam at a base station side to the base station in accordance with an embodiment herein is described below. In some embodiments, one or more transmit beams at the base station side paired with one or more receive beams at the terminal device side are determined by the terminal device based on receiving synchronization signals. In some embodiments, a RA preamble transmitted by the terminal device can indicate one or more transmit beams at the base station side in the downlink paired with one or more receive beams at the terminal device side.

In one embodiment, transmit beam IDs of one or more transmit beams at the base station side that are paired with receive beams at a terminal device side are indicated by a RA preamble. For example, the RA preamble can include a preamble sequence (e.g., a Zadoff-Chu sequence), which preamble sequence per se can represent a transmit beam ID. This is similar to the example of FIG. 11A in that the preamble sequences can be divided into multiple groups, and all preamble sequences in a same group can represent a same transmit beam. For a 4×3 transmit beam configuration, these preamble sequences can be divided (e.g., equally divided) into 4 groups, and the sequences in each group can represent one of the 4 transmit beams. For example, any of the first group of sequences (1st to N/4th sequences) can represent the transmit beam ID 1. The electronic device 1500A can transmit a preamble sequence corresponding to the transmit beam with ID 1 when feeding back this transmit beam ID 1. After determining that one of the first group of sequences is received, the electronic device 1500B can determine that ID of the matching transmit beam is the transmit beam ID 1. Of course, in such an embodiment, the base station and the terminal device are also required to agree upon the correspondence between each group of preamble sequences and the transmit beams (for example, the terminal device is notified by the base station with any signaling).

For another example, in addition to the preamble sequences, the RA preamble can further include additional information bits, which can represent the transmit beam ID. In one example, a single transmission of a RA preamble can indicate a single transmit beam ID. Referring to the example of FIG. 11B, for the 4×3 transmit beam configuration, additional bits 00, 01, 10, 11 can be designated to represent one of the 4 transmit beams, respectively. For example, the additional information bits 00 can represent the transmit beam ID 1. The electronic device 1500A can transmit the additional information bits 00 when feeding back the transmit beam ID 1. After determining that the additional bits 00 is received, the electronic device 1500B can determine that the matching transmit beam ID is the transmit beam ID 1. In such an embodiment, similarly, the base station and the terminal device are required to agree upon the correspondence between the additional bits and transmit beams. In one example, a single transmission of the RA preamble can indicate multiple transmit beam IDs. The number of additional information bits described above can be increased, for example, in the example of FIG. 11B, 2 transmit beam IDs can be indicated using 4 bits.

According to the exemplary arrangements 1 to 4 of the terminal device transmit beams shown in FIGS. 19A and 19B, for each receive beam (e.g., RX_B1 to RX_B4 and each fine beams) at the base station side, terminal device can transmit RA preambles. This approach is applicable to both in uplink and downlink with or without beam symmetry. In some embodiments, for example, where the terminal device knows the matching receive beam at the base station side, the terminal device can just transmit a RA preamble for the matching receive beam, as described below with reference to FIGS. 20A and 20B.

Figure 20A:
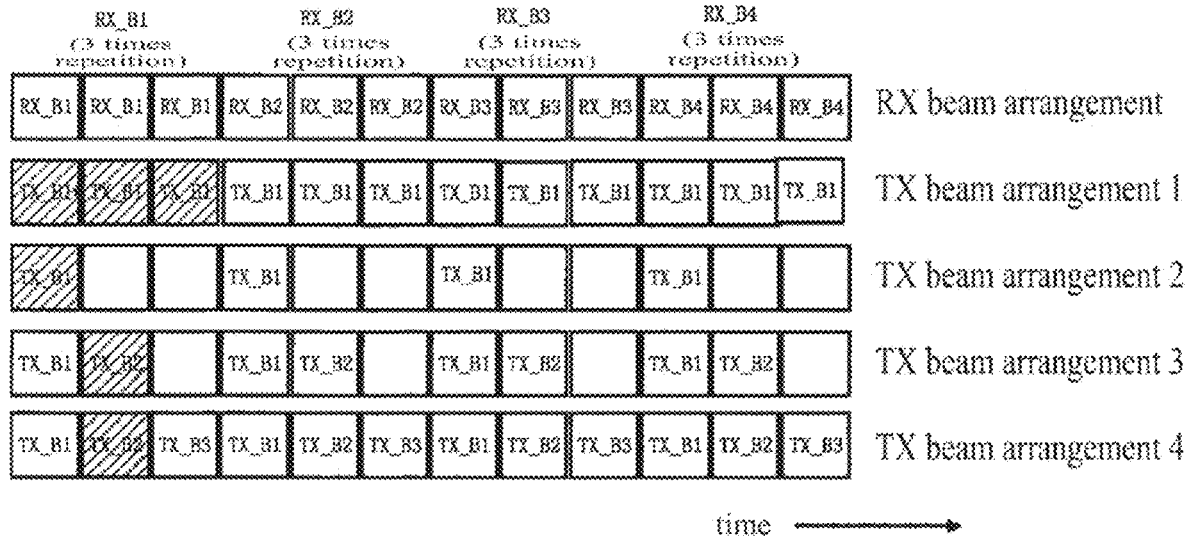
FIGS. 20A and 20B illustrate an example method of transmitting a random access preamble in accordance with an embodiment herein.
Figure 20B:
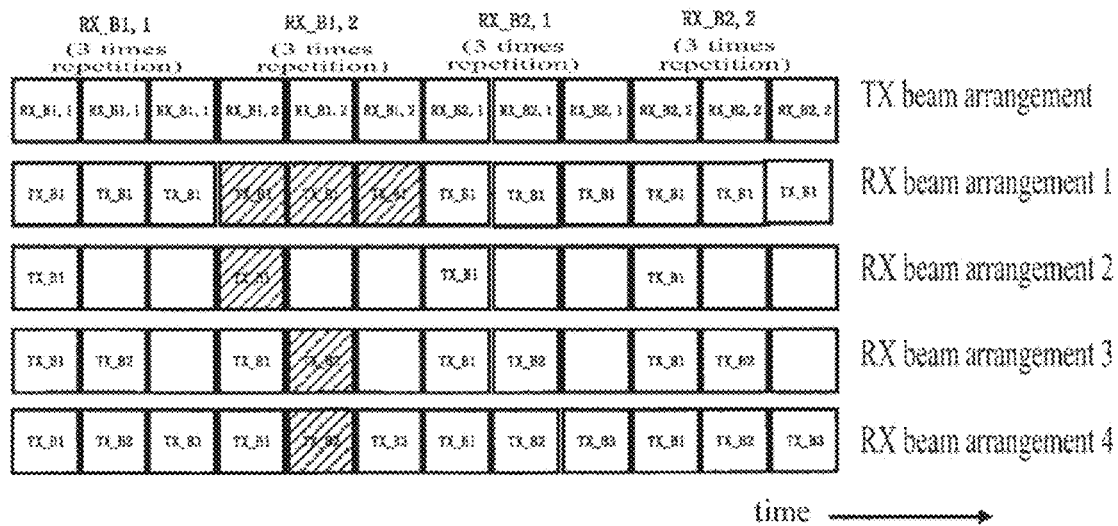

FIGS. 20A and 20B illustrate an example of transmitting RA preambles based on a transmit beam arrangement at a terminal device side. The transmit beam configurations at the terminal device side in FIGS. 20A and 20B are the same as those in FIGS. 19A and 19B, with the exception that the RA preambles are only transmitted for a specific receive beam at the base station side. Moreover, these transmissions can be made using a specific transmit beam, as indicated by the shadow in the figure. This approach can be applied to the case where there is beam symmetry in the uplink and/or downlink. In this case, if the terminal device knows the matching transmit receive beams pair in the downlink (e.g., determined by the reception of the synchronization signal), the matching transmit receive beams pair in the uplink can be determined, to facilitate transmission of the RA preamble.

For example, in FIG. 20A, for the first level beam scanning, assuming that the terminal device determines the transmit beam TX_B1 at the base station side matches with the receive beam RX_B2 at the terminal device side in downlink, then it can be determined that the receive beam at the base station side matching with the terminal device in uplink is RX_B1, which matches with the transmit beam TX_B2 at the terminal device side. Accordingly, the terminal device can transmit the RA preamble (for example, using the transmit beams TX_B1 to TX_B3) only in the RA time windows corresponding to the receive beam RX_B1. Further, the terminal device can transmit the RA preamble using the matching transmit beam TX_B2 only in the RA time windows corresponding to the receive beam RX_B1 (shown by the shadow in the figure). For transmit beam configurations 1 and 2, since the full-wave transmission is used by the terminal device, the RA preamble can be transmitted using the full-wave transmission only in the RA time windows corresponding to the receive beam RX_B1.

FIG. 20B illustrates an example of a second level beam scanning corresponding to FIG. 20A. In the second level beam scanning, assuming that the terminal device determines that transmit beams TX_B1, 2 at the base station side matches with the receive beam RX_B2 at the terminal device side in downlink, then it can be determined that the receive beam at the base station side matching with the terminal device in uplink is RX_B1, 2, which matches with the transmit beam TX_B2 at the terminal device side. Accordingly, the terminal device can transmit the RA preamble (for example using the transmit beams TX_B1 to TX_B3) only in the RA time windows corresponding to the receive beam RX_B1, 2. Further, the terminal device can transmit the RA preamble using the matching transmit beam TX_B2 only in the RA time windows corresponding to the receive beam RX_B1, 2 (shown by the shadow in the figure). For transmit beam configurations 1 and 2, since the full-wave transmission is used by the terminal device, the RA preamble can be transmitted using the full-wave transmission only in the RA time windows corresponding to the receive beam RX_B1, 2.

Figure 21A:
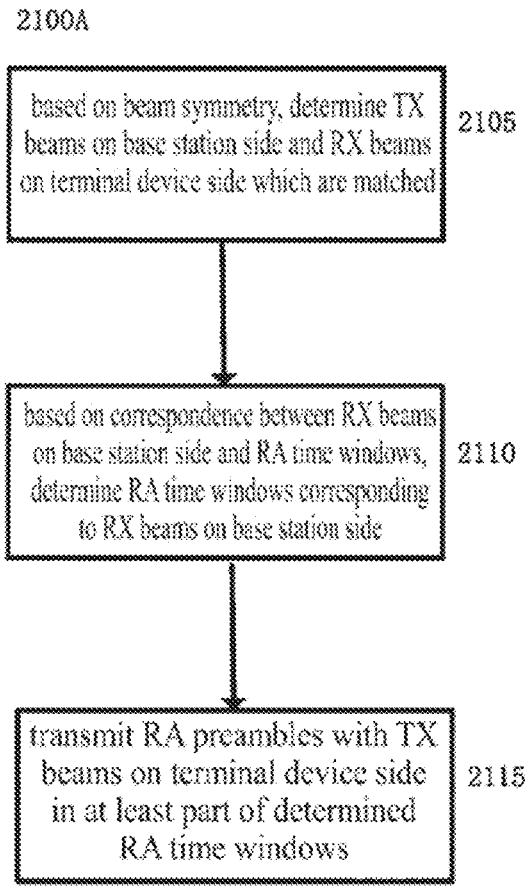
FIG. 21A illustrates an exemplary method in which a terminal device transmits a random access preamble according to an embodiment herein.

In the above example, when the RA preamble is transmitted in a particular RA time window, the particular RA time window per se can indicate transmit beam ID of one or more transmit beams at the base station side paired with one or more receive beams at the terminal device side in downlink. FIG. 21A illustrates an example method in which a terminal device transmits a RA preamble in accordance with an embodiment herein. At 2105, in the case that the matching transmit beam(s) at the base station side and receive beam(s) at the terminal device side in downlink are known, the terminal device can determine, based on the beam symmetry, the matching receive beam(s) at the base station side and transmit beam(s) at the terminal device side in uplink. At 2110, the terminal device can determine, based on the correspondence between receive beam(s) at the base station side and a plurality of RA time windows, from the plurality of RA time windows, one or more RA time windows corresponding to receiving beam(s) at the base station side. At 2115, the terminal device can transmit the RA preambles with one or more transmit beams at the terminal device side in at least a part of the one or more RA time windows.

Figure 21B:
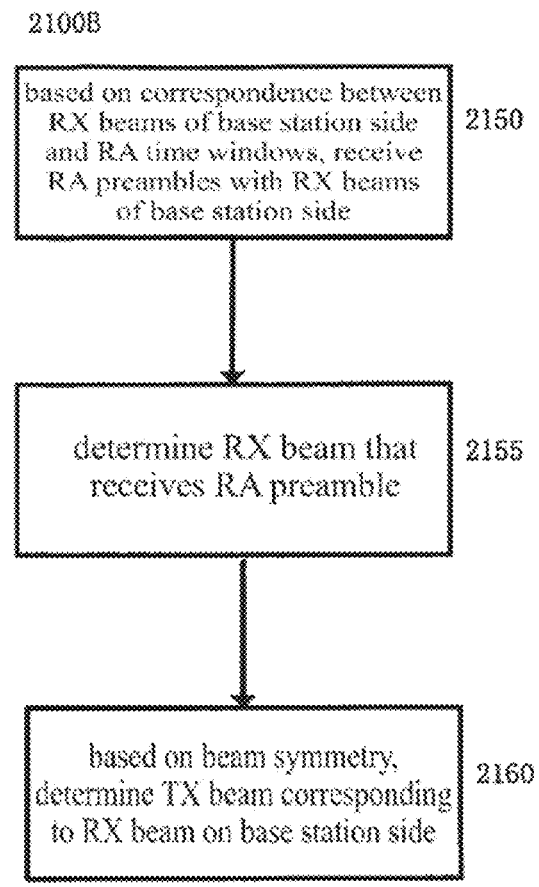
FIG. 21B illustrates an exemplary method in which a base station receives a random access preamble in accordance with an embodiment herein.

FIG. 21B illustrates an example method in which a base station receives RA preambles in accordance with an embodiment herein. At 2150, the base station can receive the RA preambles with the receive beam at the base station side based on the correspondence between receive beam(s) at the base station side and a plurality of RA time windows. It can be understood that the base station should receive the corresponding RA preamble in the RA time window corresponding to the receive beam at the base station side determined at step 2110. At 2155, the base station can determine the receive beam that receives the RA preamble based on the correspondence between the receive beams at the base station side and the RA time windows. At 2160, the base station can determine, based on beam symmetry, the transmit beam corresponding to the receive beam at the base station side, i.e., the transmit beam in downlink that matches with the terminal device.

In the above method example, the RA time window per se can indicate a transmit beam ID. Thus, ID of the same matching transmit beam can be indicated by a synchronization sequence or additional information bits to increase the robustness of transmit beam ID detection. Alternatively, ID of another matching transmit beam can be indicated by the synchronization sequence or additional information bits such that a single transmission of the RA preamble can indicate multiple transmit beam IDs.

According to the foregoing embodiment, a single transmission of the RA preamble can indicate multiple transmit beam IDs. Alternatively or additionally, in some embodiments, one or more transmit beams at the base station side in downlink that are paired with one or more receive beams at the terminal device side can be indicated by an uplink message subsequent to the RA preamble. For example, the matching transmit beam at the base station side can be indicated by the MSG-3 message in FIG. 1.

Retransmission of Random Access Preamble

According to some embodiments, in the case where a RA preamble needs to be retransmitted, a terminal device can preferably use a transmit beam that is most relevant to direction of the previous transmit beam at the terminal device side for the retransmission, wherein the direction relevance includes transmission directions are adjacent or at least partially overlapping.

Figure 22:
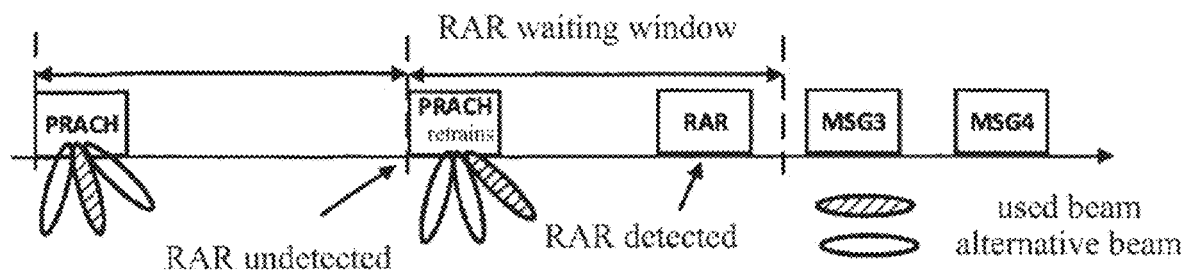
FIG. 22 illustrates an exemplary method of retransmitting a random access preamble in accordance with an embodiment herein.

After transmitting a RA preamble for a first time, the terminal device waits for a RA response (RAR) transmitted by the base station within a certain time windows. If the RAR is received, the terminal device determines that the RA preamble is successfully transmitted. If the terminal device fails to receive the RAR within the RAR waiting time windows, as shown in FIG. 22, the terminal device needs to retransmit the RA preamble. In some embodiments, during retransmission, in order to avoid waste of resources caused by global beam scanning, the terminal device can select a transmit beam for retransmission around the transmit beams used for transmitting the RA preamble for the first time. The transmit beam around can be the transmit beams most relevant to the direction of the transmit beam used at the first time and thus may be the beam that best matches with the base station. That is, it can be considered that the beams around the transmit beam used at the first time can form a Candidate Beam Set, as shown in FIG. 22. During the retransmission process of RA preamble, the transmission power can be gradually increased by a step size until the upper limit of the transmission power of the terminal device. If the terminal device still fails to receive the RAR after retransmitting the RA preamble, the range of the beam scanning can be expanded for transmission. Thereafter, the process is repeated until the terminal device receives the RAR.

According to an embodiment herein, after the range of the beam scanning is expanded for transmitting the RA preamble, the base station can notify the terminal device of a transmit beam matching with the base station in uplink in the RAR message.

Exemplary Method

Figure 23A:
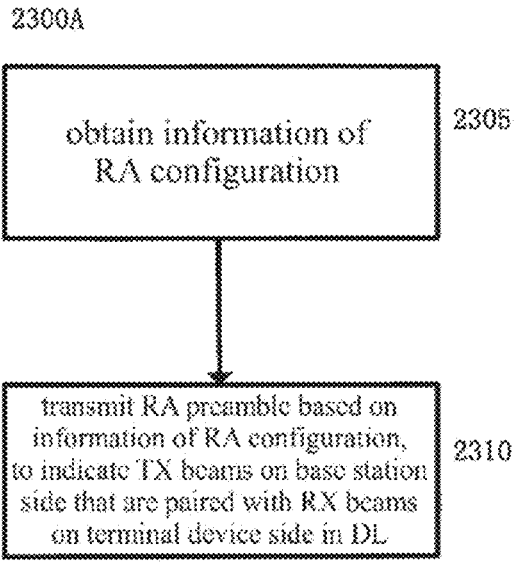
FIGS. 23A and 23B illustrate an example method for communication in accordance with an embodiment herein.

FIG. 23A illustrates an example method for communication in accordance with an embodiment herein. As shown in FIG. 23A, the method 2300A can include obtaining information of a RA configuration (block 2305). The method also includes transmitting a RA preamble based on the information of the RA configuration, to indicate one or more transmit beams at the base station side that paired with one or more receive beams at the terminal device side in downlink (block 2310). The method can be performed by electronic device 1500A, and detailed example operations of the method may refer to the above description of the operations and functions performed by the electronic device 1500A, which are briefly described as follows.

In one embodiment, one or more transmit beams at the base station side paired with one or more receive beams at the terminal device side are determined by the terminal device based on receiving the synchronization signal.

In one embodiment, the RA preamble indicates identification information of one or more transmit beams at the base station side paired with one or more receive beams at the terminal device side, such as a transmit beam ID.

In one embodiment, the RA preamble indicates transmit beam IDs of one or more transmit beams at the base station side paired with one or more receive beams at the terminal device side by at least one of: the RA preamble includes a preamble sequence, the preamble sequence per se representing a transmit beam ID; or the RA preamble further includes additional information bits, the additional information bits representing the transmit beam ID.

In one embodiment, a single transmission of the RA preamble can indicate a single transmit beam ID or multiple transmit beam IDs.

In one embodiment, the RA configuration information further includes correspondence between beams at the base station side and a plurality of RA occasions, and the method further includes: repetitively transmitting the RA preamble with different transmit beams at the terminal side based on the correspondence; or repetitively transmitting the RA preamble with transmit beams corresponding to one or more receive beams at the terminal device side based on the correspondence.

In one embodiment, the method further comprises transmitting a RA preamble in a particular RA occasion, the particular RA occasion indicating transmit beam IDs of one or more transmit beams at the base station side paired with one or more receive beams at the terminal device side in downlink.

In one embodiment, the RA configuration information further includes correspondence between beams at the base station side and a plurality of RA occasions, where there is beam symmetry in uplink and/or downlink between the base station and the terminal device, the method further includes transmitting a RA preamble by: determining the one or more matching receive beams at the base station side and one or more transmit beams at the terminal device side in uplink based on the beam symmetry; determining one or more RA occasions corresponding to one or more beams at the base station side from the plurality of RA occasions based on the correspondence; and transmitting the RA preamble with one or more transmit beams of the terminal device side in at least a part of the one or more RA occasions.

In one embodiment, the correspondence between beams at the base station side and a plurality of RA occasions includes correspondence between multiple levels of beams at the base station side and multiple RA occasions.

In one embodiment, the method further comprises indicating one or more transmit beams at the base station side paired with one or more receive beams at the terminal device side in downlink by an uplink message subsequent to the RA preamble.

In one embodiment, the method further comprises retransmitting by preferably using a transmit beam that is most relevant to direction of the previous transmit beam at the terminal device side in the case where a RA preamble needs to be retransmitted, wherein the direction relevance includes transmission directions are adjacent or at least partially overlapping.

In one embodiment, the synchronization signal corresponds to a SS block comprising a PSS, a SSS, and a PBCH, the method further comprises receiving a plurality of SS blocks transmitted by different transmit beams at the base station side within a shorter period in time domain, and using transmit beams at the base station side corresponding to SS blocks in which signal reception quality satisfies a predetermined condition as transmit beams at the base station side paired with the terminal device.

In one embodiment, the method further comprises determining, based on the reference signal sequence per se in the SS block that satisfies the predetermined condition, a transmit beam used to transmit the SS block by the base station.

In one embodiment, the method further comprises determining, based on the additional information bits in the SS block that satisfies the predetermined condition, a transmit beam used to transmit the SS block by the base station.

In one embodiment, the method further comprises receiving radio resource control signaling and obtaining the RA configuration information therefrom.

In one embodiment, an electronic device performing the method can operate as a terminal device, which can include one or more radio frequency links, each radio frequency link being coupled to a plurality of antennas and their phase shifters. The terminal device (e.g., its processing circuitry) can configure the phase shifters of the plurality of antennas based on beam directions that match with the beams at the base station side, to cause the plurality of antennas transmit the RA preamble to the base station by beamforming. In one embodiment, the wireless communication system is a fifth generation New Radio communication system and the base station is a gNB.

Figure 23B:
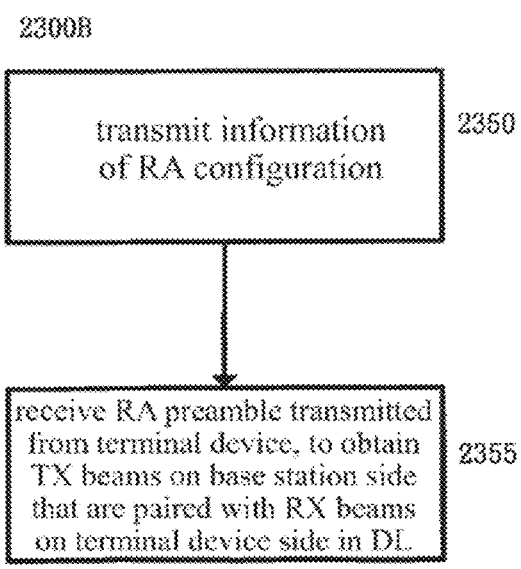

FIG. 23B illustrates another example method for communication in accordance with an embodiment herein. As shown in FIG. 23B, the method 2300B can include transmitting information of the RA configuration (block 2350). The method also includes receiving a RA preamble transmitted from the terminal device, to obtain one or more transmit beams at the base station side that are paired with one or more receive beams at the terminal device side in downlink (block 2355). The method can be performed by electronic device 1500B, and detailed example operations of the method may refer to the above description of operations and functions performed by electronic device 1500B, which are briefly described as follows.

In one embodiment, one or more transmit beams at the base station side paired with one or more receive beams at the terminal device side are determined by the terminal device based on receiving the synchronization signal.

In one embodiment, the RA preamble indicates identification information of one or more transmit beams at the base station side paired with one or more receive beams at the terminal device side, such as a transmit beam ID.

In one embodiment, the RA preamble indicates transmit beam IDs of one or more transmit beams at the base station side paired with one or more receive beams at the terminal device side by at least one of: the RA preamble includes a preamble sequence, the preamble sequence per se representing a transmit beam ID; or the RA preamble further includes additional information bits, the additional information bits representing the transmit beam ID.

In one embodiment, a single transmission of the RA preamble can indicate a single transmit beam ID or multiple transmit beam IDs.

In one embodiment, the RA configuration information further includes correspondence between beams at the base station side and a plurality of RA occasions, and the method further includes receiving the RA preamble with beams at the base station side based on the correspondence.

In one embodiment, the method further comprises receiving a RA preamble in a particular RA occasion, the particular RA occasion indicating transmit beam IDs of one or more transmit beams at the base station side paired with one or more receive beams at the terminal device side in downlink.

In one embodiment, the RA configuration information further includes correspondence between beams at the base station side and a plurality of RA occasions, where there is beam symmetry in uplink and/or downlink between the base station and the terminal device, the method further includes receiving a RA preamble by: receiving the RA preamble with a receive beam at the base station side based on the correspondence; determining a receive beam that receives the RA preamble; and determining a transmit beam corresponding to the receive beam at the base station side based on the beam symmetry.

In one embodiment, the correspondence between beams at the base station side and a plurality of RA occasions includes correspondence between multiple levels of beams at the base station side and multiple RA occasions.

In one embodiment, the method further comprises obtaining one or more transmit beams at the base station side paired with one or more receive beams at the terminal device side in downlink from an uplink message subsequent to the RA preamble.

In one embodiment, the synchronization signal corresponds to a SS block comprising a PSS, a SSS, and a PBCH, the method further comprises transmitting a plurality of SS blocks by different transmit beams at the base station side within a shorter period in time domain.

In one embodiment, the SS block indicates, by the reference signal sequence per se in the SS block, information of the transmit beam used to transmit the SS block by the base station.

In one embodiment, the SS block further includes additional information bits through which to indicate the information of transmit beams used to transmit the SS block by the base station.

In one embodiment, the method further comprises transmitting radio resource control signaling to transmit the RA configuration information to the terminal device. In one embodiment, the wireless communication system is a fifth generation New Radio communication system and the base station is a gNB.

In some embodiments, the electronic devices 300A, 300B, 1300A, 1500A, and 1500B, etc., can be implemented at the chip level, or can be implemented at the device level by including other external components. For example, each electronic device can operate as a communication device operating as a unity machine.

It should be noted that the above-mentioned respective units are only logical modules divided according to the specific functions they implement, and are not intended to limit specific implementations. For example, they can be implemented in software, hardware or a combination of software and hardware. In actual implementation, each of the above units can be implemented as separate physical entities, or can be implemented by as a single entity (e.g., a processor (CPU or DSP, etc.), an integrated circuit, etc.). Processing circuitry can refer to various implementations of digital circuitry, analog circuitry, or mixed signal (combination of analog and digital) circuitry that perform functions in a computing system. Processing circuitry can include, for example, circuitry such as an integrated circuit (IC), an application specific integrated circuit (ASIC), a portion or circuit of a separate processor core, an entire processor core, a separate processor, a programmable hardware device such as a field programmable gate array (FPGA), and/or systems including multiple processors.

Various exemplary electronic devices and methods in accordance with the present disclosure are described above. It should be understood that the operations or functions of these electronic devices can be combined with each other to achieve more or less operations or functions than those described. In one embodiment, one electronic device can implement all of the operations or functions of electronic devices 300A, 1300A, and 1500B, or one electronic device can implement all of the operations or functions of electronic devices 300B and 1500A. The operational steps of the various methods can also be combined with one another in any suitable order to similarly achieve more or less operations than those described.

For example, according to still another aspect of the present disclosure, an electronic device for a terminal device side in a wireless communication system can include processing circuitry configured to: receive, from a base station in the wireless communication system, a plurality of synchronization signal blocks including, respectively, a PSS, a SSS, and a PBCH, for downlink synchronization, wherein the plurality of synchronization signal blocks are transmitted by different transmit beams at the base station side, and each synchronization signal block can indicate information of a transmit beam used to transmit the synchronization signal block by the base station; determining a synchronization signal block that matches with the terminal device based on reception quality; and transmitting a RA preamble to the base station to perform a RA process, wherein the RA preamble can indicate information of the transmit beam used to transmit the matching synchronization signal block by the base station, for being used by the base station in beam management.

In one embodiment, the synchronization signal block indicates, by a reference signal sequence per se in the synchronization signal block, information of the transmit beam used to transmit the synchronization signal block by the base station.

In one embodiment, the synchronization signal block further comprises additional information bits by which to indicate information of the transmit beam used to transmit the synchronization signal block by the base station.

In one embodiment, the preamble sequence of the RA preamble indicates information of the transmit beam used to transmit the matching synchronization block by the base station.

In one embodiment, a plurality of preamble sequences are used to indicate information of the transmit beam for a same synchronization signal block, and the electronic device determines correspondence between a plurality of preamble sequences and the transmit beam for the synchronization signal block from a signaling from the base station.

In one embodiment, the processing circuitry is further configured to: receive, from the base station, a radio resource control signaling including RA configuration information, wherein the RA configuration information comprises correspondence between beams at the base station side and a plurality of RA occasions; and select a specific RA occasion to transmit a RA preamble according to the RA configuration information, to indicate information of the transmit beam used to transmit the matching synchronization signal block by the base station.

In one embodiment, the processing circuitry is further configured to receive a CSI-RS beam transmitted by the base station in a transmit beam direction corresponding to the matching synchronization signal block, and feedback information of the CSI-RS beam matching with the terminal device to the base station.

In one embodiment, the processing circuitry is further configured to receive the plurality of synchronization signal blocks by using a plurality of receive beams and determine the matching receive beam of the terminal device according to reception quality.

In one embodiment, the wireless communication system has beam symmetry, and the processing circuitry is further configured to transmit to the base station the RA preamble by using the transmit beam at the terminal device side corresponding to the matching receive beam of the terminal device.

In one embodiment, the processing circuitry is further configured to, in a case where a RA response by the base station is not received within a predetermined time period after transmitting the RA preamble, retransmit the RA preamble by using a transmit beam around the transmit beam at the terminal device side.

In one embodiment, the wireless communication system is a 5G NR system, the base station is a gNB, and the terminal device comprises a plurality of antennas for transmitting signals by beamforming.

For example, according to still another aspect of the present disclosure, a method for a terminal device side in a wireless communication system comprises: receiving, from a base station in the wireless communication system, a plurality of Synchronization Signal blocks including, respectively, a PSS, a SSS, and a PBCH, for downlink synchronization, wherein the plurality of synchronization signal blocks are transmitted by different transmit beams at the base station side, and each synchronization signal block can indicate information of the transmit beam used to transmit the synchronization signal block by the base station; determining a synchronization signal block that matches with the terminal device based on reception quality; and transmitting a RA preamble to the base station to perform a RA process, wherein the RA preamble can indicate information of the transmit beam used to transmit the matching synchronization signal block by the base station, for being used by the base station in beam management.

In one embodiment, the synchronization signal block indicates, by a reference signal sequence per se in the synchronization signal block, information of the transmit beam used to transmit the synchronization signal block by the base station.

In one embodiment, the synchronization signal block further comprises additional information bits by which to indicate information of the transmit beam used to transmit the synchronization signal block by the base station.

In one embodiment, the preamble sequence of the RA preamble indicates information of the transmit beam used to transmit the matching synchronization signal block by the base station.

In one embodiment, a plurality of preamble sequences are used to indicate information of the transmit beam for a same synchronization signal block, the method further comprising determining correspondence between a plurality of preamble sequences and the transmit beam for the synchronization signal block from a signaling from the base station.

In one embodiment, the method further comprises: receiving, from the base station, a radio resource control signaling including RA configuration information, wherein the RA configuration information comprises correspondence between beams at base station side and a plurality of RA occasions; and selecting a specific RA occasion to transmit a RA preamble according to the RA configuration information, to indicate information of the transmit beam for the matching synchronization signal block to the base station.

In one embodiment, the method further comprises receiving a CSI-RS beam transmitted by the base station in a transmit beam direction corresponding to the matching synchronization signal block, and feeding back information of the CSI-RS beam matching with the terminal device to the base station.

In one embodiment, the method further comprises receiving the plurality of synchronization signal blocks by using a plurality of receive beams and determining the matching receive beam of the terminal device based on reception quality.

In one embodiment, the wireless communication system has beam symmetry, the method further comprising transmitting to the base station the RA preamble by using the transmit beam at the terminal device side corresponding to the matching receive beam of the terminal device.

In one embodiment, the method further comprises, in a case where a RA response by the base station is not received within a predetermined time period after transmitting the RA preamble, retransmitting the RA preamble by using a transmit beam around the transmit beam at the terminal device side.

For example, according to still another aspect of the present disclosure, an electronic device for a base station side in a wireless communication system comprises a processing circuitry configured to: transmit, by using different transmit beams at the base station side, a plurality of synchronization signal blocks including, respectively, a PSS, a SSS and a PBCH, to a terminal device in the wireless communication system for downlink synchronization, wherein each synchronization signal block can indicate information of a transmit beam used to transmit the synchronization signal block by the base station; receive a RA preamble from the terminal device to assist a RA process of the terminal device, wherein the RA preamble can indicate information of the transmit beam for the synchronization signal block that matches with the terminal device; determine, according to the RA preamble, a transmit beam at the base station side suitable for downlink transmission to the terminal device for beam management.

In one embodiment, the synchronization signal block indicates, by a reference signal sequence per se in the synchronization signal block, information of the transmit beam used to transmit the synchronization signal block by the base station, and the processing circuitry is further configured to place different reference signal sequences in the plurality of synchronization signal blocks to indicate information of different transmit beams.

In one embodiment, the synchronization signal block further comprises additional information bits by which to indicate information of the transmit beam used to transmit the synchronization signal block by the base station, and the processing circuitry is further configured to place different additional information bits in the plurality of synchronization signal blocks to indicate information of different transmit beams.

In one embodiment, the preamble sequence of the RA preamble indicates information of the transmit beam for the synchronization signal block that matches with the terminal device.

In one embodiment, a plurality of preamble sequences are used to indicate information of the transmit beam for a same synchronization signal block, and the base station transmits a signaling to the terminal device for indicating correspondence between a plurality of preamble sequences and the transmit beam for the synchronization signal block.

In one embodiment, the processing circuitry is further configured to transmit, to the terminal device, a radio resource control signaling including RA configuration information, and the RA configuration information comprises correspondence between beams at the base station side and a plurality of RA occasions, so that the terminal device selects, according to the RA configuration information, a specific RA occasion to transmit a RA preamble, to indicate information of the transmit beam for the matching synchronization signal block.

In one embodiment, the processing circuitry is further configured to transmit a CSI-RS beam in a transmit beam direction corresponding to the matching synchronization signal block, and to receive, from the terminal device, feedback of the information of the CSI-RS beam that matches with the terminal device.

In one embodiment, the wireless communication system is a 5G NR system, the base station is a gNB, and the base station further includes a plurality of antennas for transmitting signals by beamforming.

For example, according to still another aspect of the present disclosure, a method for a base station side in a wireless communication system comprises: transmitting, by using different transmit beams at the base station side, a plurality of Synchronization Signal blocks including, respectively, a PSS, a SSS and a PBCH, to a terminal device in the wireless communication system for downlink synchronization, wherein each synchronization signal block can indicate information of the transmit beam used to transmit the synchronization signal block by the base station; receiving a RA preamble from the terminal device to assist a RA process of the terminal device, wherein the RA preamble can indicate information of the transmit beam for the synchronization signal block that matches with the terminal device; and determining, according to the RA preamble, a transmit beam at the base station side suitable for downlink transmission to the terminal device for beam management.

In one embodiment, the synchronization signal block indicates, by a reference signal sequence per se in the synchronization signal block, information of the transmit beam used to transmit the synchronization signal block by the base station, and the method further comprising placing different reference signal sequences in the plurality of synchronization signal blocks to indicate information of different transmit beams.

In one embodiment, the synchronization signal block further comprises additional information bits by which to indicate information of the transmit beam used to transmit the synchronization signal block by the base station, and the method further comprising placing different additional information bits in the plurality of synchronization signal blocks to indicate information of different transmit beams.

In one embodiment, the preamble sequence of the RA preamble indicates information of the transmit beam for the synchronization signal block that matches with the terminal device.

In one embodiment, a plurality of preamble sequences are used to indicate information of the transmit beam for a same synchronization signal block, and the method further comprising transmitting a signaling to the terminal device for indicating correspondence between a plurality of preamble sequences and the transmit beam for the synchronization signal block.

In one embodiment, the method further comprises transmitting, to the terminal device, a radio resource control signaling including RA configuration information, and the RA configuration information comprises correspondence between beams at the base station side and a plurality of RA occasions, so that the terminal device selects, according to the RA configuration information, a specific RA occasion to transmit a RA preamble to indicate information of the transmit beam for the matching synchronization signal block.

In one embodiment, the method further comprises transmitting a CSI-RS beam in a transmit beam direction corresponding to the matching synchronization signal block, and receiving, from the terminal device, feedback of the information of the CSI-RS beam that matches with the terminal device.

It should be understood that the machine-executable instructions in the storage medium and the program product according to the embodiments herein can also be configured to perform the methods corresponding to the apparatus embodiment described above, and thus the content not described in detail herein can be referred to the description in the previous corresponding positions, thus the description thereof will not be repeated herein.

Accordingly, a storage medium for carrying the above-described program product including machine executable instructions is also included in the disclosure of the present invention. The storage medium includes, but is not limited to, a floppy disk, an optical disk, a magneto-optical disk, a memory card, a memory stick, and the like.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 24, which, when is installed with various programs, can execute various functions and so on. FIG. 24 is a block diagram showing an example structure of a personal computer which can be employed as an information processing device in the embodiment herein. In one example, the personal computer can correspond to the above-described exemplary terminal device in accordance with the present disclosure.

In FIG. 24, a central processing unit (CPU) 1301 executes various processes in accordance with a program stored in a read-only memory (ROM) 1302 or a program loaded from a storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc. The communication unit 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 24 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (eNB), such as a macro eNB and a small eNB. The small eNB can be an eNB covering a cell smaller than the macro cell, such as a pico eNB, a micro eNB, and a home (femto) eNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Use cases according to the present disclosure will be described below with reference to FIGS. 25 to 28.

[Use Cases for Base Stations]

It should be understood that the term base station in this disclosure has the full breadth of its ordinary meaning, and includes at least a radio communication station used as portion of a wireless communication system or radio system to facilitate communication. Examples of the base station can be, for example but not limited to, the following: the base station can be either or both of a base transceiver station (BTS) and a base station controller (BSC) in the GSM system, and can be either or both of a radio network controller (RNC) or Node B in the WCDMA system, can be eNB in the LTE and LTE-Advanced system, or can be corresponding network nodes in future communication systems (e.g., the gNB that can appear in the 5G communication systems, eLTE eNB, etc.). Some of the functions in the base station of the present disclosure can also be implemented as an entity having a control function for communication in the scenario of a D2D, M2M, and V2V communication, or as an entity that plays a spectrum coordination role in the scenario of a cognitive radio communication.

First Use Case

Figure 25:
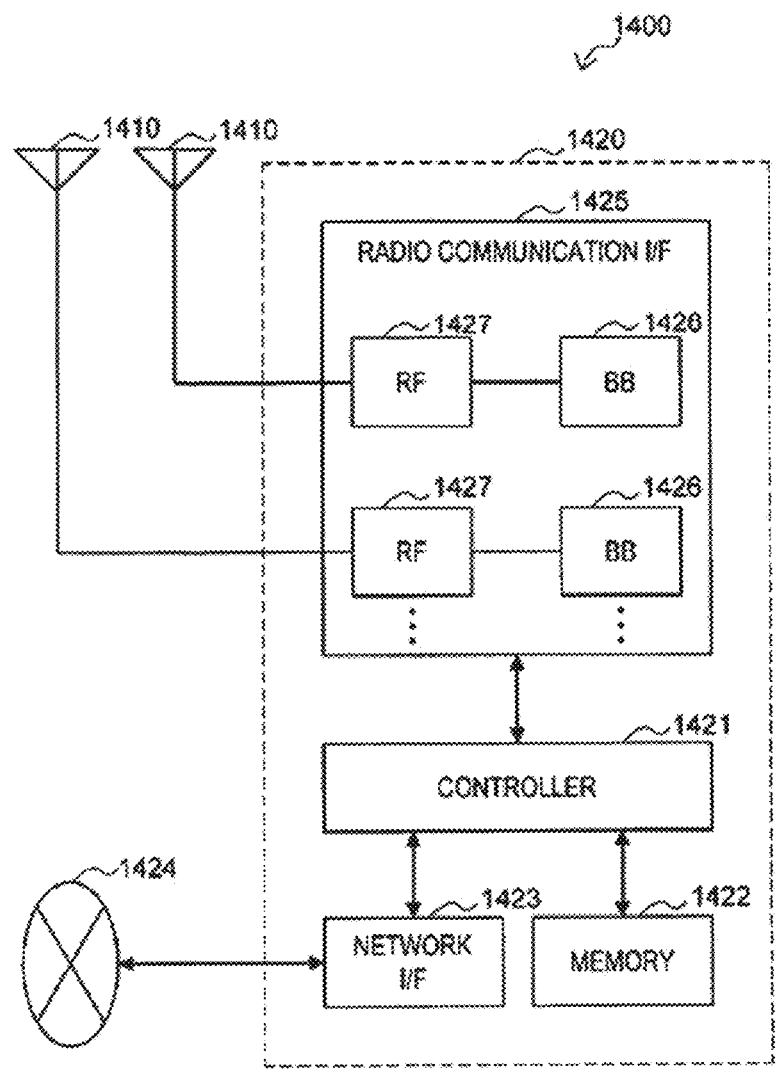
FIG. 25 is a block diagram illustrating a first example of a schematic configuration of a gNB to which the technology of the present disclosure can be applied.

FIG. 25 is a block diagram illustrating a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 25, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple base band processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 25 illustrates an example in which one RF circuit 1427 is connected to one antenna 1410, the present disclosure is not limited to thereto; rather, one RF circuit 1427 may connect to a plurality of antennas 1410 at the same time.

As illustrated in FIG. 25, the radio communication interface 1425 may include the multiple BB processors 1426. For example, the multiple BB processors 1426 may be compatible with multiple frequency bands used by gNB 1400. As illustrated in FIG. 25, the radio communication interface 1425 may include the multiple RF circuits 1427. For example, the multiple RF circuits 1427 may be compatible with multiple antenna elements. Although FIG. 25 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 26:
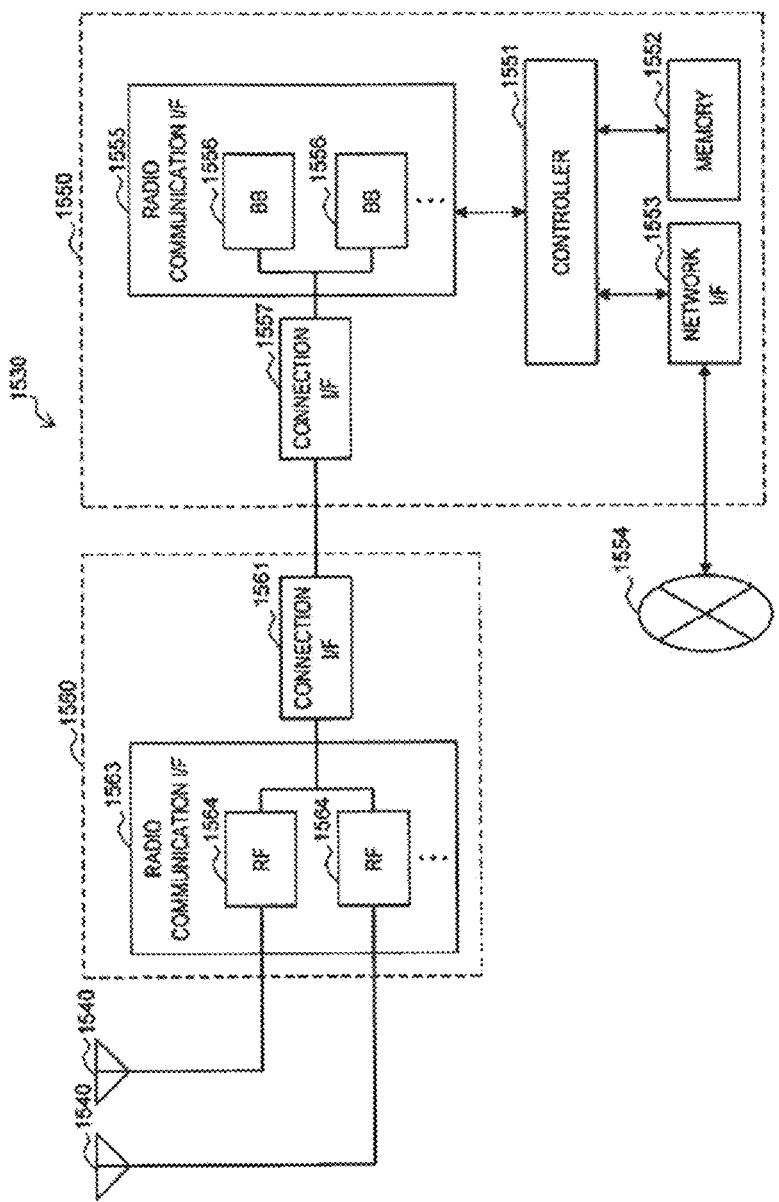
FIG. 26 is a block diagram illustrating a second example of a schematic configuration of a gNB to which the technology of the present disclosure can be applied.

FIG. 26 is a block diagram illustrating a second example of a schematic configuration of a gNB to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements such as multiple antenna elements included in a MIMO antenna and is used for the RRH 1560 to transmit and receive radio signals. The gNB 1530 may include multiple antennas 1540, as illustrated in FIG. 26. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 25.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 25, except that the BB processor 1556 is connected to the RF circuit 1564 of the RRH 1560 via the connection interface 1557. The radio communication interface 1555 may include the multiple BB processors 1556, as illustrated in FIG. 26. For example, the multiple BB processors 1556 may be compatible with multiple frequency bands used by the gNB 1530. Although FIG. 26 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 26 illustrates the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as illustrated in FIG. 26. For example, multiple RF circuits 1564 may support multiple antenna elements. Although FIG. 26 illustrates the example in which the radio communication interface 1563 includes the multiple RF circuits 1564, the radio communication interface 1563 may also include a single RF circuit 1564.

[Use Cases Related to User Devices]

First Use Case

Figure 27:
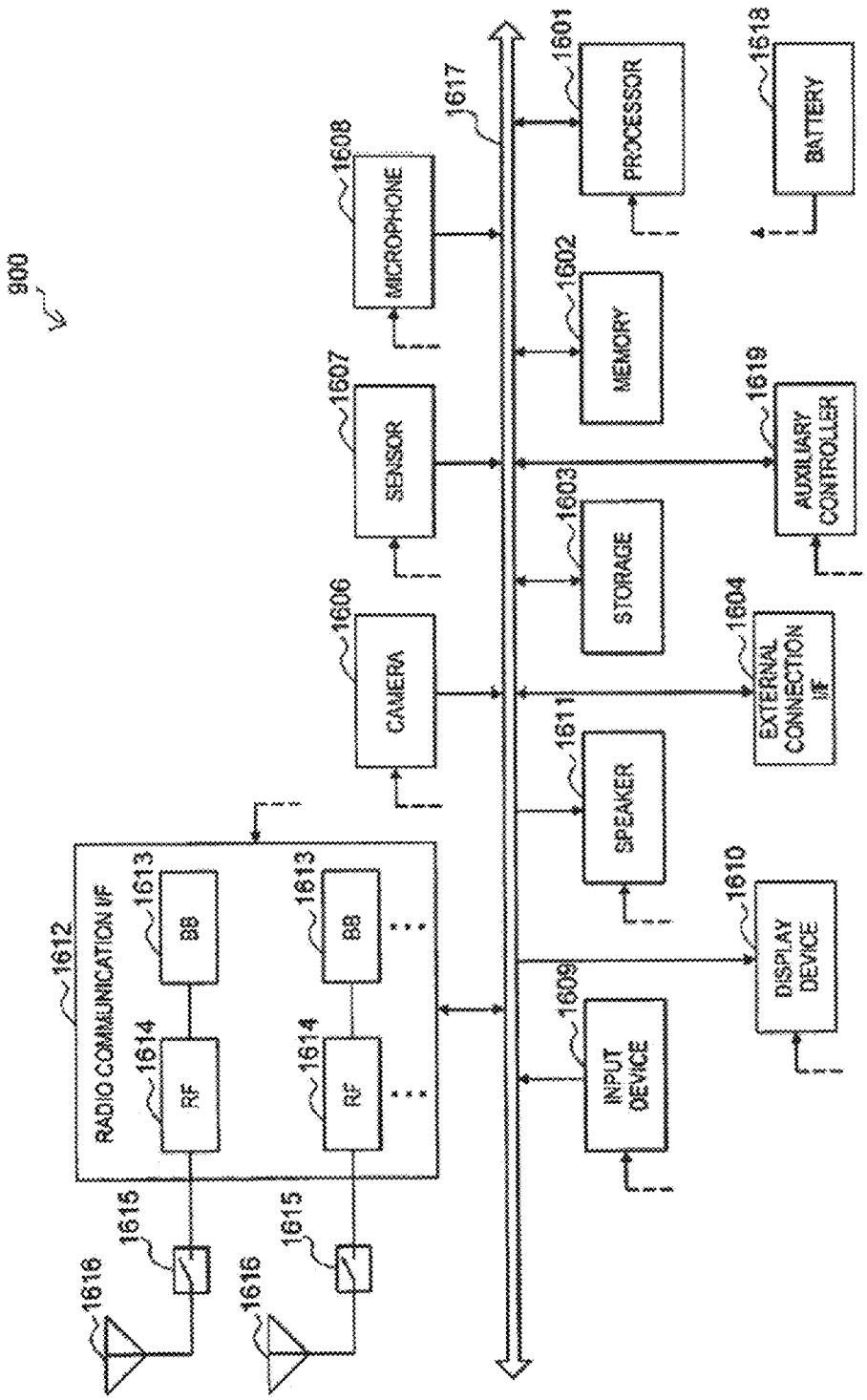
FIG. 27 is a block diagram illustrating an example of a schematic configuration of a smartphone to which the technology of the present disclosure can be applied.

FIG. 27 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to terminal device 300B and/or 1500A described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG. 27. Although FIG. 27 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG. 27. Although FIG. 27 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG. 27 via feeder lines, which are partially shown as a dashed line in the figure. The auxiliary controller 1619 operates a minimum necessary function of the smartphone 1600, for example, in a sleep mode.

Second Use Case

Figure 28:
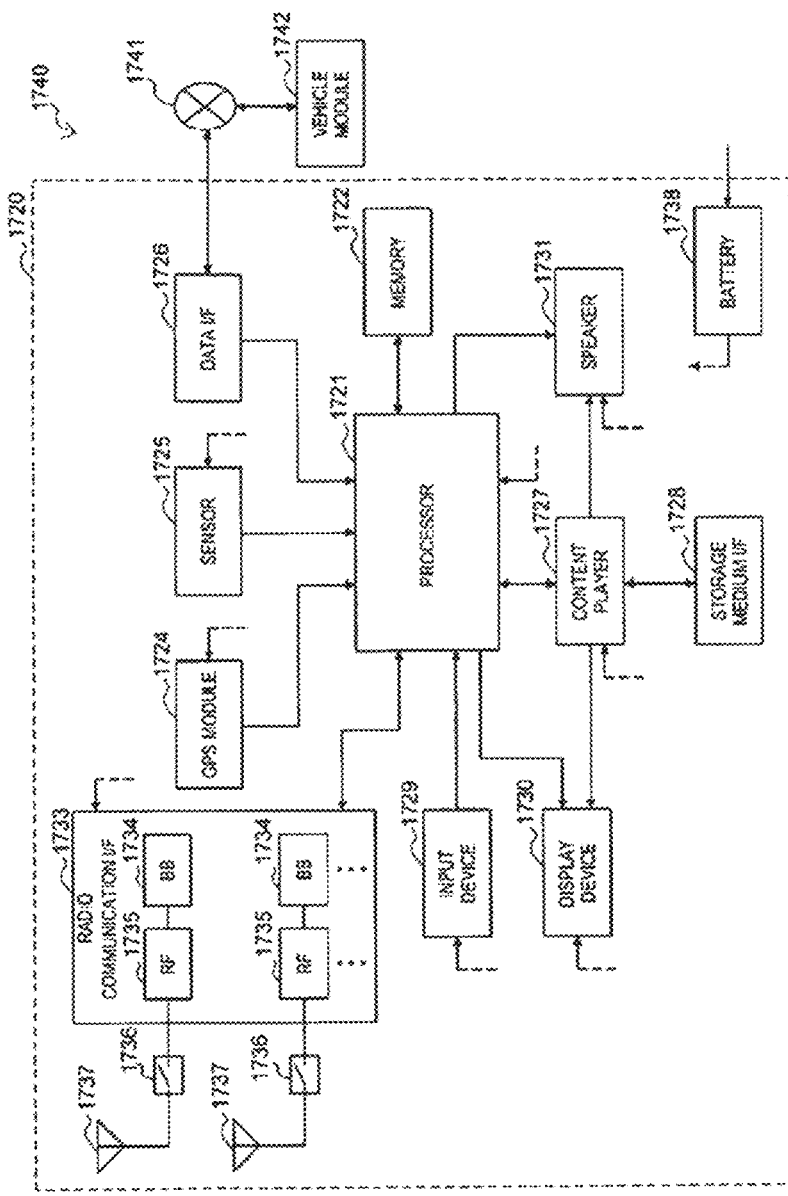
FIG. 28 is a block diagram illustrating an example of a schematic configuration of a automobile navigation device to which the technology of the present disclosure can be applied.

FIG. 28 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to terminal device 300B and/or 1500A described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the BB processor 1734 and the RF circuit 1735 thereon. The radio communication interface 1733 may include multiple BB processors 1734 and multiple RF circuits 1735, as illustrated in FIG. 28. Although FIG. 28 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG. 28. Although FIG. 28 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG. 28 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Although the illustrative embodiments herein have been described with reference to the accompanying drawings, the present disclosure is certainly not limited to the above examples. Those skilled in the art can achieve various adaptions and modifications within the scope of the appended claims, and it will be appreciated that these adaptions and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In addition, one of the above functions can be implemented by multiple units. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments herein are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device for a terminal device side in a wireless communication system, comprising a processing circuitry configured to:
   receive, from a Base Station (BS) in the wireless communication system, a plurality of Synchronization Signal (SS) blocks,
   wherein the plurality of SS blocks are transmitted by different transmit (TX) beams at the BS side, and each SS block of the plurality of SS blocks indicates information of a TX beam used by the BS to transmit the SS block;
   determine a SS block of the plurality of SS blocks that matches with the terminal device based on a corresponding SS block signal reception quality satisfying a predetermined condition; and transmit a random access preamble to the base station to perform a random access process, wherein the random access preamble indicates the information of the TX beam used by the BS to transmit the matching SS block, wherein a random access time window associated with the random access preamble either independently indicates the information of the TX beam used by the BS to transmit the matching SS block, or indicates information of another TX beam, different from the TX beam, that is used by the BS to transmit the matching SS block, wherein each SS block of the plurality of SS blocks includes a corresponding Zadoff-Chu sequence, and wherein a correspondence exists between each SS block of the plurality of SS blocks and a TX beam of a plurality of TX beams of the BS, the correspondence comprising:

a correspondence between a first Zadoff-Chu sequence and a first TX beam of the plurality of TX beams of the BS; and a correspondence between a second Zadoff-Chu sequence and a second TX beam of the plurality of TX beams of the BS.

2. The electronic device of claim 1, wherein the processing circuitry is configured to:

obtain services of the BS and another base station that does not perform beamforming transceiving by way of dual connectivity, and obtain information of the random access preamble indicating the TX beam used by the BS to transmit the matching SS block, from the another base station.

3. The electronic device of claim 2, wherein the processing circuitry is further configured to:

obtain, from the another base station, information about a correspondence between each of a plurality of receive (RX) beams at the BS side and time domain resources to be used for transmitting random access preambles, including the random access preamble indicating the information of the TX beam used by the BS to transmit the matching SS block, and determine the random access preamble indicating the TX beam used to transmit the matching SS block.

4. The electronic device of claim 1, wherein the random access preamble includes a plurality of preamble sequences that are divided into multiple groups, and all of the preamble sequences in each of the multiple groups are used to indicate the information of the TX beam for a corresponding SS block.

5. The electronic device of claim 4, wherein transmissions using all of the preamble sequences in each of the multiple groups are multiplexed by time.

6. The electronic device of claim 1, wherein the SS block indicates, by a reference signal sequence per se in the SS block, the information of the TX beam used by the BS to transmit the SS block, or wherein the SS block further comprises additional information bits by which to indicate additional information of the TX beam used by the BS to transmit the SS block.

7. The electronic device of claim 1, wherein the processing circuitry is further configured to:

receive, from the BS, a radio resource control signal that includes random access configuration information that comprises a correspondence between beams at the BS side and a plurality of random access occasions; and select a specific random access occasion to transmit a random access preamble according to the random access configuration information, to indicate the information of the TX beam used by the BS to transmit the matching SS block.

8. The electronic device of claim 1, wherein the processing circuitry is further configured to receive:

a channel state information-reference signal (CSI-RS) beam transmitted by the BS in a TX beam direction corresponding to the matching SS block, and feedback information of the CSI-RS beam matching with the terminal device to the BS.

9. An electronic device for a Base Station (BS) side in a wireless communication system, comprising a processing circuitry configured to:

transmit, by using a plurality of transmit (TX) beams, a plurality of synchronization signal (SS) blocks to a terminal device in the wireless communication system for downlink synchronization, wherein each SS block of the plurality of SS blocks includes, respectively, a primary SS (PSS), a secondary SS (SSS), and a PBCH, and wherein each SS block of the plurality of SS blocks indicates information of a TX beam used by the BS to transmit the SS block;

receive a random access preamble from the terminal device to perform a random access process, wherein the random access preamble indicates the information of the TX beam used by the BS to transmit a SS block of the plurality of SS blocks that matches with the terminal device, and wherein a random access time window associated with the random access preamble either independently indicates the information of the TX beam used by the BS to transmit the matching SS block, or indicates information of another TX beam, different from the TX beam, that is used by the BS to transmit the matching SS block; and determine, according to at least one of the random access time window or the random access preamble, a TX beam at the BS side for downlink transmission to the terminal device, wherein each SS block of the plurality of SS blocks includes a corresponding Zadoff-Chu sequence, and wherein a correspondence exists between each SS block of the plurality of SS blocks and a TX beam of the plurality of TX beams of the BS, the correspondence comprising:

a correspondence between a first Zadoff-Chu sequence and a first TX beam of the plurality of TX beams of the BS; and a correspondence between a second Zadoff-Chu sequence and a second TX beam of the plurality of TX beams of the BS.

10. The electronic device of claim 9, wherein the processing circuitry is configured to:

provide information of the random access preamble indicating the TX beam used to transmit the matching SS block, to another base station that serves the terminal device together with the BS by way of dual connectivity and does not perform beamforming transceiving, wherein the information of the random access preamble is transmitted to the terminal device by the another base station.

11. The electronic device of claim 10, wherein the terminal device is further configured to:
obtain, from the another base station, information about correspondence between each of receive (RX) beams at the BS side and time domain resources to be used for transmitting random access preambles, including the random access preamble indicating the information of the TX beam used by the BS to transmit the matching SS block, and determine the random access preamble indicating the TX beam used to transmit the matching SS block.

12. The electronic device of claim 9, wherein the random access preamble includes a plurality of preamble sequences that are divided into multiple groups, and all of the preamble sequences in each of the multiple groups are used to indicate the information of the TX beam for a same SS block.

13. The electronic device of claim 12, wherein transmissions using all of the preamble sequences in each of the multiple groups are multiplexed by time.

14. The electronic device of claim 9,
wherein the SS block indicates, by a reference signal sequence per se in the SS block, the information of the TX beam used by the BS to transmit the SS block, or
wherein the SS block further comprises additional information bits by which to indicate additional information of the TX beam used by the BS to transmit the SS block.

15. The electronic device of claim 9,
wherein the processing circuitry is further configured to transmit, to the terminal device, a radio resource control signaling including random access configuration information that comprises a correspondence between beams at the BS side and a plurality of random access occasions, so that the terminal device selects, according to the random access configuration information, a specific random access occasion to transmit a random access preamble to indicate the information of the TX beam used by the BS to transmit the matching SS block.

16. The electronic device of claim 9, wherein the processing circuitry is further configured to:
transmit a channel state information-reference signal (CSI-RS) beam in a TX beam direction corresponding to the matching SS block, and
receive, from the terminal device, feedback of information of the CSI-RS beam that matches with the terminal device.

17. A method for a Base Station (BS) side in a wireless communication system, the method comprising:
transmitting, by using a plurality of transmit (TX) beams, a plurality of synchronization signal (SS) blocks to a terminal device in the wireless communication system for downlink synchronization,
wherein each SS block of the plurality of SS blocks includes, respectively, a primary SS (PSS), a secondary SS (SSS), and a PBCH, and
wherein each SS block of the plurality of SS blocks indicates information of a TX beam used by the BS to transmit the SS block;
receiving a random access preamble from the terminal device to perform a random access process,
wherein the random access preamble indicates the information of the TX beam used by the BS to transmit a SS block of the plurality of SS blocks that matches with the terminal device,
wherein a random access time window associated with the random access preamble either independently indicates the information of the TX beam used by the BS to transmit the matching SS block, or indicates information of another TX beam, different from the TX beam, that is used by the BS to transmit the matching SS block; and
determining, according to the random access preamble, a TX beam at the BS side for downlink transmission to the terminal device,
wherein each SS block of the plurality of SS blocks includes a corresponding Zadoff-Chu sequence, and
wherein a correspondence exists between each SS block of the plurality of SS blocks and a TX beam of the plurality of TX beams of the BS, the correspondence comprising:
a correspondence between a first Zadoff-Chu sequence and a first TX beam of the plurality of TX beams of the BS; and
a correspondence between a second Zadoff-Chu sequence and a second TX beam of the plurality of TX beams of the BS.

18. The method of claim 17, further comprising:
providing information of the random access preamble indicating the TX beam used to transmit the matching SS block, to another base station that serves the terminal device together with the BS by way of dual connectivity and does not perform beamforming transceiving,
wherein the information of the random access preamble is transmitted to the terminal device by the another base station.

19. The method of claim 17, wherein the random access preamble includes a plurality of preamble sequences that are divided into multiple groups, and all of the preamble sequences in each of the multiple groups are used to indicate the information of the TX beam for a same SS block.

20. The method of claim 19, wherein transmissions using all of the preamble sequences in each of the multiple groups are multiplexed by time.

21. The method of claim 17,
wherein the SS block indicates, by a reference signal sequence per se in the SS block, the information of the TX beam used by the BS to transmit the SS block, or
wherein the SS block further comprises additional information bits by which to indicate additional information of the TX beam used by the BS to transmit the SS block.

* * * * *